US009560695B2

(12) United States Patent
Tamura et al.

(10) Patent No.: US 9,560,695 B2
(45) Date of Patent: Jan. 31, 2017

(54) COMMUNICATION SYSTEM, GATEWAY DEVICE, AND COMMUNICATION CONTROL METHOD

(71) Applicant: NEC Corporation, Tokyo (JP)

(72) Inventors: Tomu Tamura, Tokyo (JP); Yoshio Ueda, Tokyo (JP); Atsushi Nakata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/651,910

(22) PCT Filed: Dec. 9, 2013

(86) PCT No.: PCT/JP2013/007220
§ 371 (c)(1),
(2) Date: Jun. 12, 2015

(87) PCT Pub. No.: WO2014/091739
PCT Pub. Date: Jun. 19, 2014

(65) Prior Publication Data
US 2015/0319805 A1    Nov. 5, 2015

(30) Foreign Application Priority Data
Dec. 12, 2012    (JP) .................. 2012-270975

(51) Int. Cl.
*H04B 7/00*    (2006.01)
*H04M 3/42*    (2006.01)
(Continued)

(52) U.S. Cl.
CPC ............... *H04W 88/16* (2013.01); *H04W 4/12* (2013.01); *H04W 8/10* (2013.01); *H04W 24/02* (2013.01); *H04W 8/26* (2013.01)

(58) Field of Classification Search
CPC ..................................................... H04W 88/16
(Continued)

(56) References Cited

U.S. PATENT DOCUMENTS 6,272,148 B1 *   8/2001   Takagi .................. H04L 1/1858
                                                                      370/469
8,542,620 B2 *   9/2013   Sampathkumar . H04W 52/0216
                                                                      370/311
(Continued)

FOREIGN PATENT DOCUMENTS

EP    2 624 619    8/2013
JP    11-163947    6/1999
(Continued)

OTHER PUBLICATIONS

International Search Report, PCT/JP2013/007220, Feb. 10, 2014.
(Continued)

*Primary Examiner* — Tilahun B Gesesse
(74) *Attorney, Agent, or Firm* — Young & Thompson

(57) ABSTRACT

An increase in communication load in a network due to increasing messages for requesting information is suppressed. When a message for requesting information and a response message thereto are sent and received between a communication device (N1-Nn) that is an information requester and an information provider (Nx) on a network (NW) via a communication device (1), the communication device (1) stores the information acquired from the response message in a response information storage section (4), and when any communication device requests at least part of the same information, a control section (5) creates a response message including the requested information and responds.

15 Claims, 45 Drawing Sheets

(51) Int. Cl.
*H04W 88/16* (2009.01)
*H04W 4/12* (2009.01)
*H04W 8/10* (2009.01)
*H04W 24/02* (2009.01)
*H04W 8/26* (2009.01)

(58) Field of Classification Search
USPC ........................................ 455/517, 518, 519
See application file for complete search history.

(56) References Cited

U.S. PATENT DOCUMENTS

| | | | | |
|---|---|---|---|---|
| 8,611,268 | B1* | 12/2013 | Thandaveswaran | H04W 52/0206 370/311 |
| 9,485,715 | B2* | 11/2016 | Ansari | H04W 52/0216 |
| 2011/0051648 | A1* | 3/2011 | Kato | H04W 88/182 370/312 |
| 2011/0243097 | A1* | 10/2011 | Lindqvist | H04W 24/02 370/331 |
| 2015/0264632 | A1* | 9/2015 | Zhi | H04W 48/16 455/418 |

FOREIGN PATENT DOCUMENTS

| | | |
|---|---|---|
| JP | 2002-247050 | 8/2002 |
| WO | WO 2009/091042 | 7/2009 |
| WO | 2010/066164 | 6/2010 |
| WO | 2014/085968 | 6/2014 |

OTHER PUBLICATIONS

3GPP TS23.401 v11.3.0 (2112-09), Section 5.15, pp. 228-229, 3rd Generation Partnership Project; Technical Specification Group Services and System Aspects; General Packet Radio Service (GPRS) enhancements for Evolved Universal Terrestrial Radio Access Network (E-UTRAN) access (Release 11).

3GPP 1536.300 v10.5.0 (Sep. 2011), Section 22.3.6, p. 175, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11).

3GPP TS25.467 v10.1.0 Release 10, Section 5.8, pp. 25-26, Universal Mobile Telecommunications System (UMTS); UTRAN architecture for 3G Home Node B (HNB); Stage 2.

Extended European Search Report—EP 13 86 3082—Jun. 21, 2016.

* cited by examiner

FIRST EXEMPLARY EMBODIMENT

SECOND EXEMPLARY EMBODIMENT

THIRD EXEMPLARY EMBODIMENT

FOURTH EXAMPLE

NINTH EXAMPLE

19TH EXAMPLE WHERE GATEWAY DEVICE 10 DOES NOT RETAIN NETWORK INFORMATION 60 WITHIN TIME LIMIT 61 DESIGNATED BY RADIO BASE STATION 20

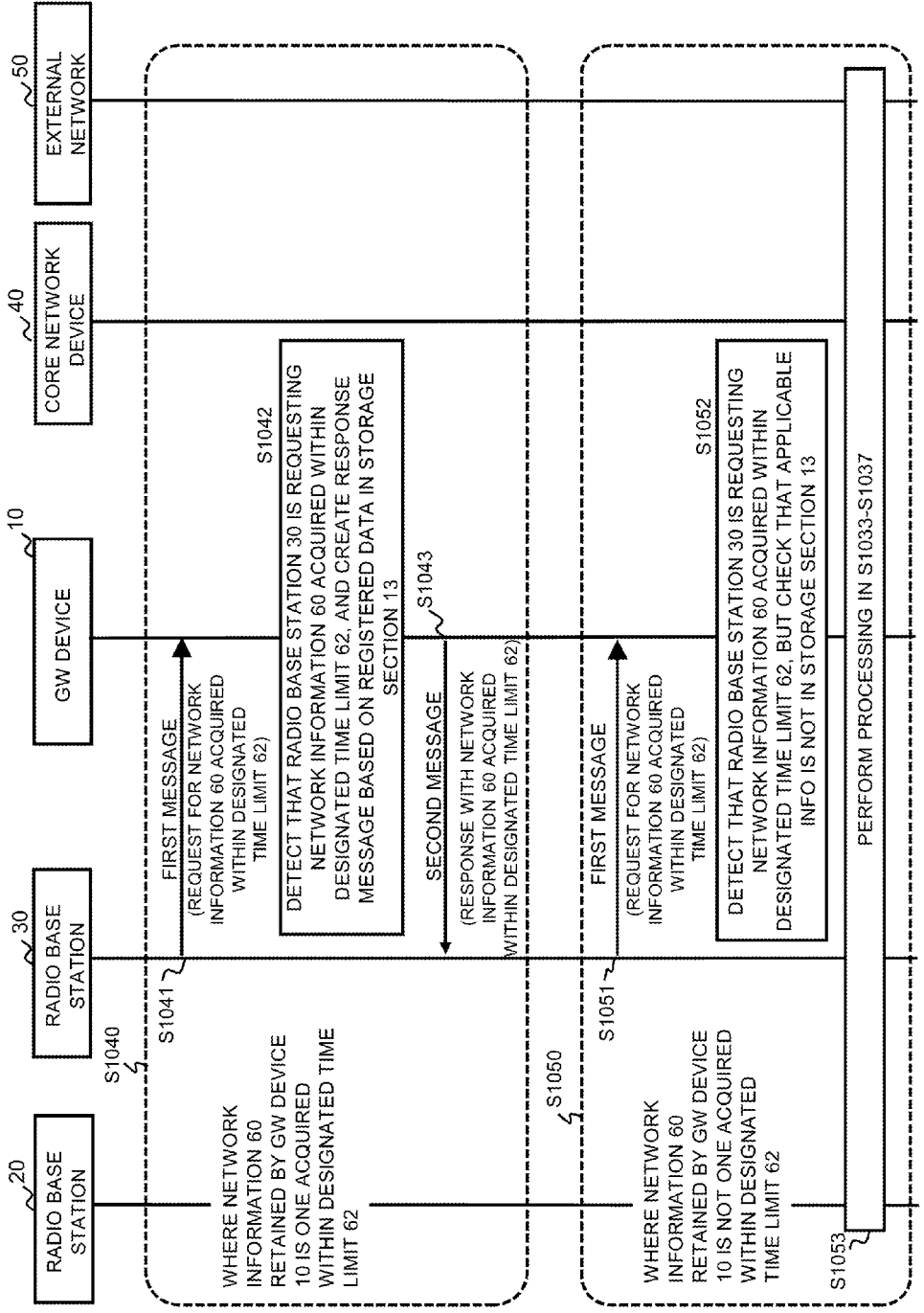

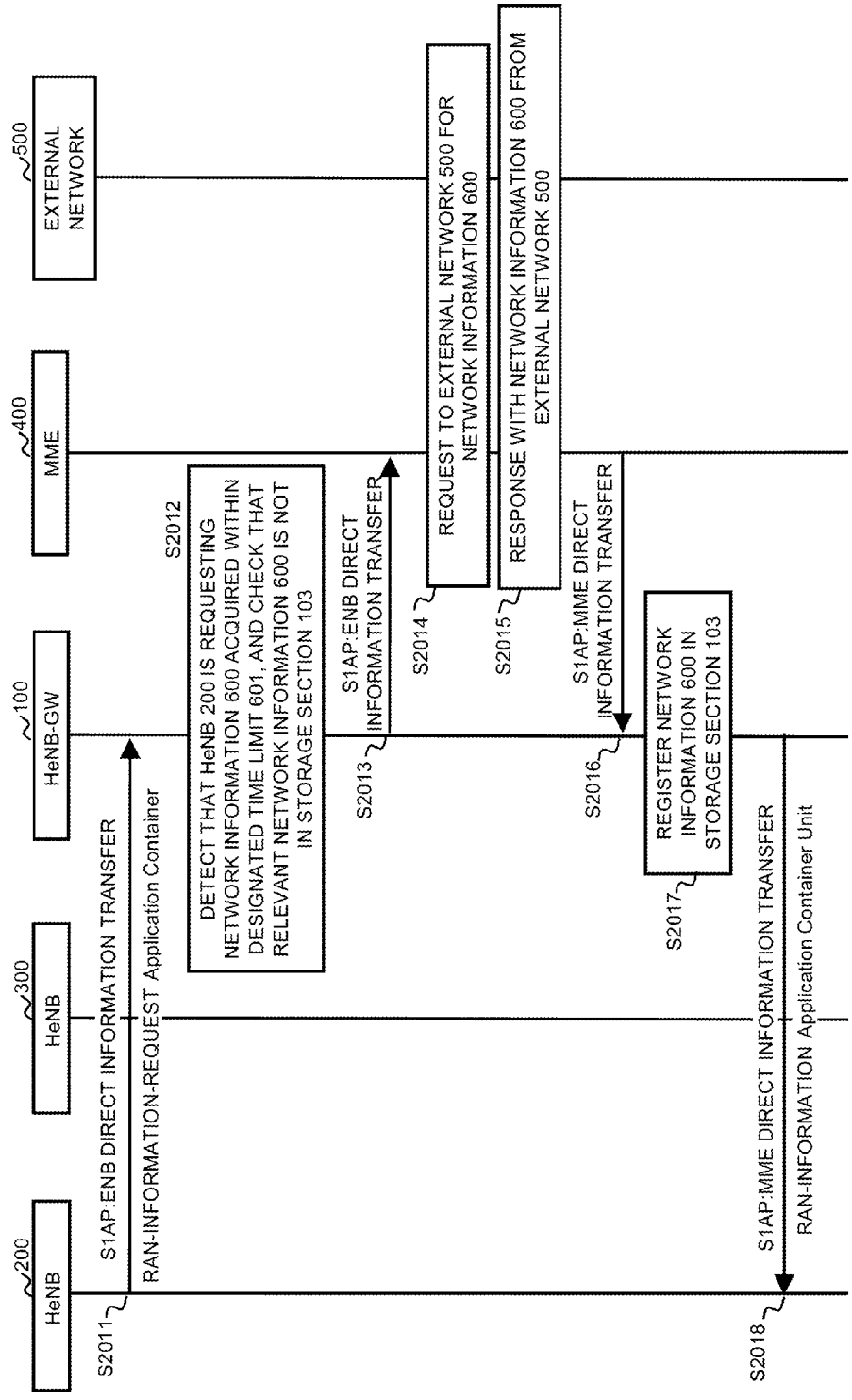

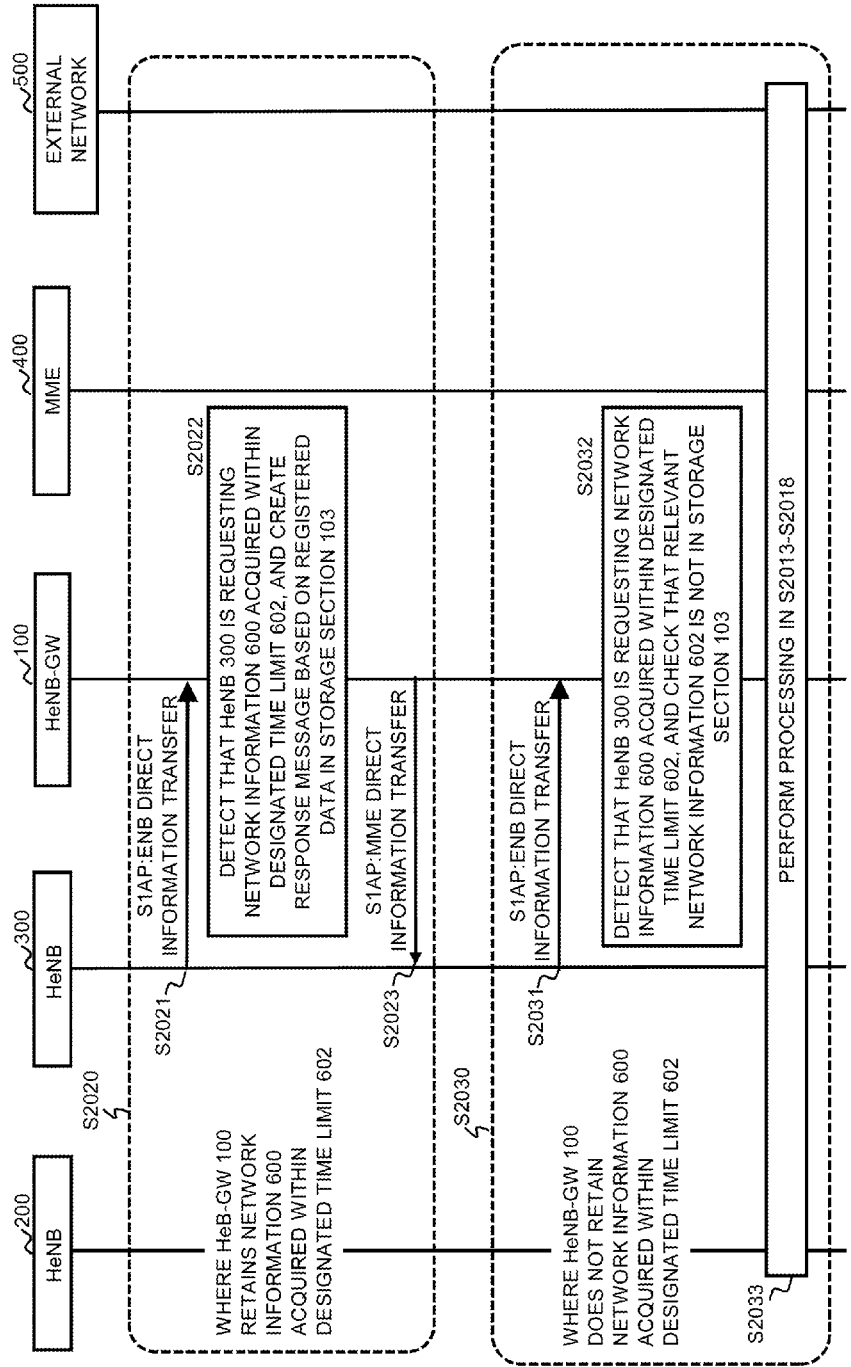

FIG. 41

20TH EXAMPLE

Table 11.3.62a.1.b: RAN-INFORMATION-REQUEST RIM Container Contents

| Information Elements | Type / Reference | Presence | Format | Length |
|---|---|---|---|---|
| RIM Application Identity | RIM Application Identity/11.3.61 | M | TLV | 3 |
| RIM Sequence Number | RIM Sequence Number/11.3.62 | M | TLV | 6 |
| RIM PDU Indications | RIM PDU Indications/11.3.65 | M | TLV | 3 |
| RIM Protocol Version Number | RIM Protocol Version Number/11.3.67 | O | TLV | 3 |
| Application Container (note 1) | RAN-INFORMATION-REQUEST Application Container/11.3.63.1 | C | TLV | 4-? |
| SON Transfer Application Identity (note 2) | SON Transfer Application Identity/11.3.108 | C | TLV | 3-m |
| SpecifiedTime | xxx/yyy | O | TLV | zzz |

NOTE 1: The presence of the Application Container depends on the value of the *RIM Application Identity* IE.
NOTE 2: The SON *Transfer Application Identity* IE shall be present if and only if the *RIM Application Identity* IE is set to "SON Transfer".

FIG. 42
20TH EXAMPLE

Table 11.3.62a.2.b: RAN-INFORMATION RIM Container Contents

| Information Elements | Type / Reference | Presence | Format | Length |
|---|---|---|---|---|
| RIM Application Identity | RIM Application Identity /11.3.61 | M | TLV | 3 |
| RIM Sequence Number | RIM Sequence Number /11.3.62 | M | TLV | 6 |
| RIM PDU Indications | RIM PDU Indications /11.3.65. | M | TLV | 3 |
| RIM Protocol Version Number | RIM Protocol Version Number/11.3.67 | O | TLV | 3 |
| Application Container (NOTE 1) | RAN-INFORMATION Application Container /11.3.63.2 | C (Note 1) | TLV | 4-? |
| Application Error Container (NOTE 1) | Application Error Container/11.3.64 | C (Note 1) | TLV | n |
| SON Transfer Application Identity (note 2) | SON Transfer Application Identity/11.3.108 | C | TLV | 3-m |
| Timestamp | xxx/yyy | O | TLV | zzz |

NOTE 1: The presence of application information depends on the value of the *RIM Application Identity* IE. If application information is mandatory either the *Application Error Container* IE or the *Application Container* IE is present.
NOTE 2: The *SON Transfer Application Identity* IE shall be present if and only if the *RIM Application Identity* IE is set to "SON Transfer".

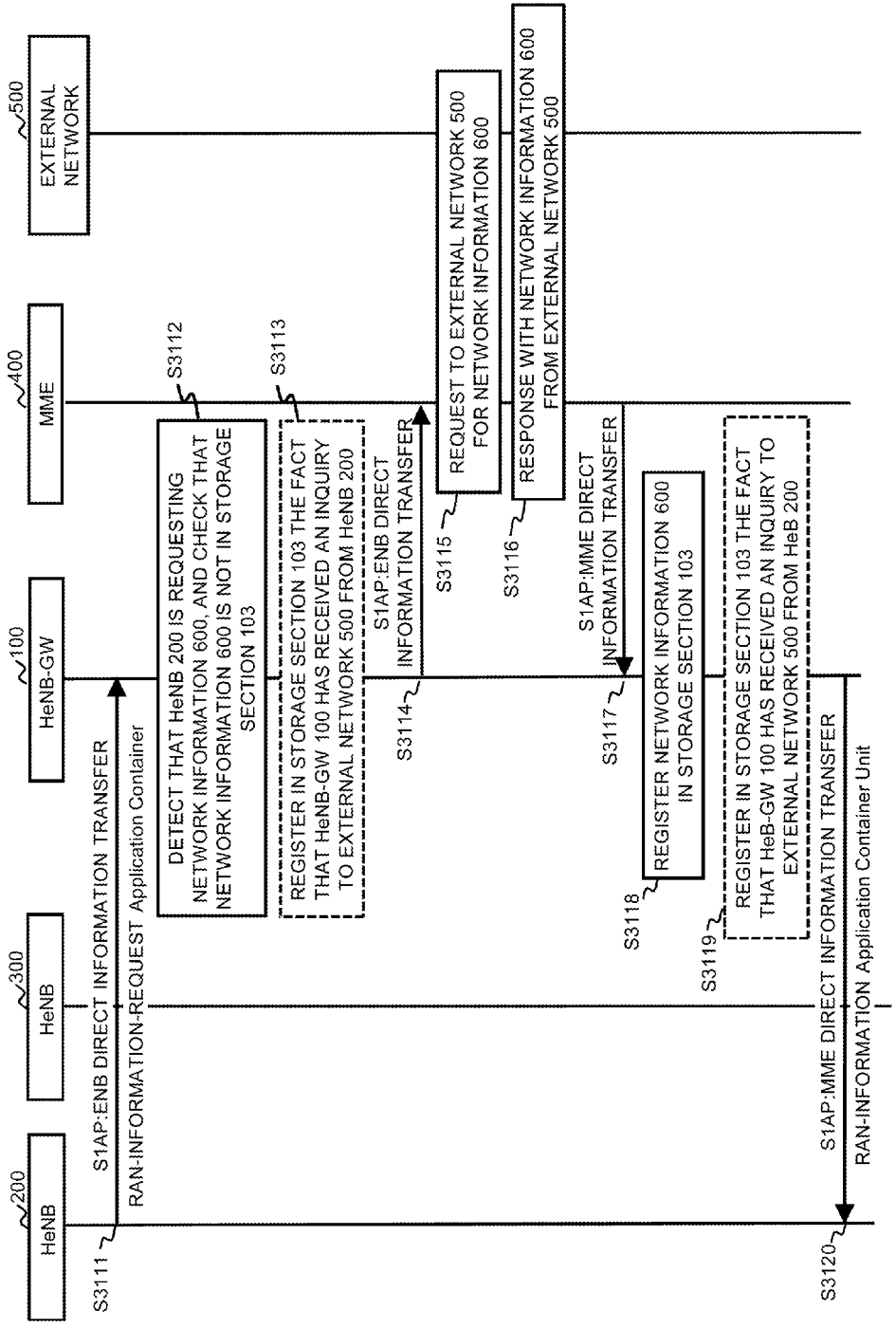

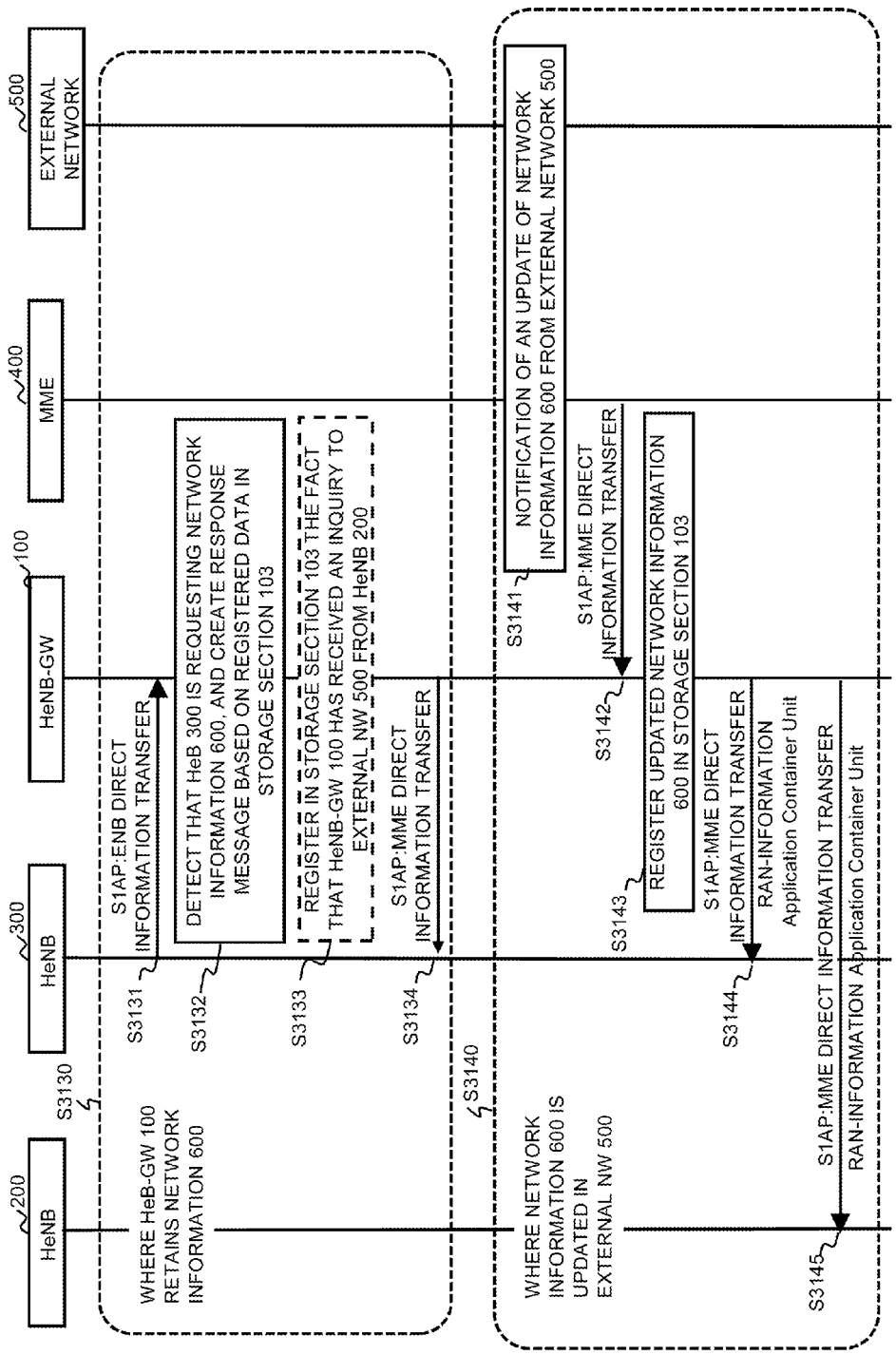

FIG. 45

Table 11.3.62a.2.b: RAN-INFORMATION RIM Container Contents

| Information Elements | Type / Reference | Presence | Format | Length |
|---|---|---|---|---|
| RIM Application Identity | RIM Application Identity /11.3.61 | M | TLV | 3 |
| RIM Sequence Number | RIM Sequence Number /11.3.62 | M | TLV | 6 |
| RIM PDU Indications | RIM PDU Indications /11.3.65. | M | TLV | 3 |
| RIM Protocol Version Number | RIM Protocol Version Number/11.3.67 | O | TLV | 3 |
| Application Container (NOTE 1) | RAN-INFORMATION Application Container /11.3.63.2 | C (Note 1) | TLV | 4-? |
| Application Error Container (NOTE 1) | Application Error Container/11.3.64 | C (Note 1) | TLV | n |
| SON Transfer Application Identity (note 2) | SON Transfer Application Identity/11.3.108 | C | TLV | 3-m |
| ExpirationTime | xxx/yyy | O | TLV | zzz |

NOTE 1: The presence of application information depends on the value of the *RIM Application Identity* IE. If application information is mandatory either the *Application Error Container* IE or the *Application Container* IE is present.
NOTE 2: The *SON Transfer Application Identity* IE shall be present if and only if the *RIM Application Identity* IE is set to "SON Transfer".

COMMUNICATION SYSTEM, GATEWAY DEVICE, AND COMMUNICATION CONTROL METHOD

TECHNICAL FIELD

The present invention relates to a communication system including a plurality of communication devices and, more particularly, to a gateway device managing a plurality of communication devices and a communication control method in the same.

BACKGROUND ART

In recent years, traffic from mobile telephones is growing steadily, and this trend is increasingly apparent as smartphones become prevalent. Responding to the increasing traffic, telecommunication operators not only reinforce the facilities of existing macro base stations, but also set up at hotspots small-sized base stations called picocell or femtocell, which have smaller coverage areas, thereby attempting to create environments where users can perform communication with comfort. Moreover, femtocells are set up not only at hotspots but also indoors, such as at home or in companies where the radio waves from macro base stations hardly reach, whereby they are used to increase users' convenience and to provide value-added services exploiting their locality.

A procedure for a HeNB (Home eNB) to acquire network information of a Universal Mobile Telecommunication System terrestrial radio access network (hereinafter, UTRAN) or a GSM EDGE radio access network (hereinafter, GERAN) is referred to as RAN Information Management (hereinafter, RIM) and is defined in NPL 1. In RIM, a HeNB inquires about network information of a UTRAN/GERAN by using S1AP:ENB DIRECT INFORMATION TRANSFER, which is sent to a MME (Mobility Management Entity). This message is sent to the UTRAN/GERAN via the MME and a SGSN, and the UTRAN/GERAN having received this message sends a message in which its network information is set to the SGSN. The HeNB acquires the network information of the URTAN/GERAN through S1AP: MME DIRECT INFORMATION TRANSFER, which is received from the MME.

A procedure for a HeNB to specify the TNL (Transport Network Layer) address of an eNB or a HeNB (hereinafter, collectively represented as (H)eNB) whose TNL address should be used to establish a SCTP (Stream Control Transmission Protocol) connection but is unknown is referred to as TNL address discovery and is defined in NPL 2. A HeNB sends S1AP:ENB CONFIGURATION TRANSFER to a MME in order to inquire about the TNL address of a (H)eNB, and the MME, if it manages the (H)eNB, or, if not, another MME managing the (H)eNB, after the MME transfers the message to the another MME, sends S1AP:MME CONFIGURATION TRANSFER to the relevant (H)eNB. As a response to this, the MME receives S1AP:ENB CONFIGURATION TRANSFER from the relevant (H)eNB. The originating HeNB receives S1AP:MME CONFIGURATION TRANSFER from the MME managing the HeNB itself, thereby acquiring the TNL address of the (H)eNB.

There is another procedure similar to the above-described TNL address discovery procedure, called HNB Configuration Transfer, which is performed by nodes, namely HNB (3G Home NodeB) and HNB-GW, in a UTRAN network and is described in NPL 3. A HNB acquires the TNL address of a neighbor HNB through the HNB Configuration Transfer procedure as in the TNL address discovery procedure. In this procedure, a HNB-GW does not send a message to an upper-level network than itself. This point differs from the TNL address discovery procedure, in which a message needs to be sent to a core network.

CITATION LIST

Non-Patent Literature

[PTL 1]
 3GPP TS23.401 v11.3.0 (2112-09), Section 5.15, pp. 228-229
[PTL 2]
 3GPP TS36.300 v10.5.0 (2011-09), Section 22.3.6, p. 175
[PTL 3]
 3GPP TS25.467 v10.1.0 Release 10, Section 5.8, pp. 25-26

SUMMARY OF INVENTION

Technical Problem

However, in the above-described RIM procedure and TNL address discovery procedure, a MME transfers a message received from a (H)eNB to another node, at which time messages are sent and received between the MME and a SGSN, between the MME and the (H)eNB, and between the MME and another MME. Since HeNBs, which are very small base stations, are set up in quite large numbers, signaling from these HeNBs may increase communication load in a telecommunication operator's network. That is, it is expected that if messages for requesting network information, address information and the like are sent out to a network from many communication devices, a lot of signaling occurs over the network, causing communication load in the network to increase to an unignorable extent.

Accordingly, an object of the present invention is to provide a communication system, a gateway device, and a communication control method that suppress an increase in communication load in a network caused by an increasing number of messages for requesting information.

Solution to Problem

A communication system according to the present invention is a communication system in which a plurality of second communication devices are connected to a first communication device that is attached to a network, wherein when a message for requesting information and a response message thereto are sent and received between a second communication device that is an information requester and an information provider on the network via the first communication device, the first communication device stores the information acquired from the response message, and when any second communication device makes a request to the information provider for at least part of the same information, the first communication device creates a response message including the requested information and responds.

A gateway device according to the present invention is a gateway device disposed between a network and a plurality of communication devices, comprising: means for detecting a message for requesting information and a response message thereto sent and received between a communication device that is an information requester and an information provider on the network; storage means for storing the information acquired from the response message; and control means that, when any communication device makes a request to the information provider for at least part of the same information, creates a response message including the requested information that is stored in the storage means, and responds.

A communication control method according to the present invention is a communication control method in a communication device disposed between a network and a plurality of base stations, comprising: detecting a message for requesting information and a response message thereto sent and received between a base station that is an information requester and an information provider on the network; storing the information acquired from the response message; and when any base station makes a request to the information provider for at least part of the same information, creating a response message including the requested information that is stored in the storage means, and responding.

Advantageous Effects of Invention

According to the present invention, when a request for the same information as stored information is received, a response message including the relevant information is created and returned without transferring the request to a network, whereby it is possible to suppress an increase in communication load in the network caused by an increasing number of messages for requesting information.

BRIEF DESCRIPTION OF DRAWINGS

FIG. 38 is a sequence diagram showing operations at the time of returning registered information, in the communication system according to the 19th example.

FIG. 39 is a sequence diagram showing operations at the time of acquiring unregistered information, in a communication system according to a 20th example.

FIG. 40 is a sequence diagram showing operations at the time of returning registered information, in the communication system according to the 20th example.

FIG. 41 is a diagram showing an example of a container defined in the 20th example.

FIG. 42 is a diagram showing another example of a container defined in the 20th example.

FIG. 43 is a sequence diagram showing operations at the time of acquiring unregistered information, in a communication system according to a 22nd example.

FIG. 44 is a sequence diagram showing operations at the time of returning registered information, in the communication system according to the 22nd example.

FIG. 45 is a diagram showing an example of a container defined in another example.

DESCRIPTION OF EMBODIMENTS

According to an exemplary embodiment of the present invention, when an information provider responds to a request for information from an information requester, the information of interest received from the information provider is stored, and later, when at least part of the same information is requested, a response is made to a requester by using the stored information, without the request being transferred to the information provider. Accordingly, if the same information is requested, such requests are not sent out to a network, and consequently it is possible to suppress an increase in communication load in the network. Hereinafter, exemplary embodiments of the present invention will be described by using as an example a communication system in which a first communication device attached to a network and a plurality of second communication devices are connected to each other.

Figure 1:
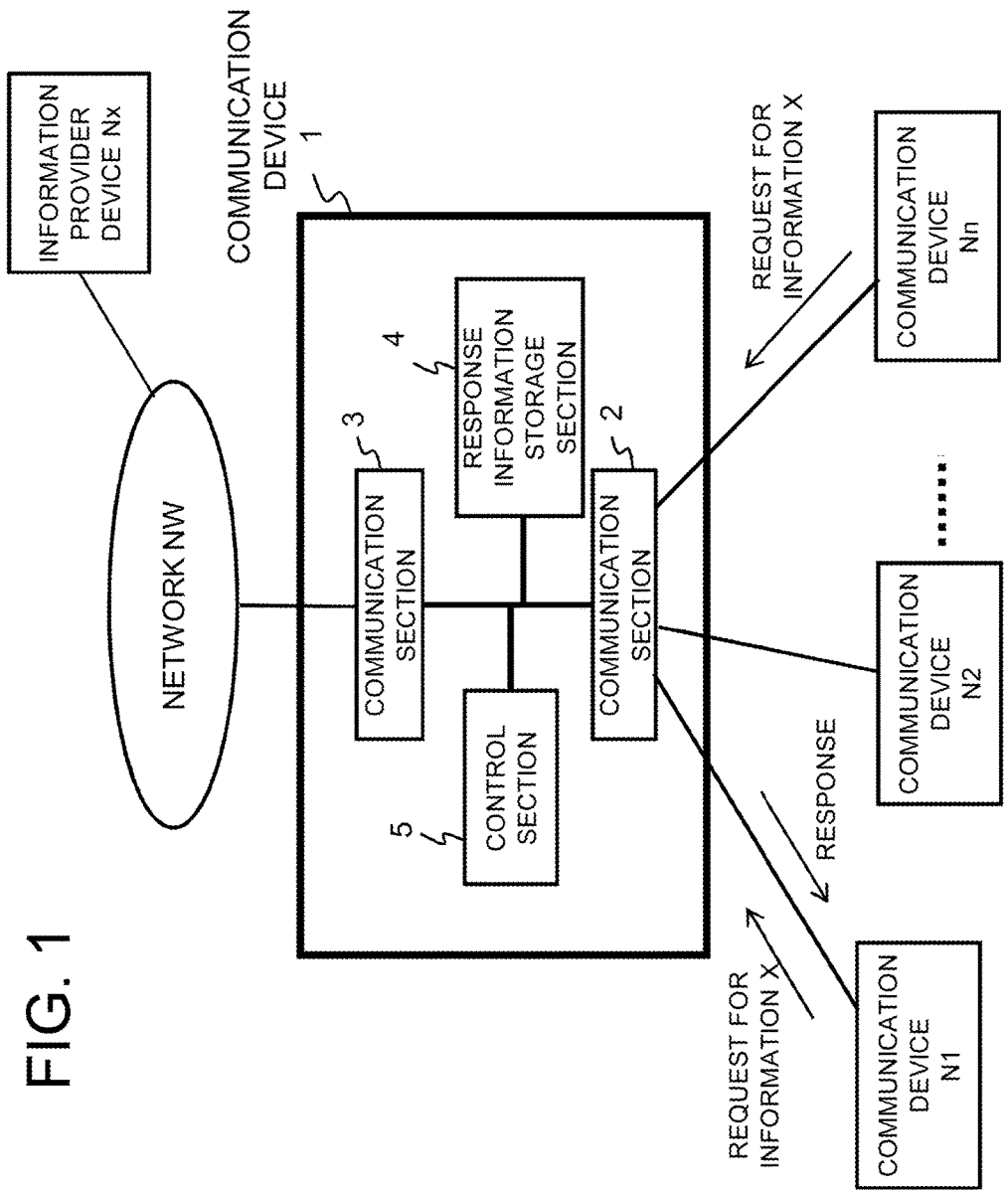
FIG. 1 is a block diagram showing a functional configuration of a communication device according to an exemplary embodiment of the present invention.

Referring to FIG. 1, a communication device 1 is interposed between a network NW and a plurality of n communication devices N1-Nn while being connected to them, and allows data communication between any communication device Ni (i is a natural number not larger than n) and an information provider device Nx on the network NW. The communication device 1 includes a communication section 2 for connecting to the communication devices N1-Nn and a communication section 3 for connecting to the network NW, and also includes a response information storage section 4 for registering response information, which will be described later. Moreover, a control section 5 controls the operations of the communication device 1, which will be described next.

A. First Exemplary Embodiment

Figure 2:
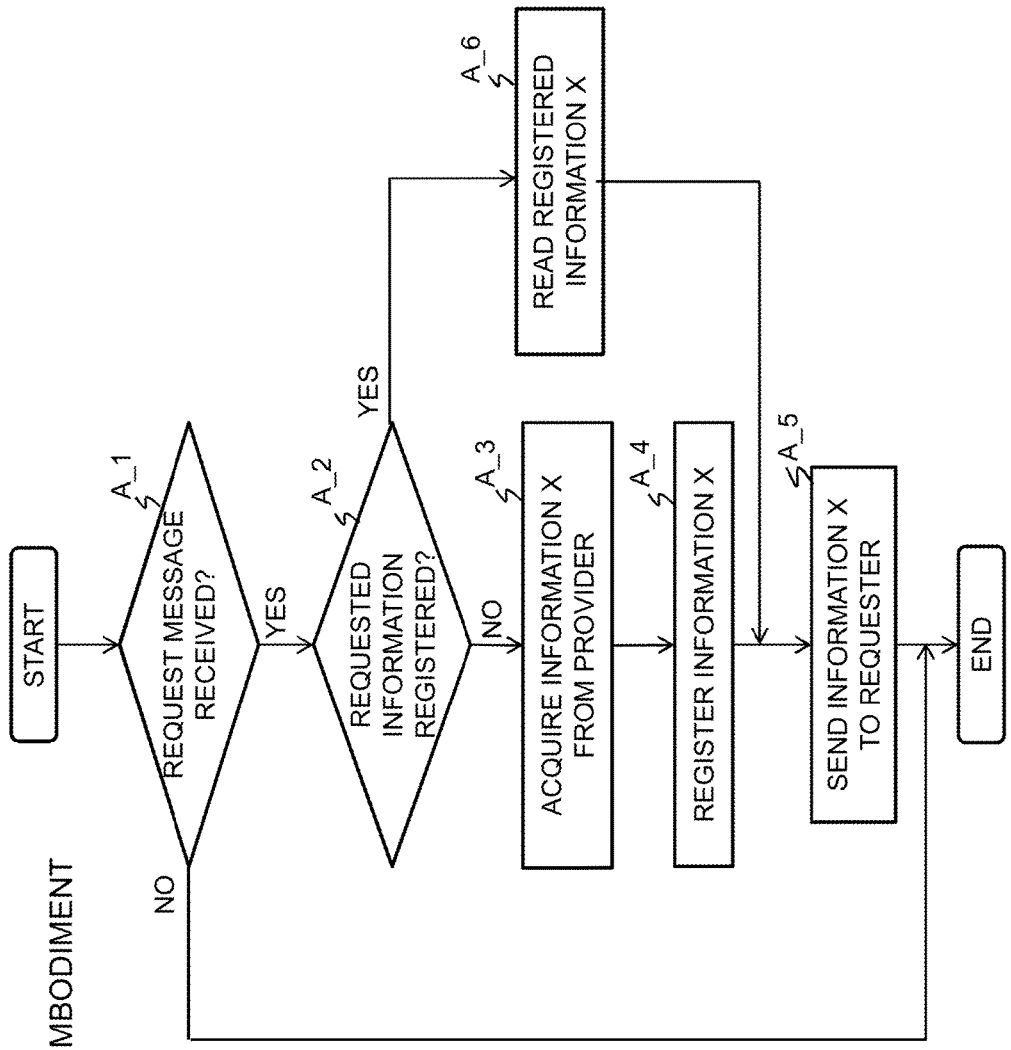
FIG. 2 is a flowchart showing a communication control method according to a first exemplary embodiment.

Referring to FIG. 2, the control section 5 determines whether or not a message for requesting some information is received from the communication device Ni (Operation A_1) and, when such a request message is received (Operation A_1; YES), determines whether or not the information requested with this request message is already registered in the response information storage section 4 (Operation A_2). If it is not registered (Operation A_2; NO), the control section 5 keeps the contents of the request message (the addresses of the information requester and information provider, the type of the requested information and the like), transfers the request message to the information provider device Nx via the communication section 2 or 3, and then receives the information X with a response from the information provider device Nx (Operation A_3). When receiving the information X, the control section 5 registers the information X in the response information storage section 4 (Operation A_4) and sends the information X to the information requester, the communication device Ni (Operation A_5).

If the information X requested with the request message is already registered (Operation A_2; YES), the control section 5 reads the information X registered in the response information storage section 4 (Operation A_6) and sends the read information X to the communication device Ni as a response to the request from the requester communication device Ni (Operation A_5).

As described above, when a massage for requesting the same information as already registered information is received, the communication device 1 returns the registered information to an information requester as a response to the request, without transferring the message to an information provider. Consequently, it is possible to avoid the occurrence of signaling on a network due to such request messages, and thus to reduce network load.

For example, it is assumed that the communication device 1 is a gateway device, and that the communication devices N1-Nn are a plurality of radio base stations. In this case, when a radio base station Ni performs a procedure for acquiring network information of the external network NW or address information of another radio base station via the gateway device 1, the gateway device 1 extracts such information from a message it relays, and registers the information in the response information storage section 4. When detecting in another message that another radio base station Nj attempts to acquire the same information, the gateway device 1 terminates that procedure, creates a response message based on the information registered in the response information storage section 4, and sends the response message to the radio base station Nj. Thus, it is possible to reduce the number of signaling between nodes.

Note that it is also possible that term-of-validity information set by an information provider or designated acquisition period information set by an information requester is added to network information to be sent and received, and such time-limited information is changed according to the purpose of use, thereby achieving separation between cases where the relaying gateway device 1 makes signaling to an upper level and cases where it does not, which will be described later.

B. Second Exemplary Embodiment

According to a second exemplary embodiment of the present invention, a term of validity is given to provide information designated by an information provider, and responses are controlled with consideration given to the term of validity. A term of validity here may be a time at which a period of validity of information expires, or may be a period (hours, days or the like) of validity. Note that in FIG. 3, operations similar to those of the first exemplary embodiment shown in FIG. 2 are given the same reference signs as in FIG. 2, and a description thereof will be simplified.

Figure 3:
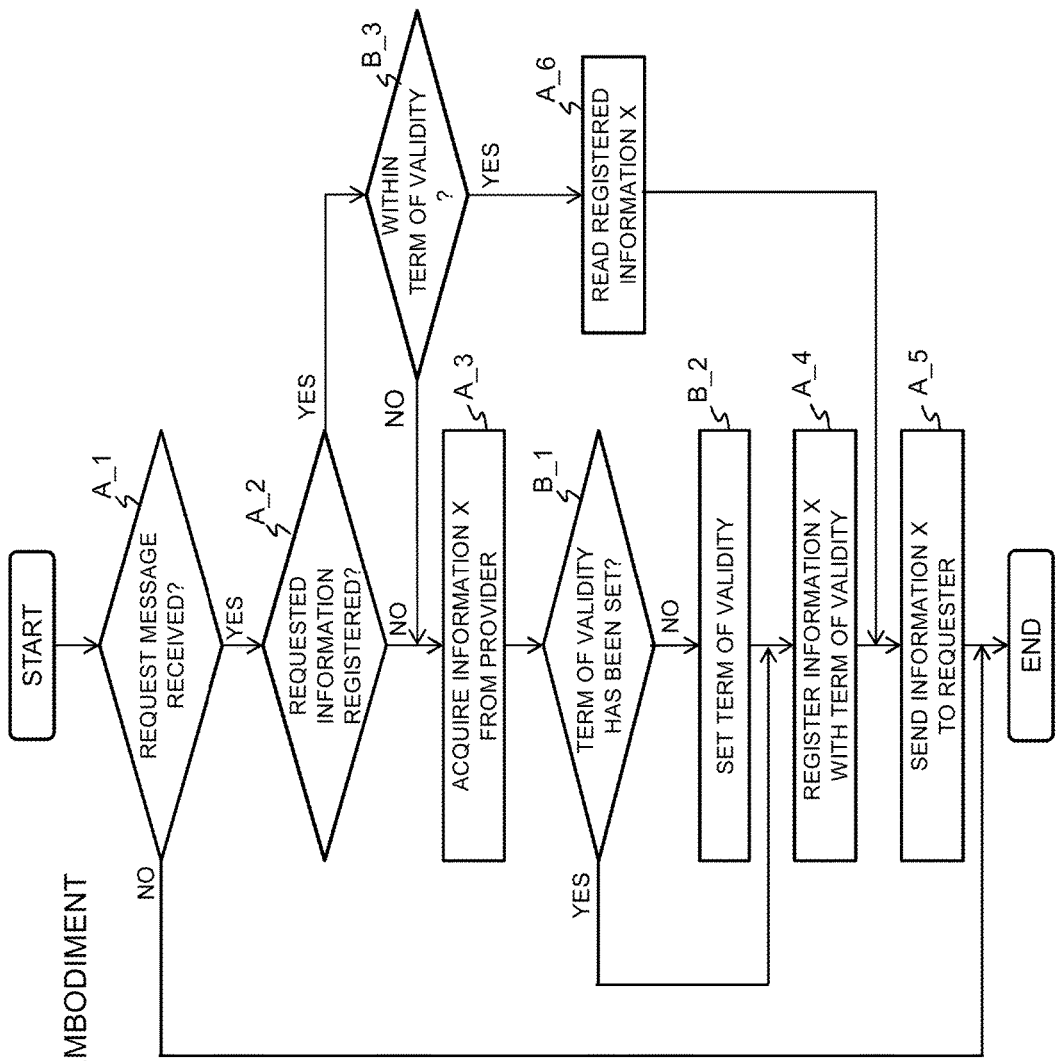
FIG. 3 is a flowchart showing a communication control method according to a second exemplary embodiment.

Referring to FIG. 3, when information requested with a request message is not registered in the response information storage section 4 (Operation A_2; NO), the control section 5 transfers the request message to an information provider device Nx and acquires the requested information X from the information provide device Nx (Operation A_3). In this event, if a term of validity is given to the information X (Operation B_1; YES), the information X with the term of validity is registered as it is in the response information storage section 4 (Operation A_4). If no term of validity is given to the information X (Operation B_1; NO), the control section 5 of the communication device 1 sets a term of validity on the information X (Operation B_2) and registers it in the response information storage section 4 (Operation A_4).

When the information requested with the request message is registered in the response information storage section 4 (Operation A_2; YES), the control section 5 checks the term of validity of the registered information (Operation B_3), and if within the term of validity (Operation B_3; YES), the control section 5 reads the information X registered in the response information storage section 4 (Operation A_6) and sends the read information X to the communication device Ni as a response to the request from the requester communication device Ni (Operation A_5). The other operations are similar to those of the first exemplary embodiment, and therefore a description thereof will be omitted. Note that expired information may be deleted from the response information storage section 4. Information is deleted, whereby the control section 5 can determine whether or not to acquire information only by checking whether or not the information is registered in the response information storage section 4.

According to the second exemplary embodiment of the present invention, it is possible to avoid the occurrence of signaling on a network due to request messages, and thus to reduce network load, as in the above-described first exemplary embodiment. Further, the second exemplary embodiment has the advantage that the freshness of information can be ensured because old information past a term of validity set by an information provider is not sent to a requester.

C. Third Exemplary Embodiment

According to a third exemplary embodiment of the present invention, an information requester designates a period of acquisition of requested information, and responses are controlled with consideration given to the designated period. Note that in FIG. 4, operations similar to those of the first exemplary embodiment shown in FIG. 2 are given the same reference signs as in FIG. 2, and a description thereof will be simplified.

Figure 4:
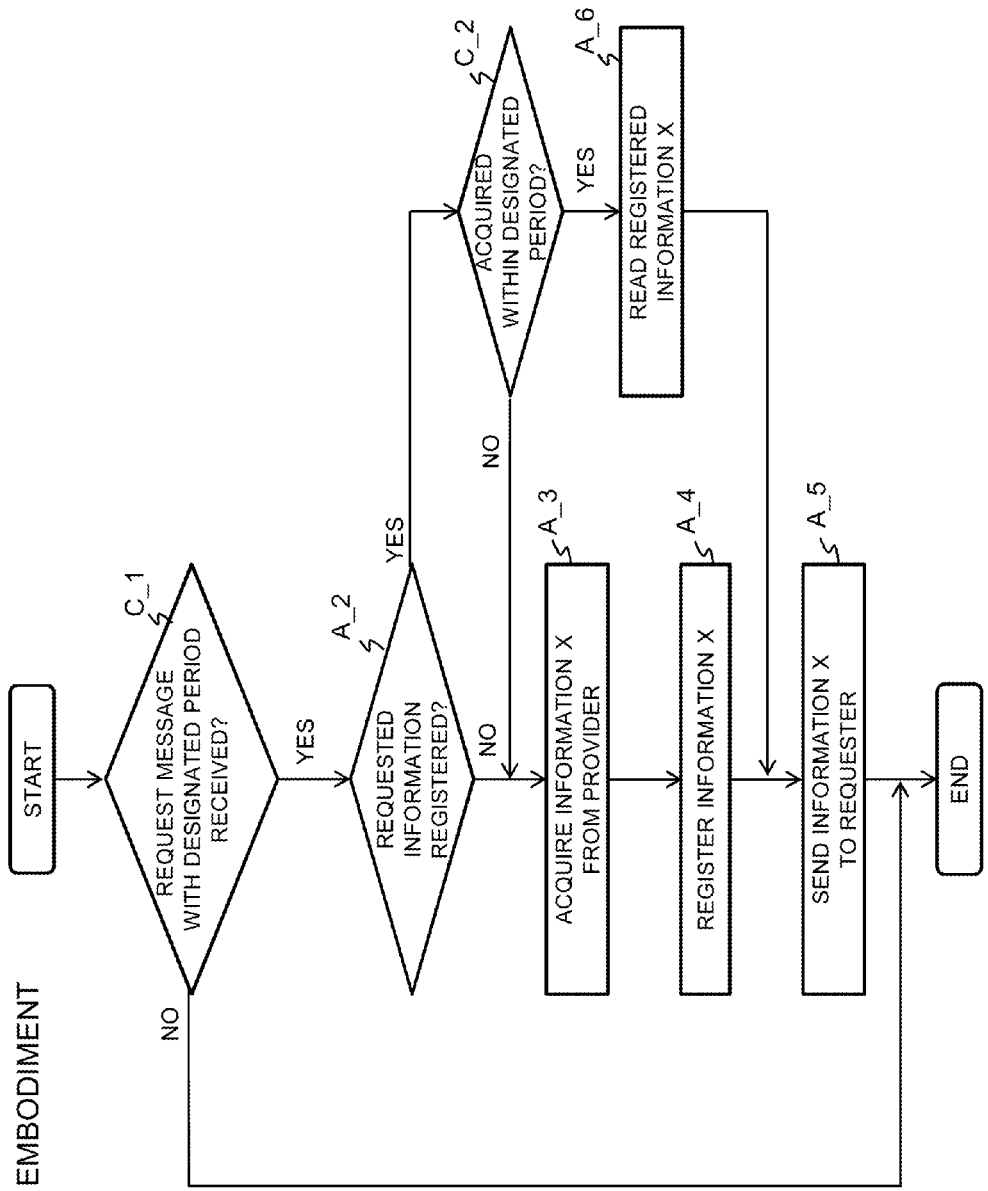
FIG. 4 is a flowchart showing a communication control method according to a third exemplary embodiment.

Referring to FIG. 4, when a request message with a designated period is received from a communication device (Operation C_1; YES), and when requested information is registered in the response information storage section 4 (Operation A_2; YES), the control section 5 determines whether or not the information is one acquired within the designated period (Operation C_2). If within the designated period (Operation C_2; YES), the control section 5 reads the information X registered in the response information storage section 4 (Operation A_6) and sends the read information X to the requester communication device Ni (Operation A_5). If not within the designated period (Operation C_2; NO), the information is acquired from the information provider device Nx as in the first exemplary embodiment (Operation A_3). The other operations are similar to those of the first exemplary embodiment, and therefore a description thereof will be omitted.

According to the third exemplary embodiment of the present invention, it is possible to avoid the occurrence of signaling on a network due to request messages, and thus to reduce network load, as in the above-described first exemplary embodiment. Further, the third exemplary embodiment has the advantage that only information with freshness desired by an information requester is provided because only information within a period designated by the information requester is returned.

Hereinafter, examples of the present invention will be described in detail with reference to drawings. Note that the above-described first, second, and third exemplary embodiments correspond to a first, second, and 19th examples, respectively, which will be described below.

1. First Example

According to a first example of the present invention, a gateway device extracts and stores network information included in a message sent and received between a radio base station and a core network device, and reuses the stored network information when the same information is required in a procedure performed between another radio base station and the core network device. Thus, it is possible to reduce the number of signaling operations within a network. A detailed description will be given below.

1.1) Structure

Figure 5:
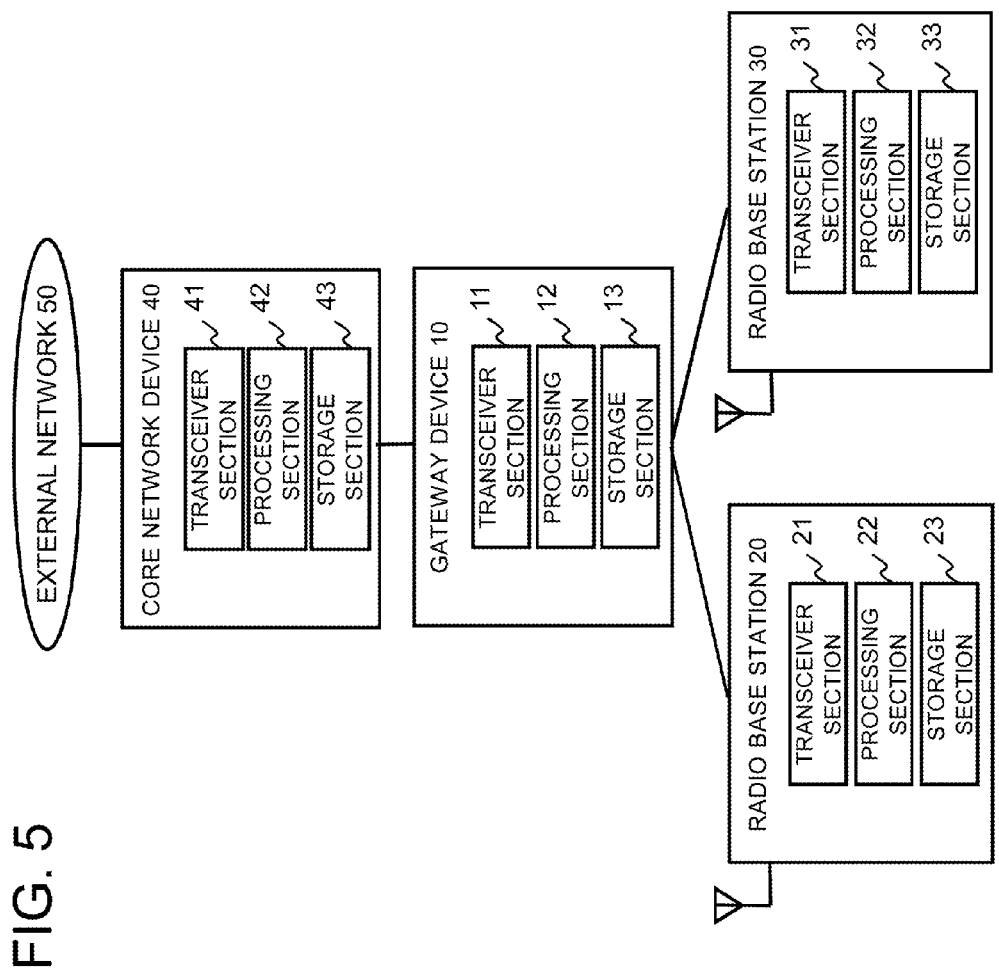
FIG. 5 is a system structure diagram showing a communication system according to a first example of the present invention.

FIG. 5 shows a diagram of a network structure to which the present example is applied. It is assumed that a gateway device 10 accommodates radio base stations 20 and 30 and is connected to an external network 50 via a core network device 40. Note that it is assumed that each of the gateway device, radio base stations, and core network device includes a transceiver section for performing communication, a storage section for storing data, and a processing section for performing data processing and control.

1.2) System Operations

Figure 6:
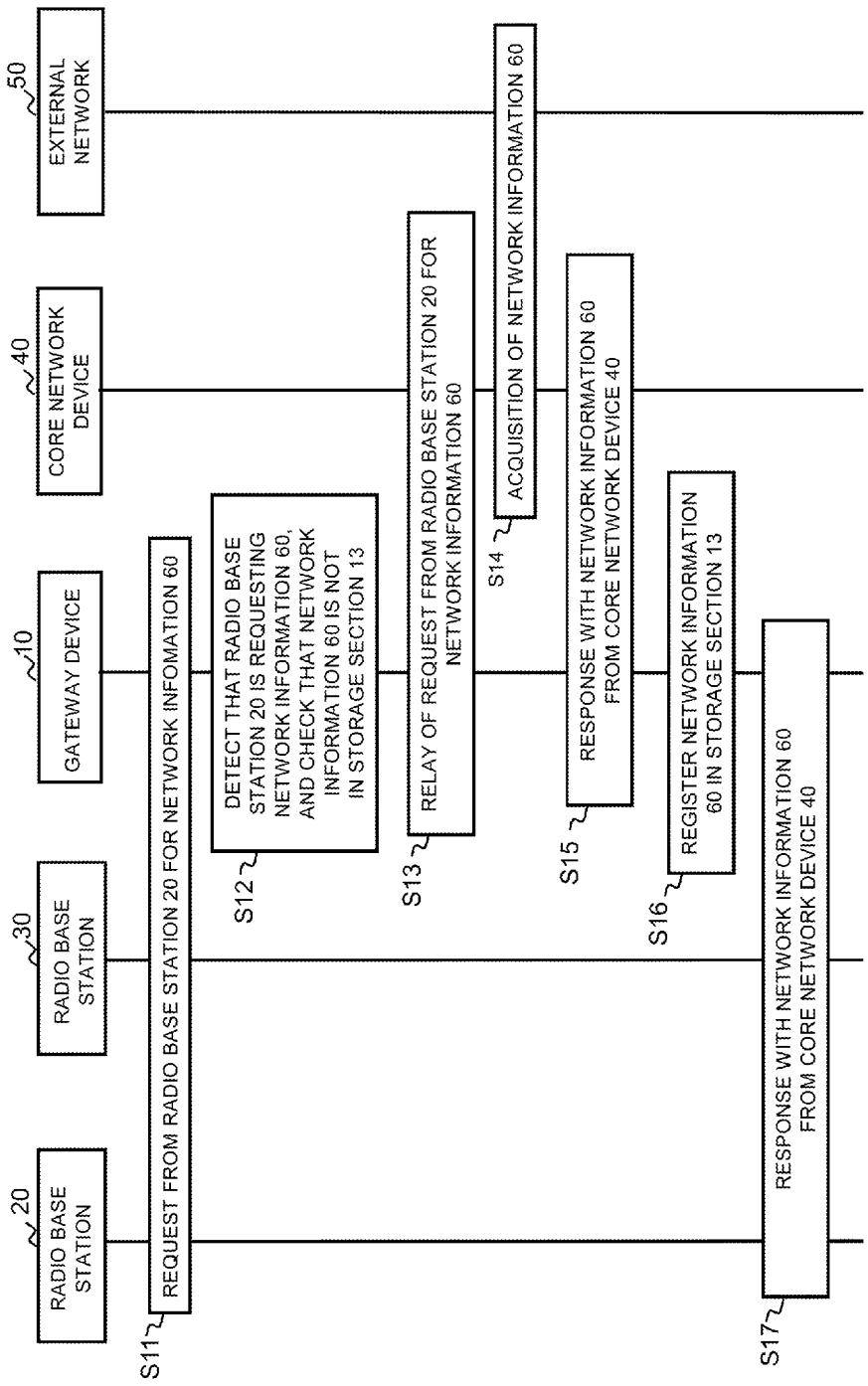
FIG. 6 is a sequence diagram showing operations at the time of acquiring unregistered information, in the communication system according to the first example.

Referring to FIG. 6, in a case where the gateway device 10 does not retain network information 60, the radio base station 20 sends to the gateway device 10 a message for requesting the network information 60 of the core network device 40 (Operation S11).

The gateway device 10, when detecting that the radio base station 20 is requesting the network information 60, checks that the network information 60 is not in the storage section 13 (Operation S12) and transfers the request from the radio base station 20 for the network information 60 to the core network device 40 (Operation S13).

The core network device 40 inquires of the external network 50 about the network information 60 and acquires the network information 60 (Operation S14). The core network device 40 returns a response including the network information 60 to the gateway device 10 (Operation S15).

The gateway device 10 registers the network information 60 included in the response from the core network device 40 in the storage section 13 (Operation S16) and transfers the response from the core network device 40 to the radio base station 20 (Operation S17).

Figure 7:
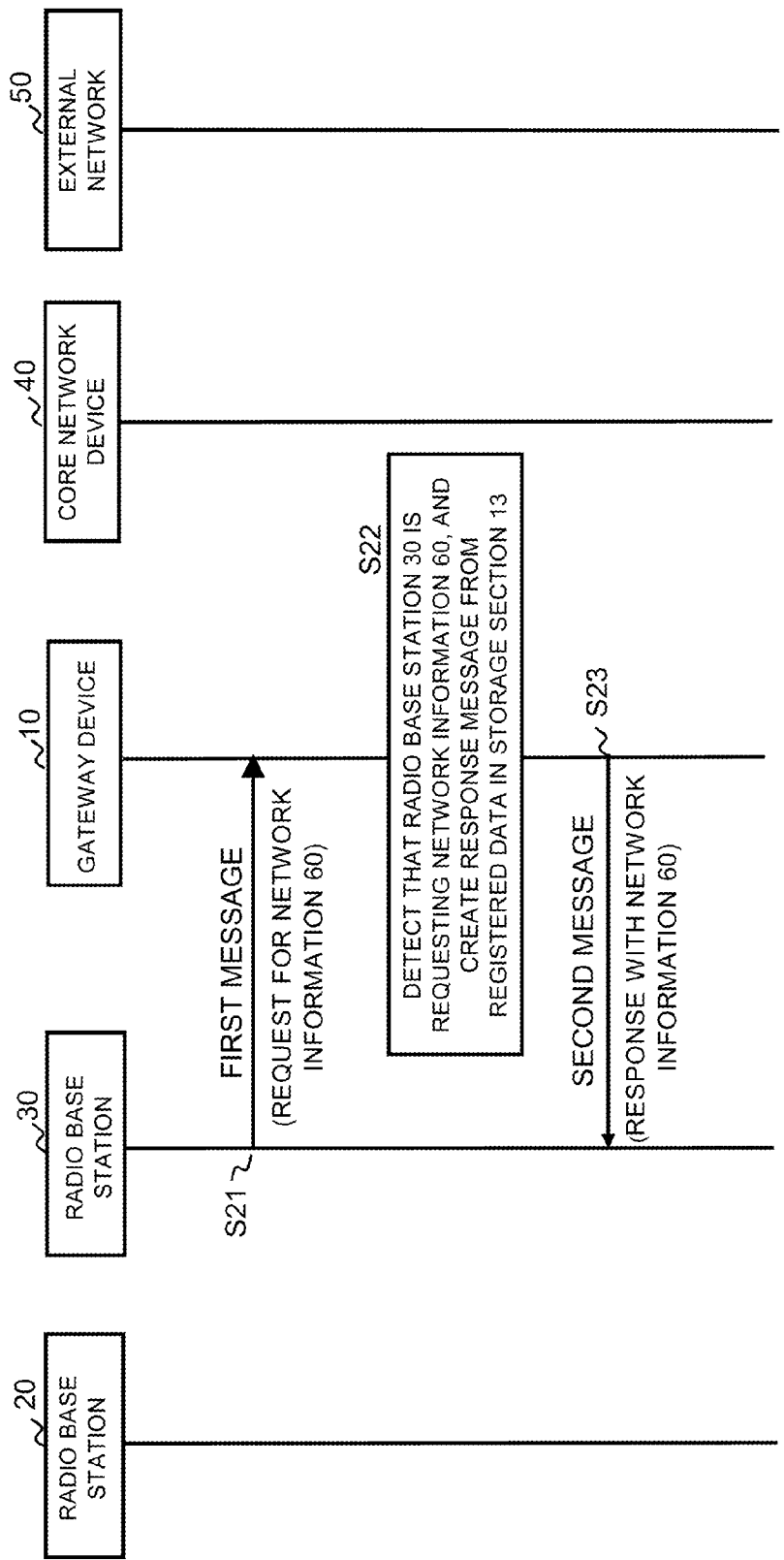
FIG. 7 is a sequence diagram showing operations at the time of returning registered information, in the communication system according to the first example.

Referring to FIG. 7, in a case where the gateway device 10 retains the network information 60, when another radio base station 30 sends a first message for requesting part or all of the network information 60 to the gateway device 10 (Operation S21), the gateway device 10 having detected it creates a response message from the data registered in the storage section 13 (Operation S22). Then, the gateway device 10, without transferring the message to the core network device 40, returns a second message including part or all of the network information 60 to the radio base station 30 as a response message (Operation S23).

1.3) Effects

As described above, according to the first example of the present invention, since messages sent and received between the gateway device 10 and core network device 40 and between the core network device 40 and external network 50 are eliminated, communication load within a telecommunication operator's network is greatly reduced. Moreover, since the gateway device 10 can promptly return a response message to the radio base station 30, the process running at the radio base station 30 can more quickly be completed.

2. Second Example

Since network information registered with the gateway device 10 may be updated on the network side while it is stored, it is necessary to update old information as soon as possible. Accordingly, in a second example of the present invention, a term of validity is set on the network information 60. This term of validity can be set by the external network 50, core network device 40, or gateway device 10.

2.1) Structure

A diagram of a network structure to which the second example is applied is the same as FIG. 5, and therefore a description will be omitted.

2.2) Operations

Figure 8:
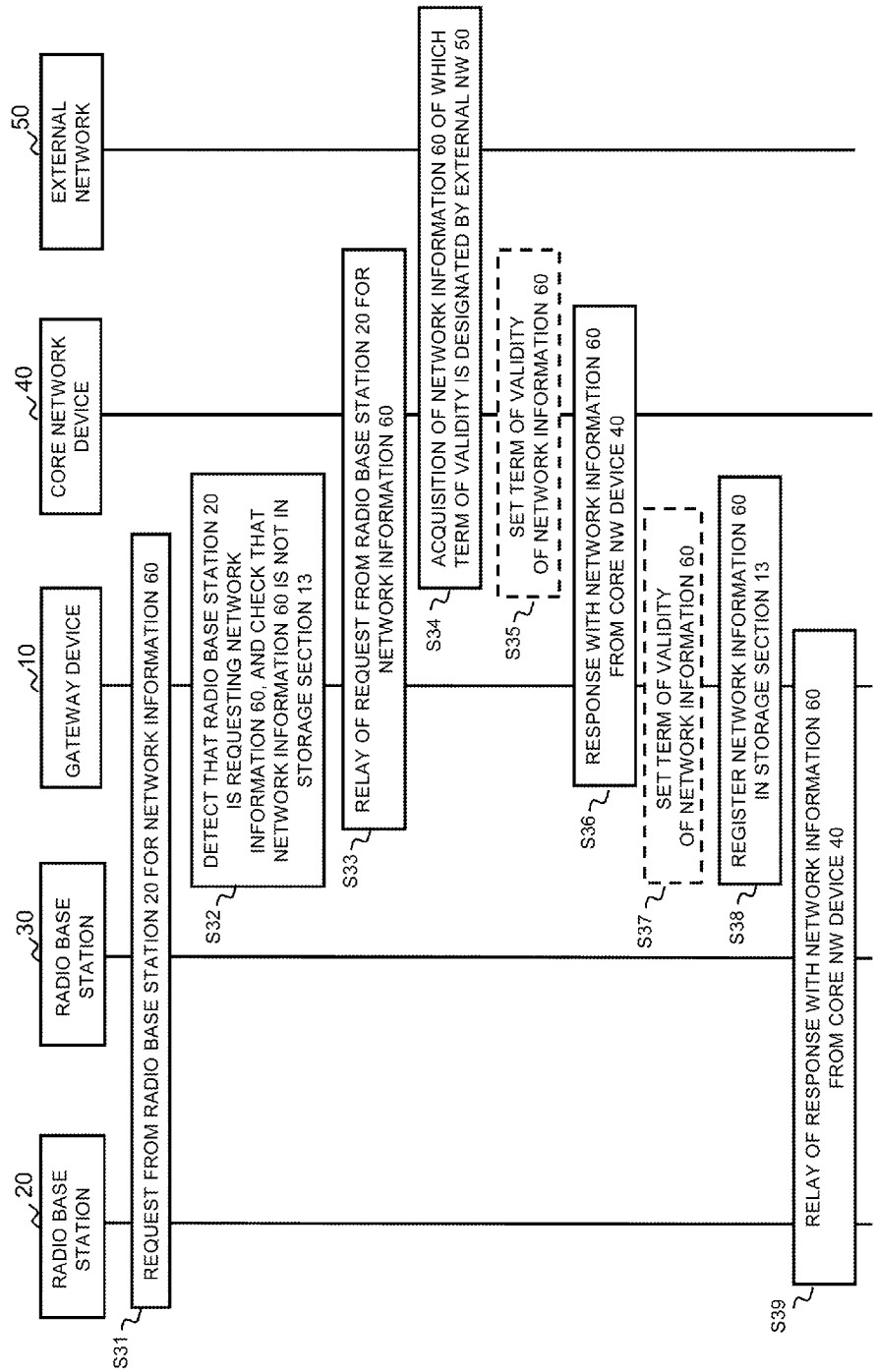
FIG. 8 is a sequence diagram showing operations at the time of acquiring unregistered information, in a communication system according to a second example.

Referring to FIG. 8, in a case where the gateway device 10 does not retain network information 60, the radio base station 20 sends a message for requesting the network information 60 of the core network device 40 to the gateway device 10 (Operation S31).

The gateway device 10, when detecting that the radio base station 20 is requesting the network information 60, checks that the network information 60 is not in the storage section 13 (Operation S32) and transfers the request from the radio base station 20 for the network information 60 to the core network device 40 (Operation S33).

The core network device 40 inquires of the external network 50 about the network information 60 and acquires the network information 60 on which a term of validity is set by the external network 50 (Operation S34). Note that if the term of validity of the network information 60 is not designated by the external network 50, the core network device 40 may set a term of validity on the network information 60 (Operation S35). Subsequently, the core network device 40 returns a response including the network information 60 to the gateway device 10 (Operation S36).

If the term of validity of the network information 60 is not designated, the gateway device having received the response including the network information 60 can set a term of validity on the network information 60 (Operation S37). The gateway device 10 registers the network information 60 included in the received response in the storage section 13 (Operation S38) and transfers the response from the network device 40 to the radio base station 20 (Operation S39).

Figure 9:
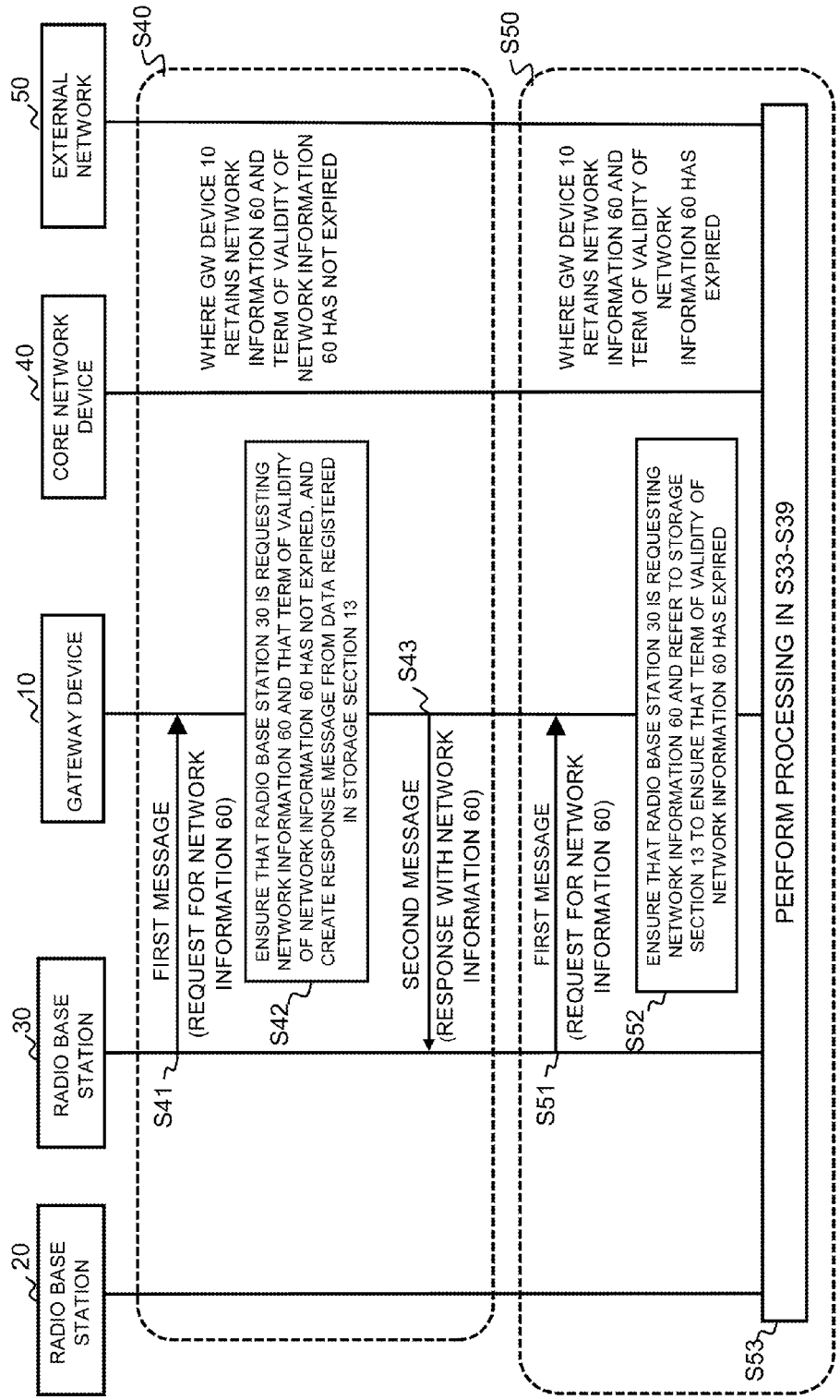
FIG. 9 is a sequence diagram showing operations at the time of returning registered information, in the communication system according to the second example.

In FIG. 9, Operation S40 shows operations in a case where the gateway device 10 retains the network information 60 and the term of validity of the network information 60 has not expired. It is assumed that the radio base station 30 sends a first message for requesting part or all of the network information 60 to the gateway device 10 (Operation S41). In this case, the gateway device 10, when detecting the first message, checks that the term of validity of the network information 60 has not expired and creates a response message from the registered data in the storage section 13 (Operation S42). Then, the gateway device 10, without transferring the request message to the core network device 40, returns a second message including part or all of the network information 60 to the radio base station 30 as a response message (Operation S43).

In FIG. 9, Operation S50 shows operations in a case where the gateway device 10 retains the network information 60 and the term of validity of the network information 60 has expired. It is assumed that the radio base station 30 sends a first message for requesting part or all of the network information 60 to the gateway device 10 (Operation S51). The gateway device 10, after detecting this request, checks that the term of validity of the network information 60 has expired (Operation S52). In this case, the processing at Operations S33 to S39 in FIG. 8 is performed as described already (Operation S53).

As for the term of validity of the network information 60, it can be set on all or part of information elements included in the network information 60. For example, when the network information 60 includes information elements varying from hour to hour, such as received interference power and the number of connected users in the external network, the term of validity information on such information elements of the network information 60 is set short. On the other hand, when the network information 60 includes static or quasi static information elements such as destination address information and cell-specific information in the external network, the terms of validity of such information elements of the network information 60 are set long.

If a term of validity is set on each information element of the network information 60, the procedure of Operation S40 or S50 shown in FIG. 9 may be performed as in any one of the following procedures.

The processing in S40 is performed when, of part or all of the information elements of the network information 60 requested by the radio base station 30, none of those with the terms of validity have expired.

When, of part or all of the information elements of the network information 60 requested by the radio base station 30, part of those with the terms of validity have expired, but the expired information elements are not essential parameters for a response message, then the processing in Operation S40 is performed, without setting the expired information elements in the response message.

The processing in Operation S50 is performed when, of part or all of the information elements of the network information 60 requested by the radio base station 30, part of those with the terms of validity have expired, and the expired information elements are essential parameters for a response message.

2.3) Effects

As described above, according to the second example of the present invention, since a term of validity is set on each piece of information, it is possible to determine whether or not to perform the first example, depending on the purpose of use of information to be provided.

3. Third Example

In the above-mentioned NPL 2, it is defined that a node HeNB-GW may exist between HeNBs and a MME. Before relaying S1AP:ENB DIRECT INFORMATION TRANSFER and S1AP:ENB CONFIGURATION TRANSFER received from a HeNB, the HeNB-GW checks the destinations of the messages and the contents inquired with the messages. When information inquired by anther HeNB is retained in a storage section within the HeNB-GW, the HeNB-GW, without transferring a message, creates a response message from the information in the storage section and sends it as S1AP:MME DIRECT INFORMATION TRANSFER or S1AP:MME CONFIGURATION TRANSFER to the inquirer HeNB. Thus, it is possible to reduce the number of messages sent and received between a MME and an E-UTRAN, between MMEs, between a MME and a SGSN, and between a SGSN and a UTRAN/GERAN, and thus to reduce network load.

In the RIM procedure performed in LTE systems, a HeNB-GW stores received information in a storage section. When the same information is requested, the HeNB-GW reuses that information and directly returns a message to a HeNB, without transmitting any message to a core network device. Thus, the number of signaling operations in a telecommunication operator's network is reduced.

3.1) Structure

Figure 10:
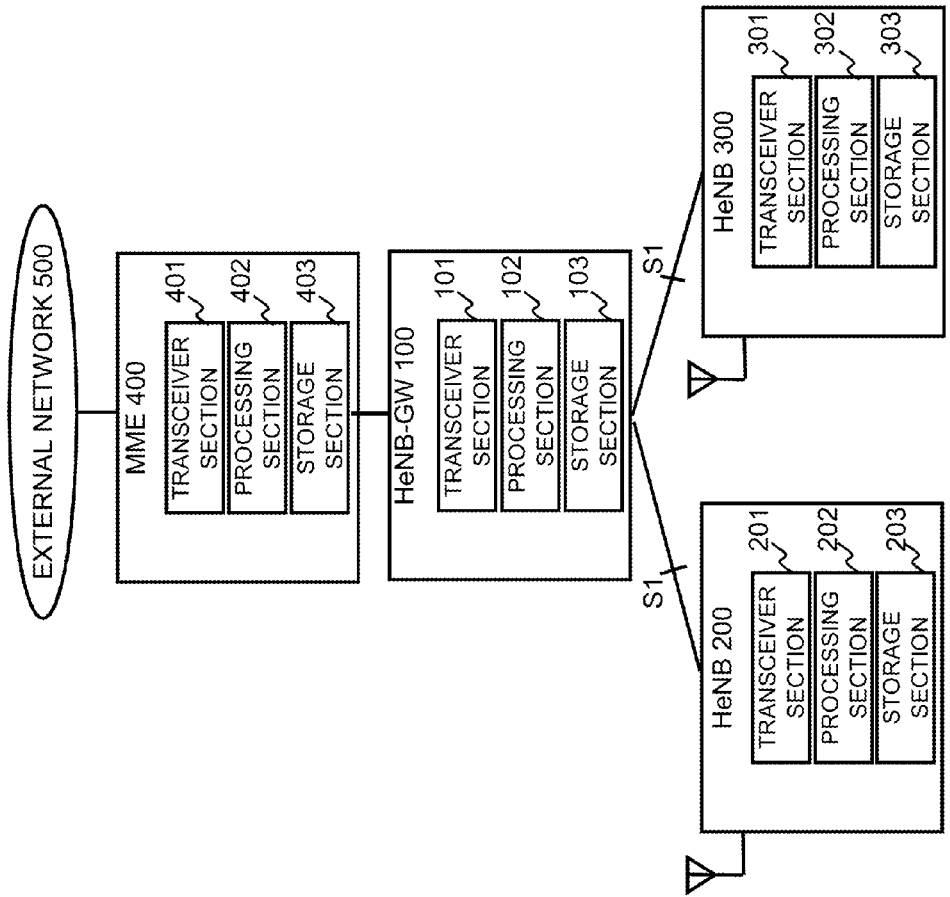
FIG. 10 is a system structure diagram showing a communication system according to a third example of the present invention.

Referring to FIG. 10, in a network to which a third example of the present invention is applied, small base stations (HeNBs) 200 and 300 are accommodated by a HeNB gateway (HeNB-GW) 100 and are connected to an external network 500 via a MME 400. Note that it is assumed that each of the HeNBs, HeNB-GW, and MME in FIG. 10 includes a transceiver section for performing communication, a storage section for storing data, and a processing section for performing data processing and control.

3.2) Operations

In a sequence shown in FIG. 11, "network information 600" refers to network information of GERAN/UTRAN prescribed in 3GPP TS48.018, arbitrary information related to a RAN such as a self-organizing network (hereinafter, SON), or information of CDMA2000 (1×RTT or HRPD), Wireless LAN (WLAN) or the like that is not prescribed by the current 3GPP.

Figure 11:
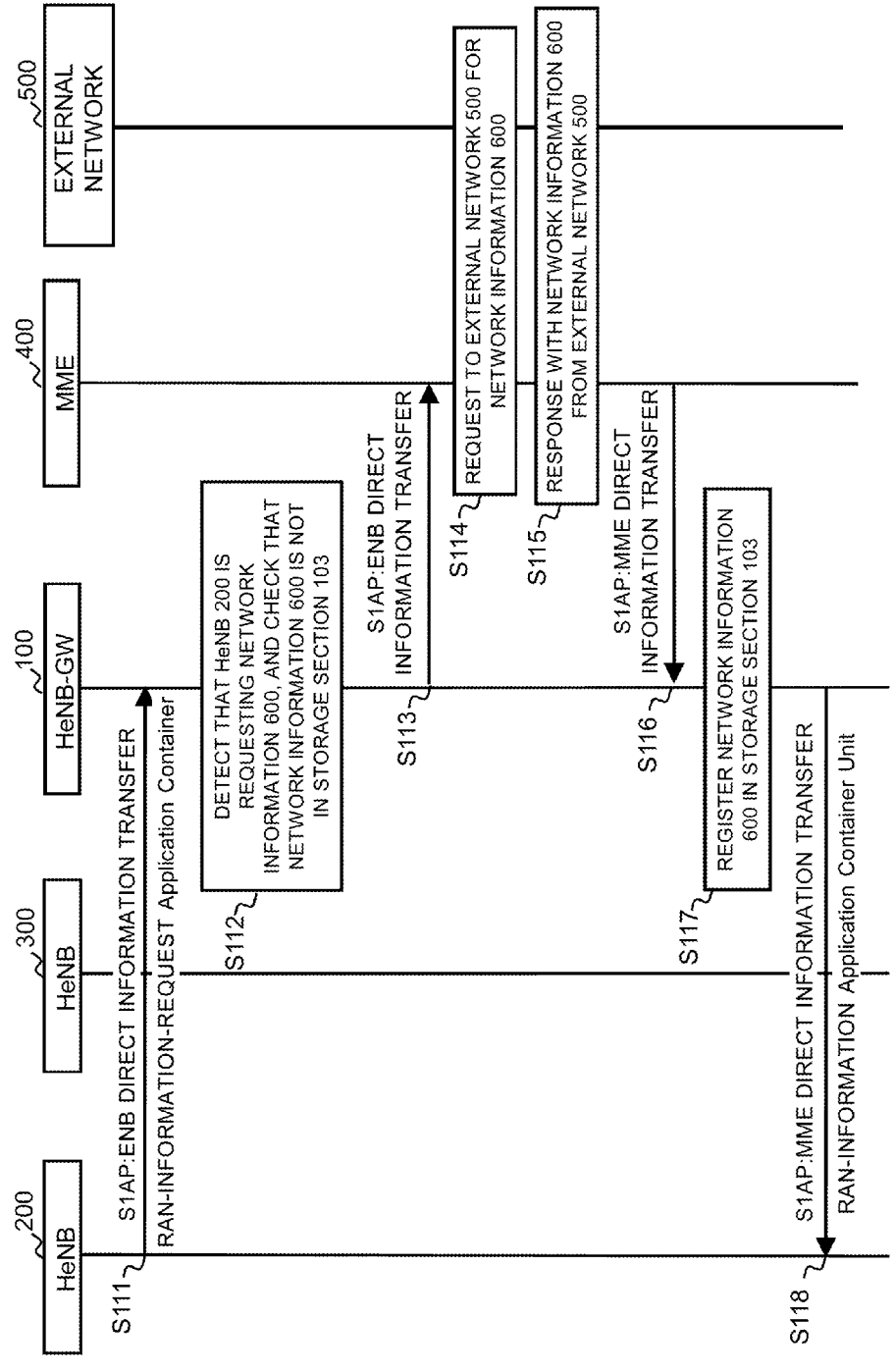
FIG. 11 is a sequence diagram showing operations at the time of acquiring unregistered information, in the communication system according to the third example.

Referring to FIG. 11, in a case where the HeNB-GW 100 does not retain the network information 600, the HeNB 200 sends S1AP:ENB DIRECT INFORMATION TRANSFER to the HeNB-GW 100 (Operation S111). This message includes RAN-INFORMATION-REQUEST Application Container, in which any one or some of the following four elements prescribed in 3GPP TS48.018 and other information of CDMA2000 (1×RTT and HRPD) and Wireless LAN that are not prescribed by the current 3GPP can be contained:

RAN-INFORMATION-REQUEST Application Container for the NACC Application;
RAN-INFORMATION-REQUEST Application Container for the SI3 Application;
RAN-INFORMATION-REQUEST Application Container for the UTRA SI Application; and
RAN-INFORMATION-REQUEST Application Container for the SON Transfer Application.

Here, 001 (RAN-INFORMATION-REQUEST/Single Report PDU) is set in the PDU Type Extension field of RAN-INFORMATION-REQUEST RIM PDU Indications, which is included in the same message.

The HeNB-GW 100 detects from the received S1AP:ENB DIRECT INFORMATION TRANSFER that the HeNB 200 is requesting the network information 600 and, when checking that the network information 600 is not in the storage section 103 (Operation S112), relays S1AP:ENB DIRECT INFORMATION TRANSFER to the MME 400 (Operation S113).

The MME 400 makes a request to the external network 500 for the network information 600 of UTRAN/GERAN (Operation S114) and, when receiving the network information 600 of UTRAN/GERAN from the external network 500 (Operation S115), sends S1AP:MME DIRECT INFORMATION TRANSFER including the network information 600 to the HeNB-GW 100 (Operation S116). Here, 001 (RAN-INFORMATION-REQUEST/Single Report PDU) is set in the PDU Type Extension field of RAN-INFORMATION-REQUEST RIM PDU Indications, which is included in this message.

The HeNB-GW 100 registers the network information 600 in the storage section 103 (Operation S117). This network information 600 includes any one or ones corresponding to the element(s) sent by the radio base station 200 in Operation S111, of the following four elements prescribed in 3GPP TS48.018 and CDMA2000 (1×RTT and HRPD) and Wireless LAN elements that are not prescribed by the current 3GPP:

RAN-INFORMATION Application Container for the NACC Application;
RAN-INFORMATION Application Container for the SI3 Application;
RAN-INFORMATION Application Container for the UTRA SI Application; and
RAN-INFORMATION Application Container for the SON Transfer Application.

The HeNB-GW 100 relays S1AP:MME DIRECT INFORMATION TRANSFER to the HeNB 200 (Operation S118).

Figure 12:
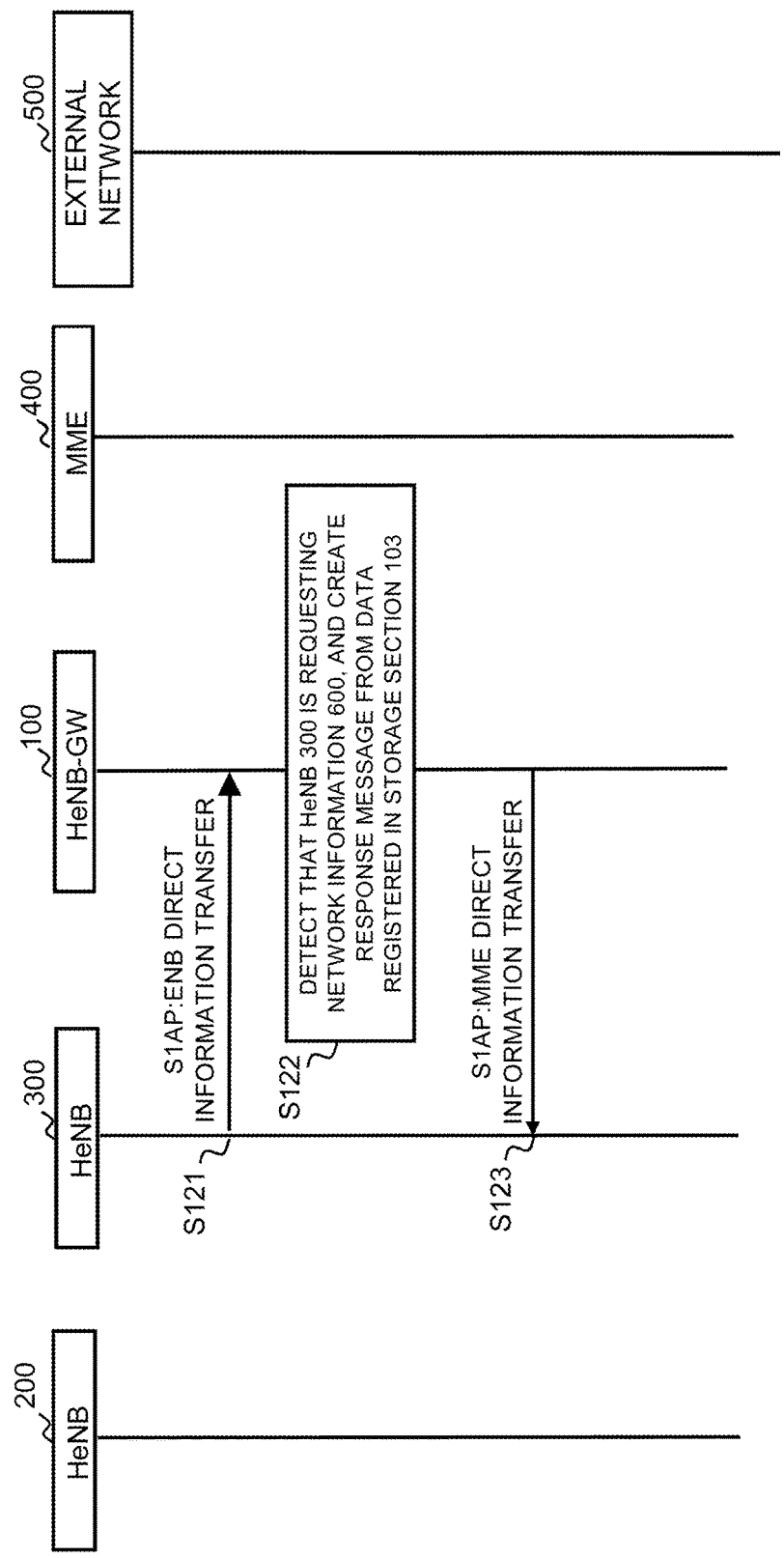
FIG. 12 is a sequence diagram showing operations at the time of returning registered information, in the communication system according to the third example.

Referring to FIG. 12, in a case where the HeNB-GW 100 retains the network information 600, the HeNB 300 sends S1AP:ENB DIRECT INFORMATION TRANSFER to the HeNB-GW 100 (Operation S121). What is requested by the HeNB 300 with this message is part or all of the network information 600 that was requested by the HeNB 200 at Operation S111 in FIG. 11.

The HeNB-GW 100, when detecting that the HeNB 300 is requesting the network information 600, creates a response message based on the registered data in the storage section 103 (Operation S122) and sends S1AP:MME DIRECT INFORMATION TRANSFER to the HeNB 300 (Operation S123). This message includes part or all of the network information 600 requested by the HeNB 300 in Operation S121.

3.3) Effects

As described above, according to the third example of the present invention, messages sent and received between the HeNB-GW 100 and MME 400 and between the MME 400 and external network 500 are eliminated. Consequently, communication load within a telecommunication operator's network is greatly reduced.

Moreover, a procedure for establishing a voice communication of a user who uses an LTE system by using the existing UTRAN or GSM is referred to as Circuit Switched Fallback (hereinafter, CS Fallback). The RIM procedure is one of means for acquiring system information of a destination cell in a UTRAN or GERAN used in this CS Fallback procedure. When this RIM procedure is performed in the CS Fallback procedure, the CS Fallback procedure can be terminated more quickly by applying the present example.

In a procedure called Network Assisted Cell Change (hereinafter, NACC), which assists a user in RRC_CONNECTED state to move to a GSM cell, the RIM procedure can be used to acquire system information of a destination cell. When the RIM procedure is performed during the NACC procedure, NACC can be terminated more quickly by applying the present example.

4. Fourth Example

According to a fourth example of the present invention, in the TNL address discovery procedure performed in LTE systems, a HeNB-GW stores received information in a storage section and reuses the information when the same information is requested. Thus, a message is directly sent to a HeNB without sending any message to a core network device, whereby it is possible to reduce the number of signaling operations within a telecommunication operator's network. A TNL address here is address information as prescribed in 3GPP TS36.413, 9.2.3.29 X2 TNL Configuration Info. Although the TNL address discovery procedure is used in the present example, the present example can also be applied in cases where a HeNB-GW stores "time synchronization information", an information element that can be set in the same S1AP messages as those used in the TNL address discovery procedure. Time synchronization information here is information such as Stratum Level or Synchronization status prescribed in 3GPP TS36.413, 9.2.3.34 Time Synchronization Info.

4.1) Structure

A structure of the present example is the same as that of the third example shown in FIG. 10, and therefore a description will be omitted.

4.2) Operations

Figure 13:
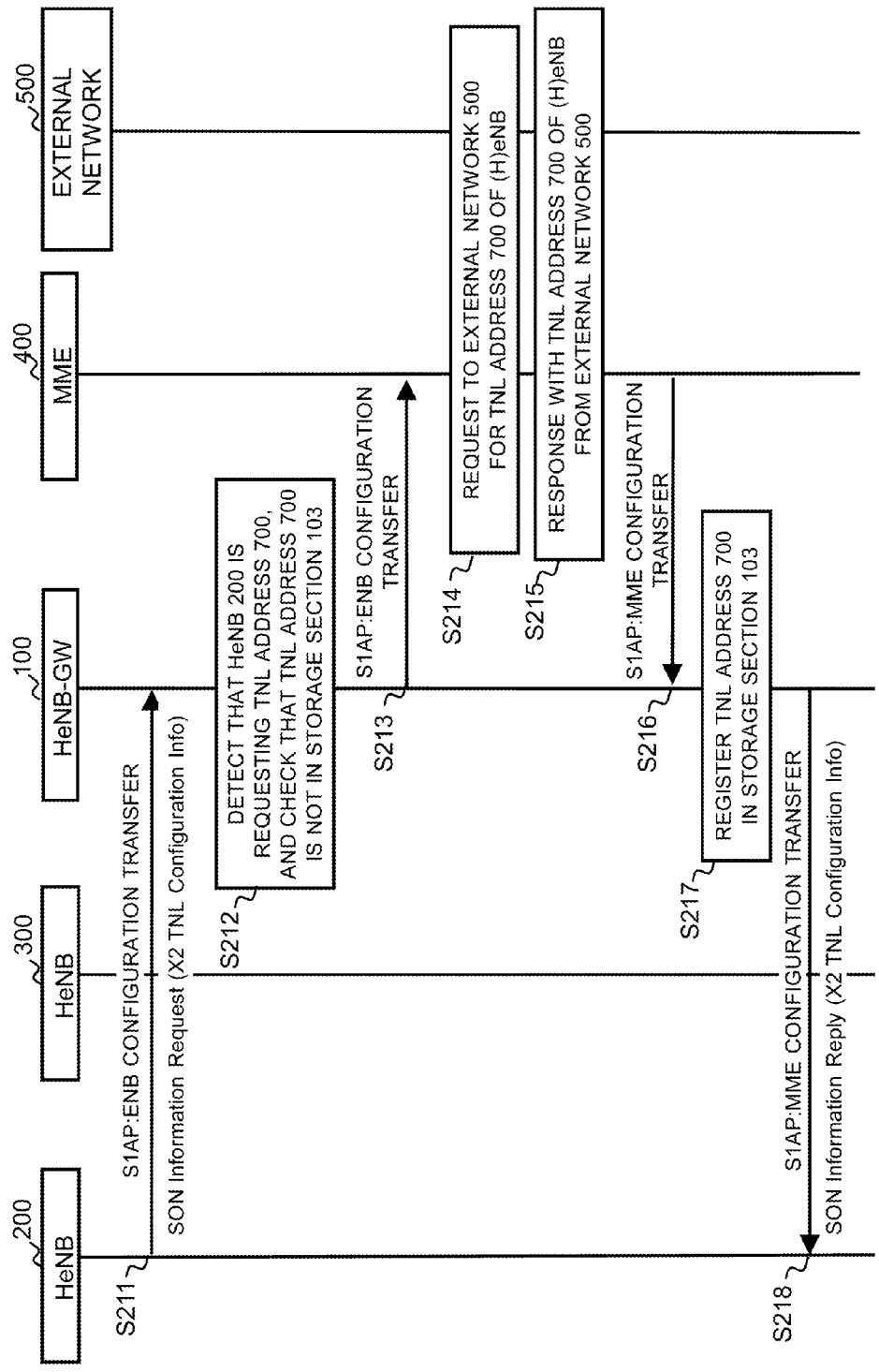
FIG. 13 is a sequence diagram showing operations at the time of acquiring unregistered information, in a communication system according to a fourth example.

Referring to FIG. 13, in a case where the HeNB-GW does not retain a TNL address 700, the HeNB 200 sends S1AP: ENB CONFIGURATION TRANSFER to the HeNB-GW 100 (Operation S211). This message includes SON Information Request (X2 TNL Configuration Info), and the HeNB 200 requests the TNL address 700 of a (H)eNB with this message.

The HeNB-GW 100, when detecting from the received S1AP:ENB CONFIGURATION TRANSFER that the HeNB 200 is requesting the TNL address 700, checks that the TNL address 700 is not in the storage section 103 (Operation S212) and relays S1AP:ENB CONFIGURATION TRANSFER to the MME 400 (Operation S213).

The MME 400 makes a request to the external network 500 for the TNL address 700 of the (H)eNB (Operation S214). Here assumed is a situation in which the HeNB 200 inquires about the TNL address of a (H)eNB that is not managed by the MME 400. However, if the TNL address of a (H)eNB that is managed by the MME400 is inquired about, the MME 400 directly inquires of the (H)eNB about the TNL address 700.

The MME 400 receives a response with the TNL address 700 of the (H)eNB from the external network 500 (Operation S215). Here assumed is a situation in which the HeNB 200 inquires about the TNL address of a (H)eNB that is not managed by the MME 400. However, if the TNL address of a (H)eNB that is managed by the MME400 is returned, the MME 400 receives a result of the inquiry directly made to the (H)eNB by the MME 400. The MME 400 sends S1AP: MME CONFIGURATION TRANSFER including the TNL address 700 to the HeNB-GW 100 (Operation S216).

The HeNB-GW 100 registers the TNL address 700 in the storage section 103 (Operation S217) and relays S1AP: MME CONFIGURATION TRANSFER to the HeNB 200 (Operation S218).

Figure 14:
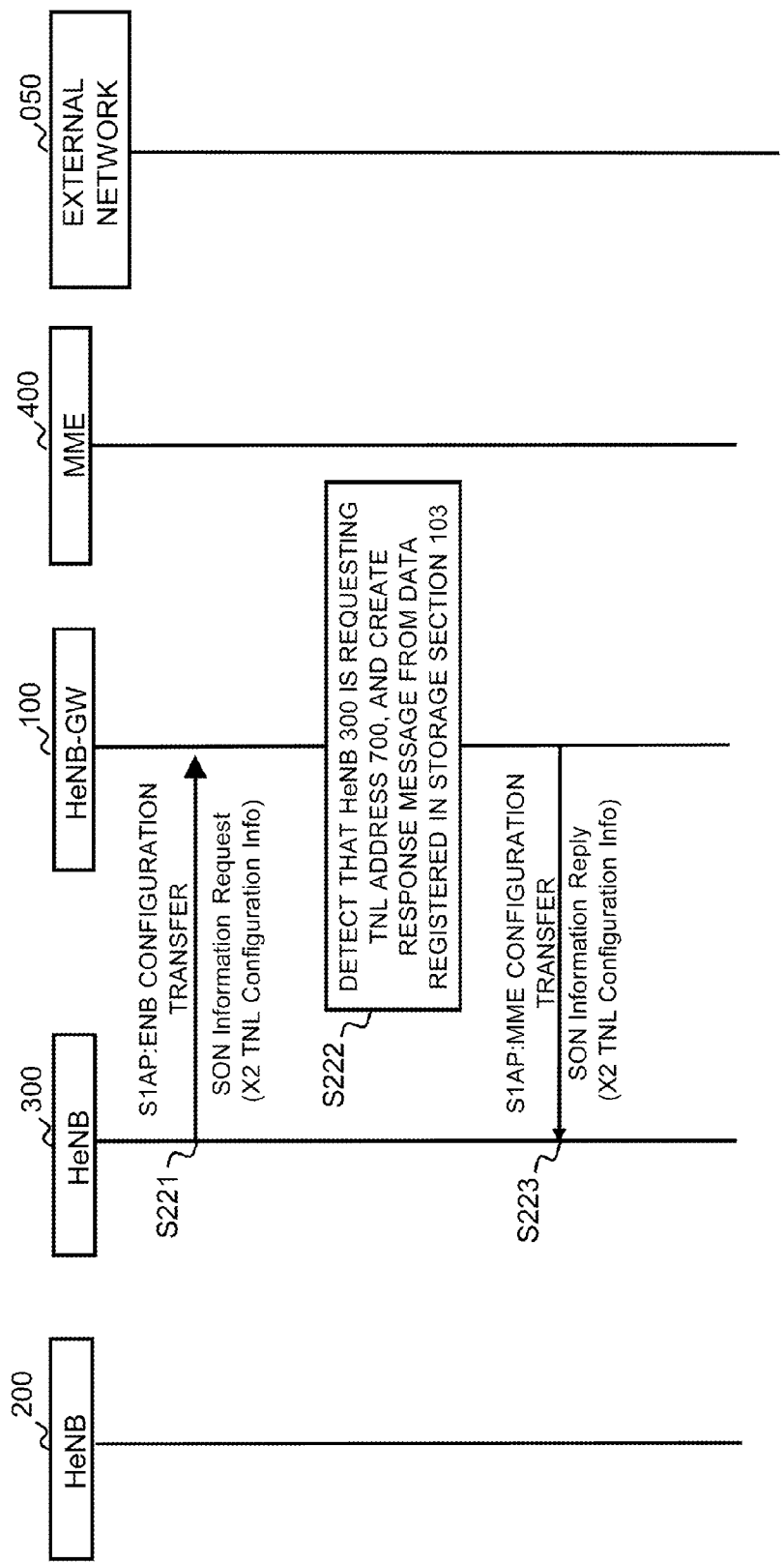
FIG. 14 is a sequence diagram showing operations at the time of returning registered information, in the communication system according to the fourth example.

Referring to FIG. 14, in a case where the HeNB-GW 100 retains the TNL address 700, the HeNB 300 sends S1AP: ENB CONFIGURATION TRANSFER to the HeNB-GW 100 (Operation S221). What is requested by the HeNB 300 with this message is part or all of the TNL address 700 that was requested by the HeNB 200 at Operation S211 in FIG. 13.

The HeNB-GW 100, when detecting that the HeNB 300 is requesting part or all of the TNL address 700, creates a response message from the registered data in the storage section 103 (Operation S222). Then, the HeNB-GW 100 sends S1AP:MME CONFIGURATION TRANSFER to the HeNB 300 (Operation S223). This message includes part or all of the TNL address 700 requested by the HeNB 300 in Operation S221.

4.3) Effects

According to the fourth example of the present invention, messages sent and received between the HeNB-GW 100 and MME 400 and between the MME 400 and external network 500 are eliminated, whereby communication load within a telecommunication operator's network is greatly reduced. The HeNB-GW 100 promptly returns a TNL address discovery response to the HeNB 300, whereby the HeNB 300 can more quickly establish an X2 interface with a (H)eNB. Moreover, the HeNB-GW 100 more promptly returns Time Synchronization Info to the HeNB 300, whereby the HeNB 300 can more quickly perform network listening and achieve wireless synchronization.

5. Fifth Example

According to a fifth example of the present invention, a logical node, namely X2-GW, which has a function of aggregating X2 interfaces of HeNBs, is introduced in 3GPP TR37.803. In a case where N (H)eNBs perform communication using X2AP protocol messages, N X2 interfaces are needed when this node is introduced, but $_nC_2$ X2 interfaces are needed if this node is not present. Accordingly, it can be said that the introduction of this node is notably effective in the light of throughput and resources. When (H)eNBs exchange information about the state of use of resources via this node, the X2-GW stores the information, whereby the X2-GW creates and sends a response message when it receives an inquiry about the same information, whereby the number of signaling operations within a telecommunication operator is reduced. Hereinafter, information about the state of use of resources will be referred to as Resource Status. This refers to an information element included in Cell Measurement Result, which is included in 3GPP TS36.423, "9.1.2.14 RESOURCE STATUS UPDATE".

5.1) Structure

Figure 15:
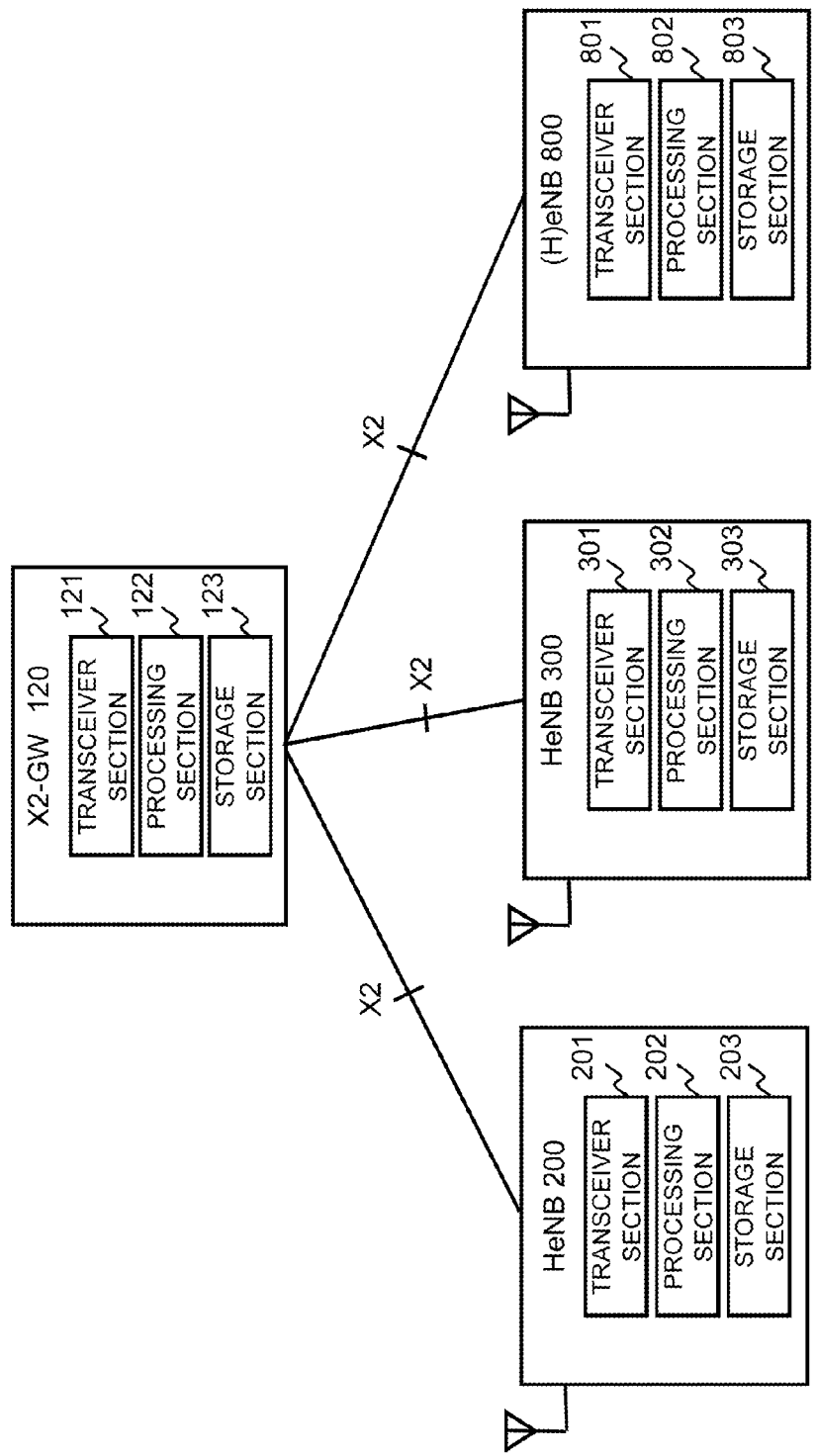
FIG. 15 is a system structure diagram showing a communication system according to a fifth example of the present invention.

Referring to FIG. 15, in a network to which the fifth example of the present invention is applied, it is assumed that HeNBs 200 and 300 and a (H)eNB 800 are accommodated by an X2-GW 120.

5.2) Operations

Figure 16:
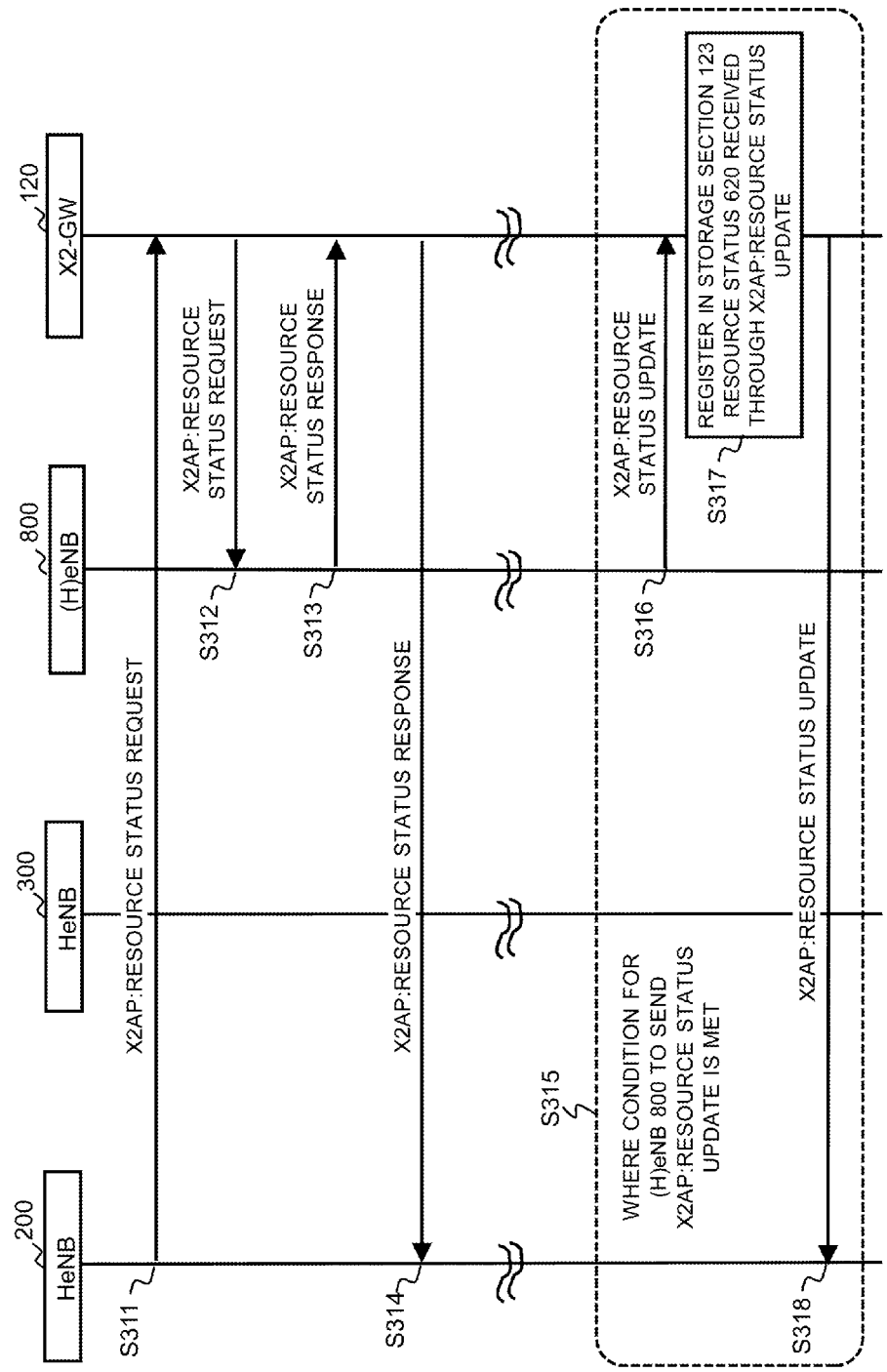
FIG. 16 is a sequence diagram showing operations at the time of acquiring unregistered information, in the communication system according to the fifth example.

Referring to FIG. 16, in a case where a procedure of inquiry from the HeNB 200 succeeds in a state where the X2-GW 120 does not retain Resource Status 620 of the (H)eNB 800, the HeNB 200 sends X2AP:RESOURCE STATUS REQUEST to the (H)eNB 800 (Operation S311). The X2-GW 120 to relay this message receives this message. The HeNB 200 requests the Resource Status 620 of the (H)eNB 800 with this message.

The X2-GW 120 relays X2AP:RESOURCE STATUS REQUEST to the (H)eNB 800 (Operation S312), and the (H)eNB 800 sends X2AP:RESOURCE STATUS RESPONSE to the HeNB 200 (Operation S313). The X2-GW 120, when receiving this message, relays X2AP: RESOURCE STATUS RESPONSE to the HeNB 200 (Operation S314).

When a condition for the (H)eNB 800 to send X2AP: RESOURCE STATUS UPDATE is satisfied (S315), the (H)eNB 800 sends X2AP:RESOURCE STATUS UPDATE to the X2-GW 120 (Operation S316). The X2-GW 120 registers in the storage section 130 the Resource Status 620 included in X2AP:RESOURCE STATUS UPDATE received from the (H)eNB 800 (Operation S317) and relays X2AP:RESOURCE STATUS UPDATE to the HeNB 200 (Operation S318).

Figure 17:
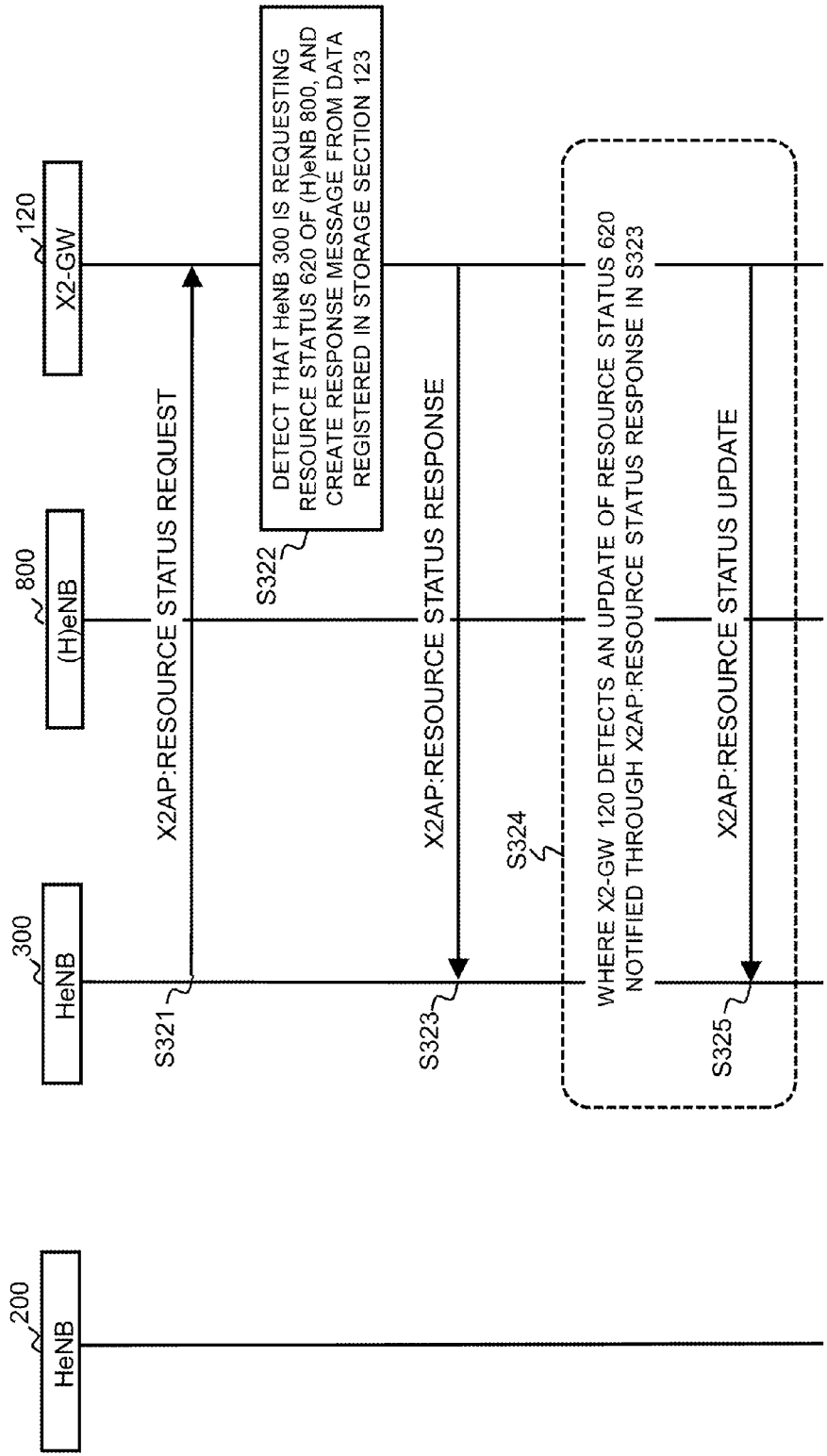
FIG. 17 is a sequence diagram showing operations at the time of returning registered information, in the communication system according to the fifth example.

Referring to FIG. 17, in a case where the Resource Status 620 of the (H)eNB 800 is requested by the HeNB 300 after the procedure of inquiry about the Resource Status of the (H)eNB 800 has succeeded, the HeNB 300 sends X2AP: RESOURECE STATUS REQUEST to the (H)eNB 800 (Operation S321). The X2-GW 120 aggregating X2 interfaces receives this message. It is assumed that the information requested by the HeNB 300 with this message is part or all of the Resource Status 620 that was requested by the HeNB 200 at Operation S311 in FIG. 16.

The X2-GW 120, when detecting that the HeNB 300 is requesting part or all of the Resource Status 620 of the (H)eNB 800, creates a response message based on the registered data in the storage section 130 (Operation S322) and sends X2AP:RESOURCE STATUS RESPONSE to the HeNB 300 (Operation S323).

When the X2-GW 120 detects that part or all of the Resource Status 620 notified with X2AP:RESOURECE STATUS RESPONSE in Operation S323 has been updated (Operation S324), the X2-GW 120 sends X2AP:RE-SOURCE STATUS UPDATE including part or all of the Resource Status 620 updated to the HeNB 300 (Operation S325). Note that the X2-GW 120 may be configured to store a HeNB that requested the Resource Status 620 of the (H)eNB 800 in the past (in the present embodiment, the HeNB 200 in FIG. 16). Then, the X2-GW 120 may also send the X2AP:RESOURCE STATUS UPDATE message in Operation S325 to the HeNB that requested the Resource Status 620 of the (H)eNB 800 in the past.

5.3) Effects

As described above, according to the fifth example of the present invention, the number of X2AP:RESOURCE STATUS REQUEST and X2AP:RESOURCE STATUS RESPONSE messages within a telecommunication operator's network is reduced, and consequently it is possible to reduce network load. Moreover, the X2-GW 120 more promptly returns a Resource Status response to the HeNB 300, whereby the HeNB 300 can more quickly perform load balancing processing and thus can avoid a situation where it fails to accept a new call.

6. Sixth Example

In the above-described fifth example, X2AP:RESOURCE STATUS REQUESTs and corresponding X2AP:RE-SOURCE STATUS RESPONSEs are reduced. In a sixth example of the present invention, X2AP:RESOURCE STATUS REQUESTs and corresponding X2AP:RESOURCE STATUS FAILUREs are reduced. In the following, a HeNB-GW stores and reuses failure information included in X2AP: RESOURCE STATUS FAILURE. Failure information here is Cause, Criticality Diagnostics, or Complete Failure Cause Information Item included in 3GPP TS36.423, "9.1.2.13 RESOURCE STATUS FAILURE".

6.1) Structure

A network structure to which the sixth example is applied is the same as that of the fifth example shown in FIG. 15, and therefore a description will be omitted.

6.2) Operations

Figure 18:
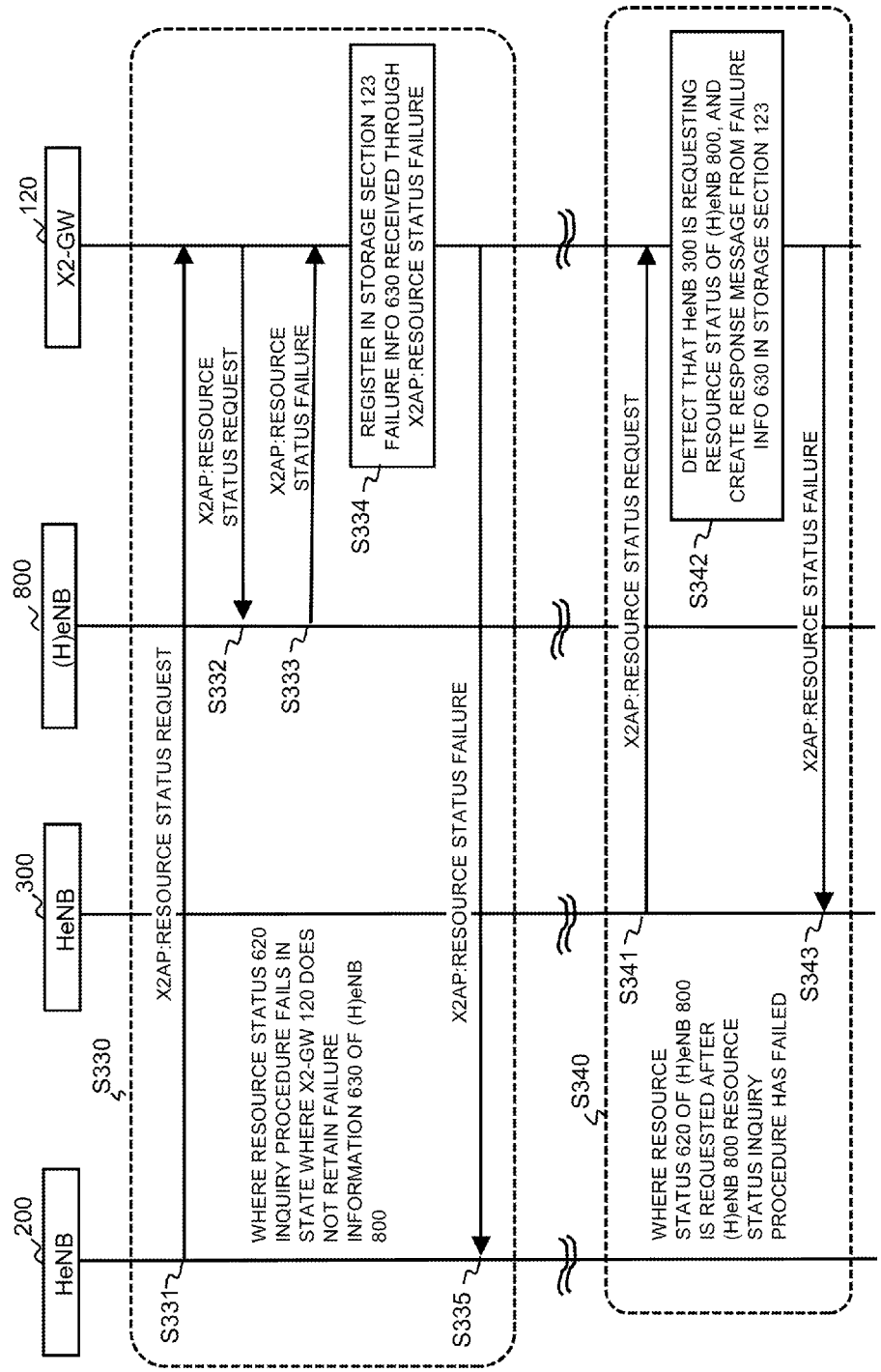
FIG. 18 is a sequence diagram showing operations at the time of acquiring unregistered information, in a communication system according to a sixth example.

Referring to FIG. 18, Operation S330 shows a case where a procedure of inquiry from the HeNB 200 about the Resource Status 620 fails in a state where the X2-GW 120 does not retain failure information 630 of the (H)eNB 800. The HeNB 200 sends X2AP:RESOURCE STATUS REQUEST to the (H)eNB 800 (Operation S331). The X2-GW 120, when receiving this message, relays X2AP: RESOURCE STATUS REQUEST to the (H)eNB 800 (Operation S332).

When the (H)eNB 800 sends X2AP:RESOURCE STATUS FAILURE to the HeNB 200 (Operation S333), the X2-GW 120 having received this message registers the failure information 630 received with X2AP:RESOURCE STATUS FAILURE in the storage section 123 (Operation S334) and relays X2AP:RESOURCE STATUS FAILURE to the HeNB 200 (Operation S335).

Operation S340 shows a case where the Resource Status 620 of the (H)eNB 800 is requested by the HeNB 300 after the procedure of inquiry about the Resource Status of the (H)eNB 800 has failed. The HeNB 300 sends X2AP:RE-SOURECE STATUS REQUEST to the (H)eNB 800, and the X2-GW 120 aggregating X2 interfaces receives this message (Operation S341). It is assumed that what is requested by the HeNB 300 with this message is part or all of the Resource Status 620 that was requested by the HeNB 200 in Operation S331.

The X2-GW 120, when detecting that the HeNB 300 is requesting the Resource Status 620 of the (H)eNB 800, creates a response message by using the failure information 630 in the storage section 123 (Operation S342) and sends X2AP:RESOURCE STATUS FAILURE to the HeNB 300 (Operation S343).

6.3) Effects

According to the sixth example of the present invention, the number of X2AP:RESOURCE STATUS REQUEST and X2AP:RESOURCE STATUS FAILURE messages within a telecommunication operator's network is reduced, and consequently it is possible to reduce network load.

7. Seventh Example

In a seventh example of the present invention, at a HNB-GW accommodating HNBs, information included in a message sent and received between a HNB and a core network is stored in a storage section of the HNB-GW and reused when the same information is inquired, whereby communication load within a telecommunication operator's network is suppressed.

7.1) Structure

Figure 19:
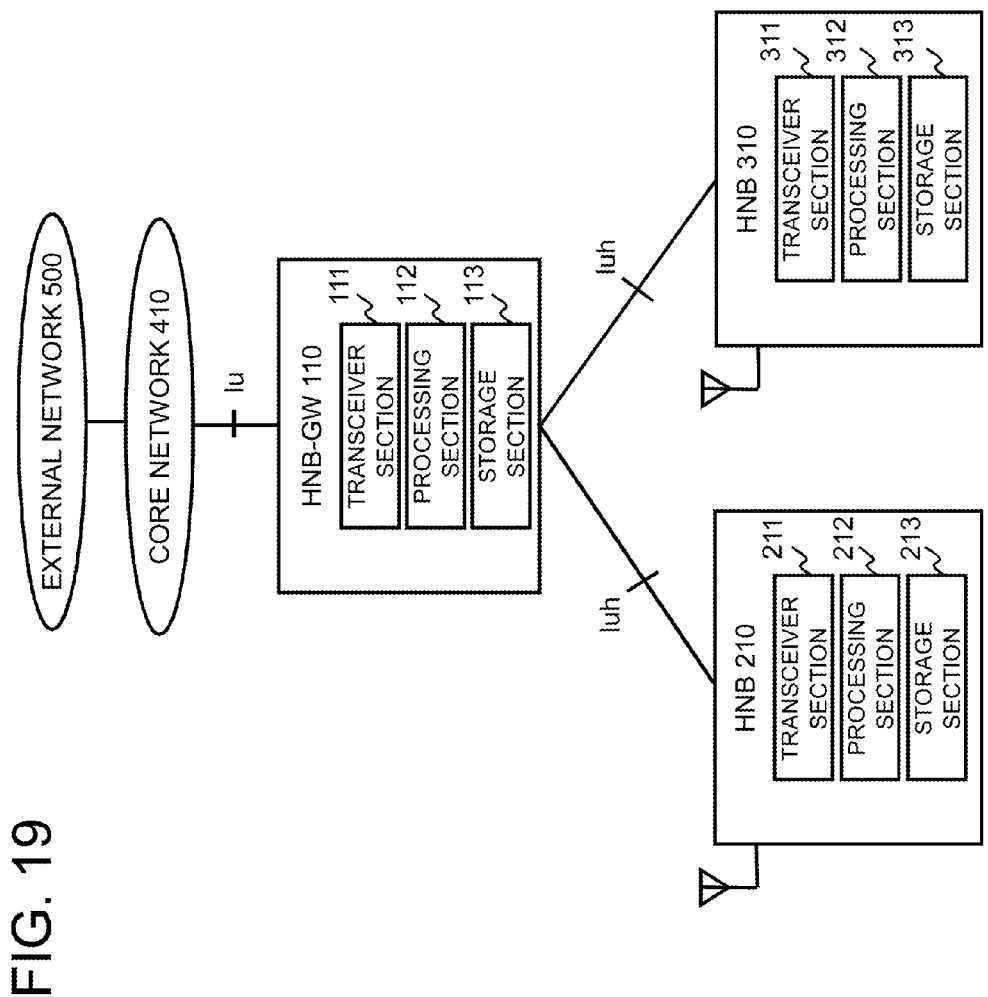
FIG. 19 is a system structure diagram showing a communication system according to a seventh example of the present invention.

Referring to FIG. 19, in a network to which the seventh example is applied, it is assumed that each of HNBs 210 and 310 is connected to a HNB-GW 110 through an Iuh interface, and that the HNB-GW 110 is connected to a core network 410 through an Iu interface.

7.2) Operations

Figure 20:
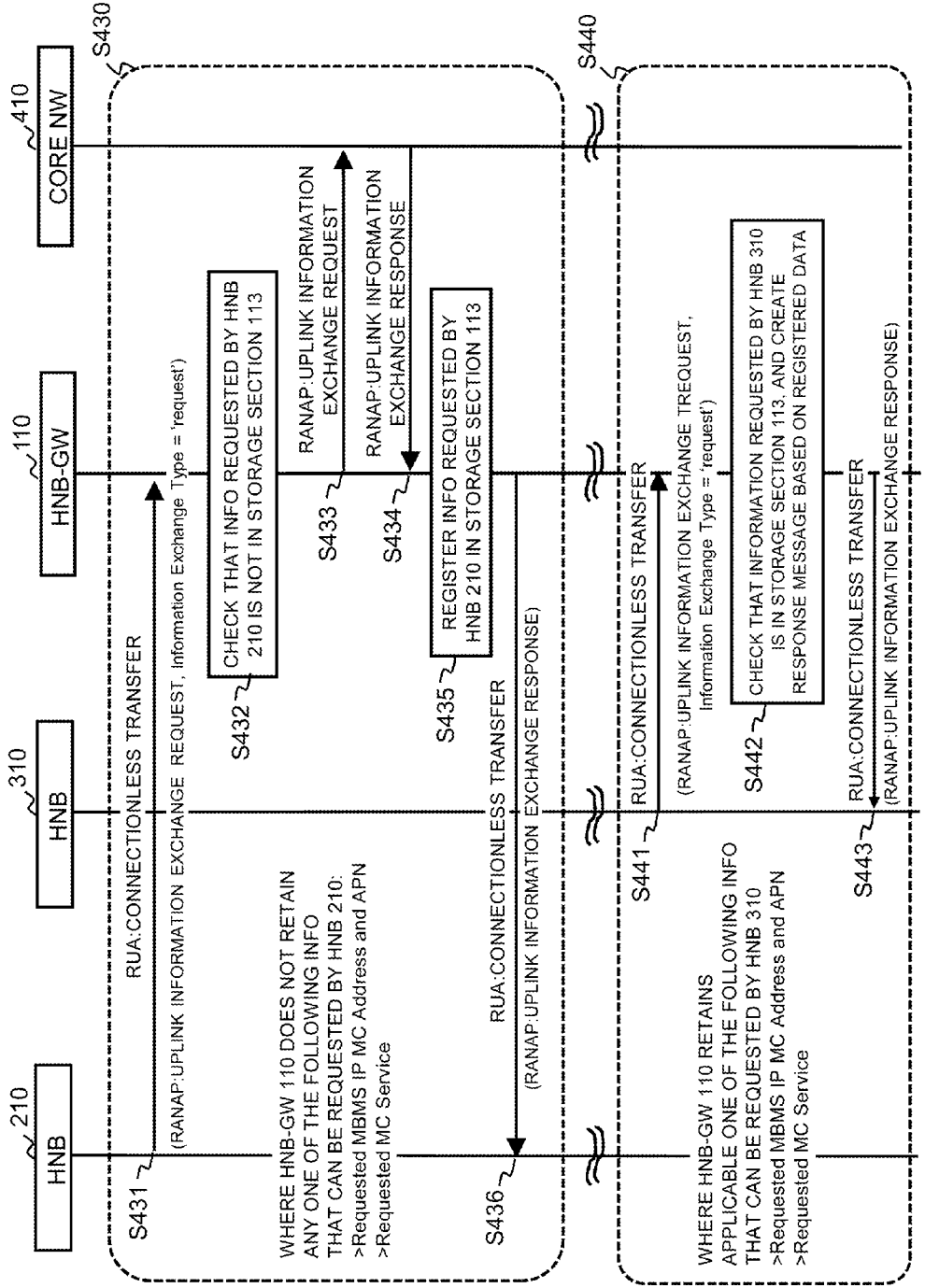
FIG. 20 is a sequence diagram showing operations in the communication system according to the seventh example.

Referring to FIG. 20, in a case where the HNB-GW 110 does not retain any of the following information that can be requested by the HNB 210: Requested MBMS IP MC Address and APN; and Requested MC Service (Operation S430), it is assumed that the HNB 210 sends RUA:CON-NECTIONLESS TRANSFER to the HNB-GW 110 (Operation S431). This message includes RANAP:UPLINK INFORMATION EXCHANGE REQUEST (Information Exchange Type='request').

The HNB-GW 110, when checking that the information requested by the HNB 210 is not in the storages section 113 (Operation S432), sends RANAP:UPLINK INFORMA-TION EXCHANGE REQUEST to the core network 410 (Operation S433) and receives RANAP:UPLINK INFOR-MATION EXCHANGE RESPONSE from the core network 410 (Operation S434). Subsequently, the HNB-GW 110 registers the information requested by the HNB 210 in the storage section 113 (Operation S435) and sends RUA: CONNECTIONLESS TRANSFER to the HNB 210 (Operation S436). This message includes RANAP:UPLINK INFORMATION EXCHANGE RESPONSE.

Moreover, in a case where the HNB-GW 110 retains relevant one of the following information that can be requested by the HNB 310: Requested MBMS IP MC Address and APN; and Requested MC Service (S440), it is assumed that the HNB 310 sends RUA:CONNECTIONLESS TRANSFER to the HNB-GW 110 (Operation S441). It is assumed that what is requested with this message is part or all of the information that was requested in S431.

The HNB-GW 110, when checking that the information requested by the HNB 310 is in the storage section 113, creates a response message based on the registered data (Operation S442) and sends RUA:CONNECTIONLESS TRANSFER to the HNB 310 (Operation S443).

7.3) Effects

According to the seventh example of the present invention, signaling between the HNB-GW 110 and core network 410 is eliminated, whereby communication load within a telecommunication operator's network can be reduced. Moreover, the HNB-GW 110 more promptly responds to the HNB 310, whereby processing running at the HNB 310 can more quickly be completed.

8. Eighth Example

According to an eighth example of the present invention, in the RIM procedure, a HNB-GW registers the content of an inquiry made by a HNB in a storage section and, when the same information is requested by another HNB, uses that information to create and send a response message, whereby communication load within a network is reduced.

8.1) Structure

A network structure to which the eighth example can be applied is as shown in FIG. 19, and therefore a description will be omitted.

8.2) Operations

Figure 21:
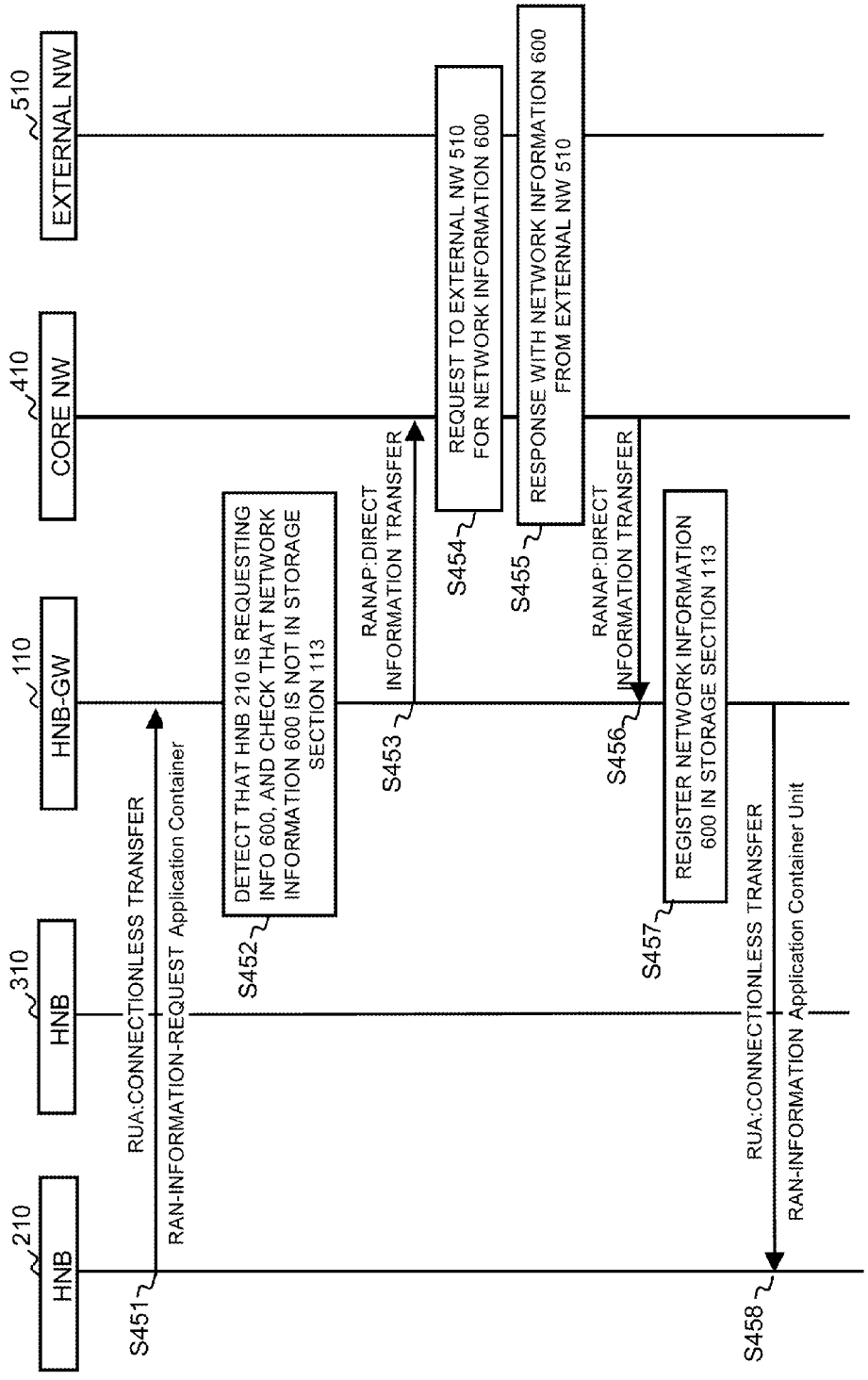
FIG. 21 is a sequence diagram showing operations at the time of acquiring unregistered information, in a communication system according to an eighth example.

Referring to FIG. 21, in a case where the HNB-GW 110 does not retain network information 600, it is assumed that the HNB 210 sends RUA:CONNECTIONLESS TRANSFER to the HNB-GW 110 (Operation S451). This message includes RANAP:DIRECT INFORMATION TRANSFER. In this message, RAN-INFORMATION-REQUEST Application Container is included, and what is inquired among the information elements included in this container will be referred to as network information 600 here. The network information 600 can include any one or some of the following four elements prescribed in 3GPP TS48.018 and other information of CDMA2000 (1×RTT and HRPD) and Wireless LAN that are not prescribed by the current 3GPP:

RAN-INFORMATION-REQUEST Application Container for the NACC Application;
RAN-INFORMATION-REQUEST Application Container for the SI3 Application;
RAN-INFORMATION-REQUEST Application Container for the UTRA SI Application; and
RAN-INFORMATION-REQUEST Application Container for the SON Transfer Application.

Here, 001 (RAN-INFORMATION-REQUEST/Single Report PDU) is set in the PDU Type Extension field of RAN-INFORMATION-REQUEST RIM PDU Indications, which is included in the same message.

The HNB-GW 100, when detecting from the received RUA:CONNECTIONLESS TRANSFER that the HNB 210 is requesting the network information 600, checks that the network information 600 is not in the storage section 113 (Operation S452) and sends RANAP:DIRECT INFORMATION TRANSFER to the core network 410 (Operation S453).

The core network 410, when receiving RANAP:DIRECT INFORMATION TRANSFER, makes a request to the external network 510 for the network information 600 (Operation S454) and acquires the network information 600 from the external network 510 (Operation S455). Then, the core network 410 sends RANAP:DIRECT INFORMATION TRANSFER including the network information 600 (Operation S456). Here, 001 (RAN-INFORMATION-REQUEST/ Single Report PDU) is set in the PDU Type Extension field of RAN-INFORMATION-REQUEST RIM PDU Indications, which is included in this message.

The HNB-GW 110, when receiving RANAP:DIRECT INFORMATION TRANSFER, registers the network information 600 included in it in the storage section 113 (Operation S457) and sends RUA:CONNECTIONLESS TRANSFER including RANAP:DIRECT INFORMATION TRANSFER to the radio base station 200 (Operation S458). This network information 600 includes one or ones corresponding to the element(s) sent by the radio base station 200 in Operation S451, of the following four elements prescribed in 3GPP TS48.018 and CDMA2000 (1×RTT and HRPD) and Wireless LAN elements that are not prescribed by the current 3GPP:

RAN-INFORMATION Application Container for the NACC Application;
RAN-INFORMATION Application Container for the SI3 Application;
RAN-INFORMATION Application Container for the UTRA SI Application; and
RAN-INFORMATION Application Container for the SON Transfer Application.

Figure 22:
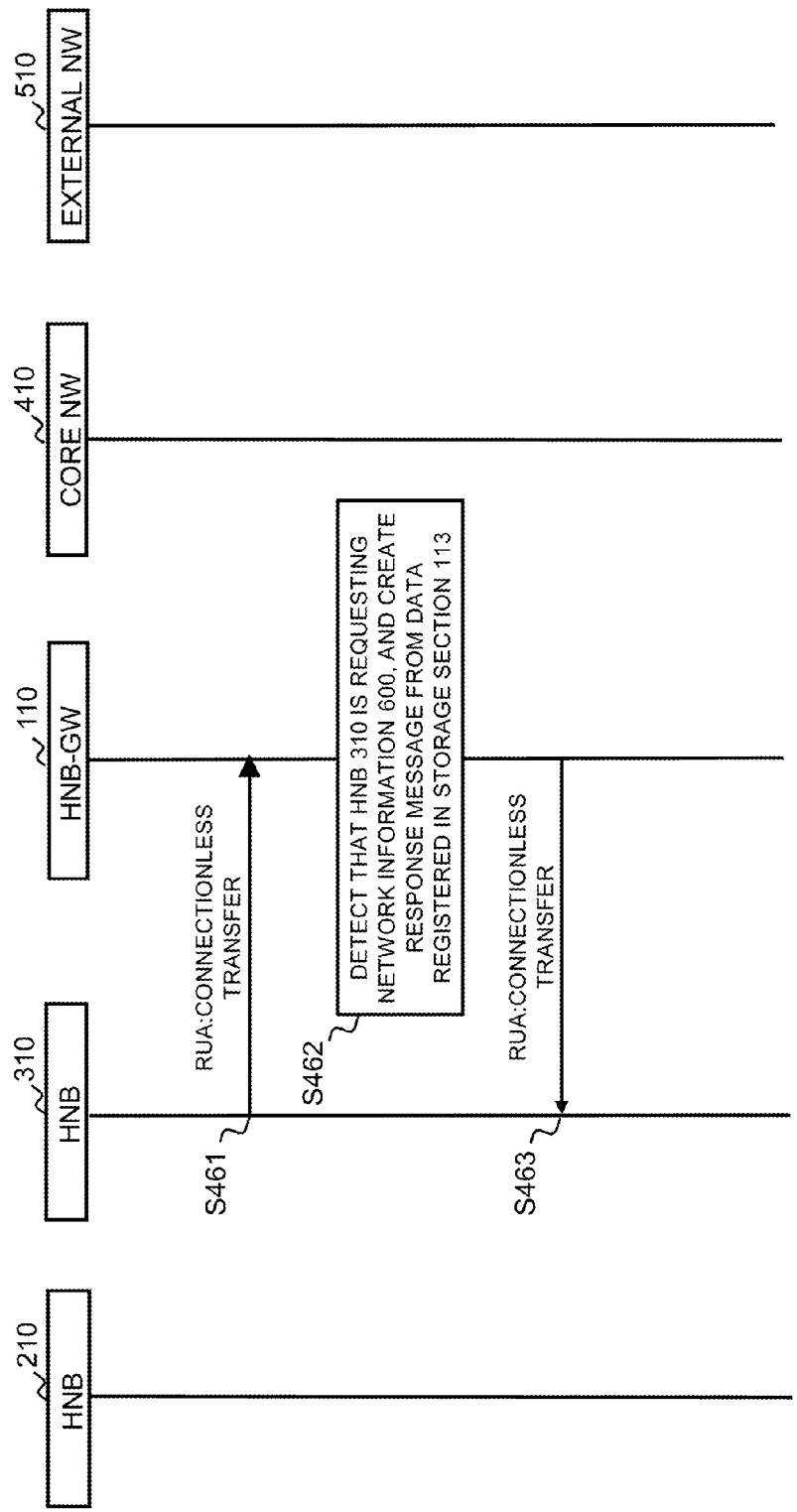
FIG. 22 is a sequence diagram showing operations at the time of returning registered information, in the communication system according to the eighth example.

Referring to FIG. 22, in a case where the HNB-GW 110 retains the network information 600, it is assumed that the HNB 310 sends RUA:CONNECTIONLESS TRANSFER to the HNB-GW 110 (Operation S461). It is assumed that what is requested by the HNB 310 with this message is part or all of the network information 600 that was requested by the HNB 200 at Operation S451 in FIG. 21.

The HNB-GW 110, when detecting that the HNB 310 is requesting part or all of the network information 600, creates a response message based on the registered data in the storage section 113 (Operation S462) and sends RUA: CONNECTIONLESS TRANSFER to the HNB 310 (Operation S463).

8.3) Effects

According to the eighth example of the present invention, RANAP:DIRECT INFORMATION TRANSFER sent and received between the HNB-GW 110 and core network 410, and messages sent and received between the core network 410 and external network 510 are eliminated, whereby it is possible to reduce communication load within a telecommunication operator's network.

Moreover, in a procedure called Network Assisted Cell Change (hereinafter, NACC), which assists a user to move to a GSM cell, the RIM procedure can be used to acquire system information of a destination cell. When the RIM procedure is performed during the NACC procedure, NACC can be terminated more quickly by applying the present example.

9. Ninth Example

According to a ninth example of the present invention, in a case where HNBs are connected to each other via a HNB-GW through Iurh interfaces, network information in RNA:DIRECT TRANSFER sent and received between a HNB and the HNB-GW is stored in a storage section of the HNB-GW. When the same network information is requested by another HNB, the stored network information is reused to create and send a response message. Thus, network load is reduced. Network information here is any information element defined for RNSAP:INFORMATION EXCHANGE INITIATION RESPONSE messages in TS25.423.

Here, attention is focused on reducing messages exchanged between a HNB and a HNB-GW. However, a similar procedure can also be applied in cases where a HNB-GW and a Radio Network Controller (hereinafter, RNC) are connected through an Iur interface because RNSAP protocol is used.

9.1) Structure

Figure 23:
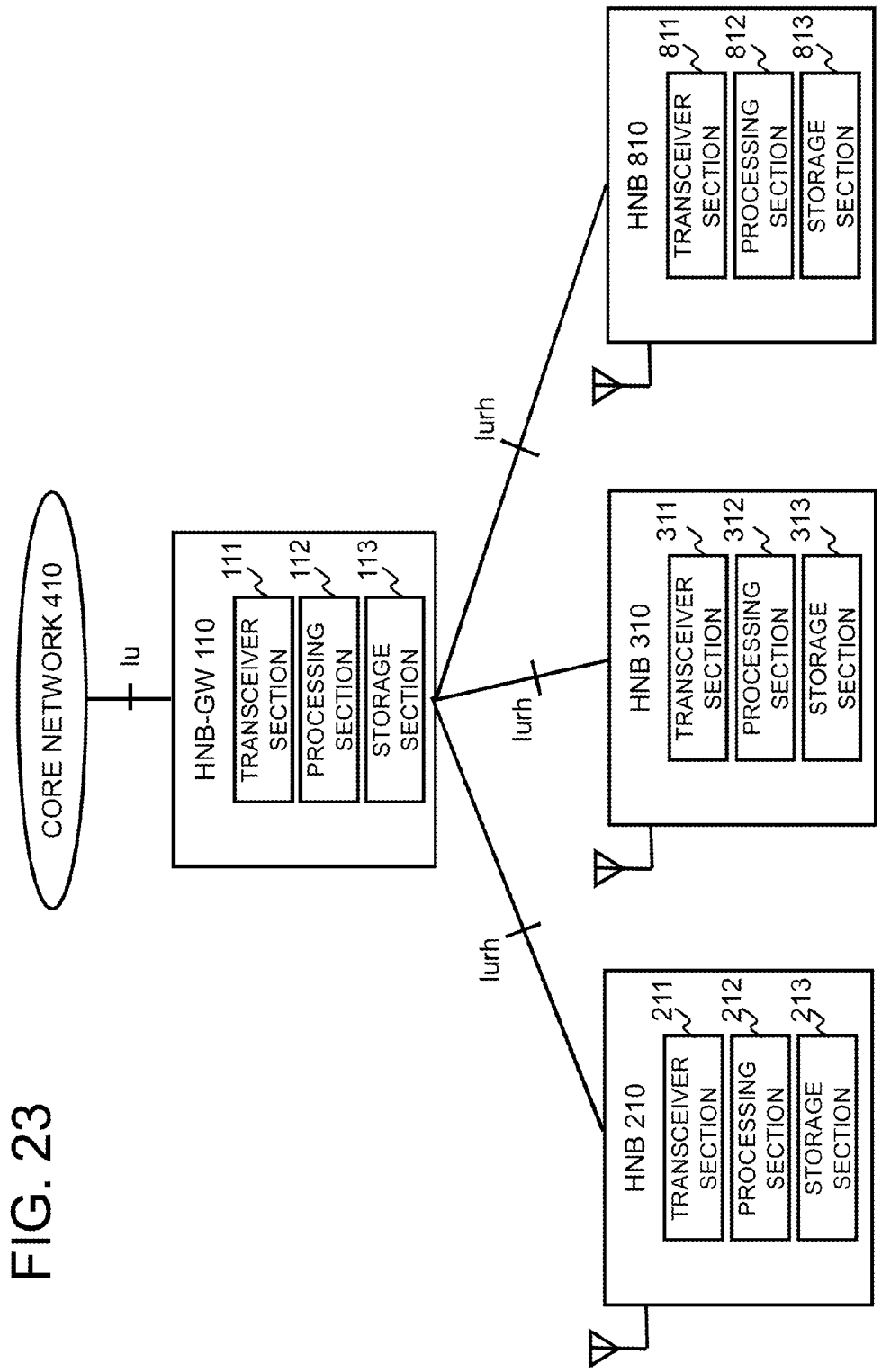
FIG. 23 is a system structure diagram showing a communication system according to a ninth example of the present invention.

Referring to FIG. 23, in a network to which the ninth example of the present invention is applied, it is assumed that HNBs 210, 310, and 810 are connected to each other through Iurh interfaces, and that a HNB-GW 110 relays the Iurh interfaces.

9.2) Operations

Figure 24:
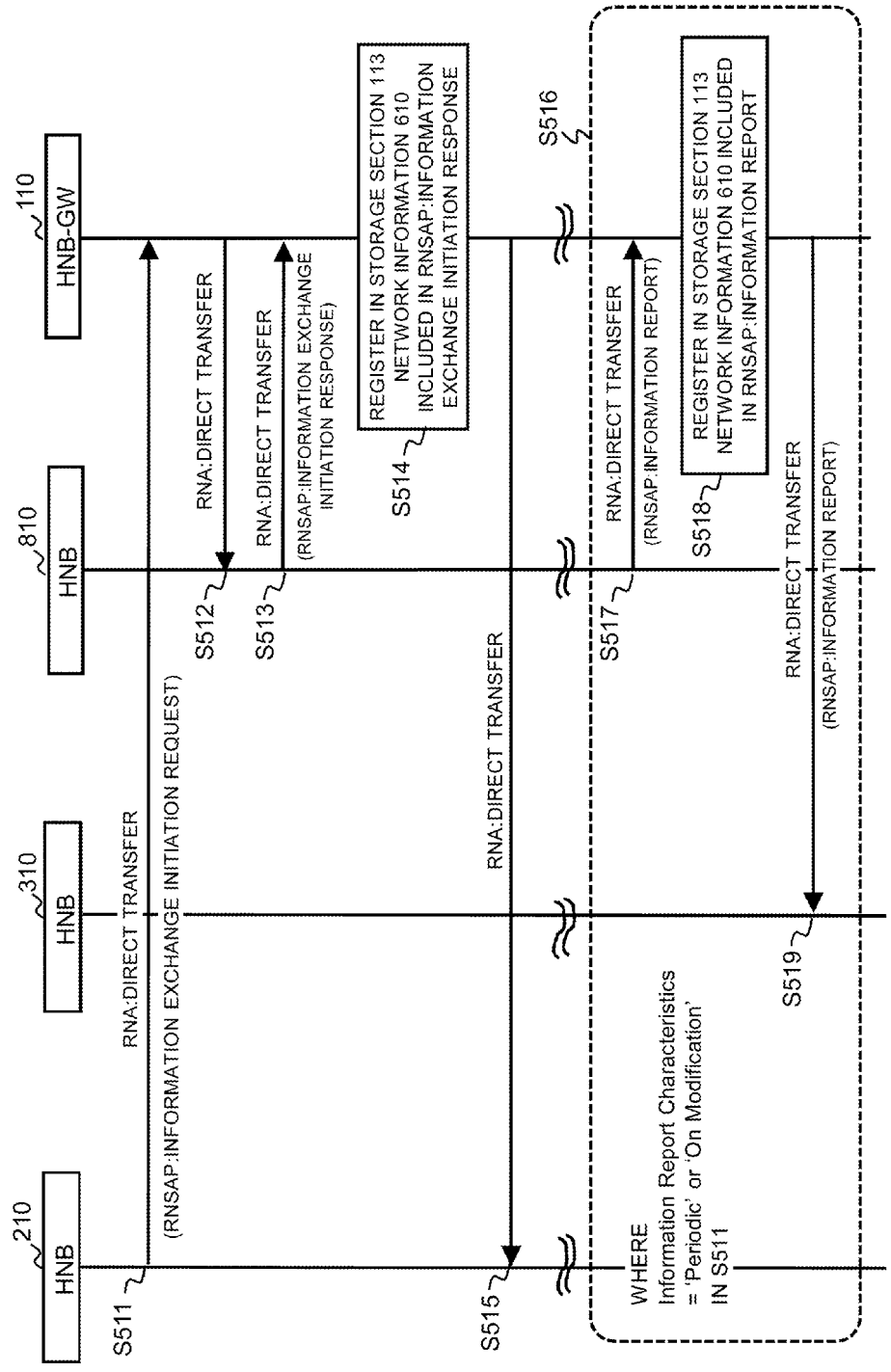
FIG. 24 is a sequence diagram showing operations at the time of acquiring unregistered information, in the communication system according to the ninth example.

Referring to FIG. 24, in a case where the HNB-GW 110 does not retain network information 610 of the HNB 810 and network information is requested of the HNB 810, it is assumed that the HNB 210 sends RNA:DIRECT TRANSFER to the HNB-GW 110 (Operation S511). This message includes RNSAP:INFORMATION EXCHANGE INITIATION REQUEST, and the network information 610 of the HNB 810 is requested with this message.

The HNB-GW 110, when receiving RNA:DIRECT TRANSFER, relays RNA:DIRECT TRANSFER to the HNB 810 (Operation S512). The HNB 810, when receiving it, sends RNA:DIRECT TRANSFER to the HNB-GW 110 (Operation S513). This message includes RNSAP:INFORMATION EXCHANGE INITIATION RESPONSE.

The HNB-GW 110 registers the network information 610 of the HNB 810 included in RNSAP:INFORMATION EXCHANGE INITIATION RESPONSE in the storage section 113 (Operation S514) and sends RNA:DIRECT TRANSFER to the HNB 210 (Operation S515). This message includes RNSAP:INFORMATION EXCHANGE INITIATION RESPONSE.

In a case where Information Report Characteristics='Periodic' or 'On Modification' in Operation S511 (S516), it is assumed that the HNB 810 sends RNA:DIRECT TRANSFER to the HNB-GW 110 (Operation S517). This message includes RNSAP:INFORMATION REPORT, in which part or all of the network information 610 included in RNSAP:INFORMATION EXCHANGE INITIATION RESPONSE in Operation S513 is assumed to be included.

The HNB-GW 110 registers part or all of the network information 610 included in the RNSAP:INFORMATION REPORT in the storage section 113 (Operation S518) and relays RNA:DIRECT TRANSFER to the HNB 310 (Operation S519).

Figure 25:
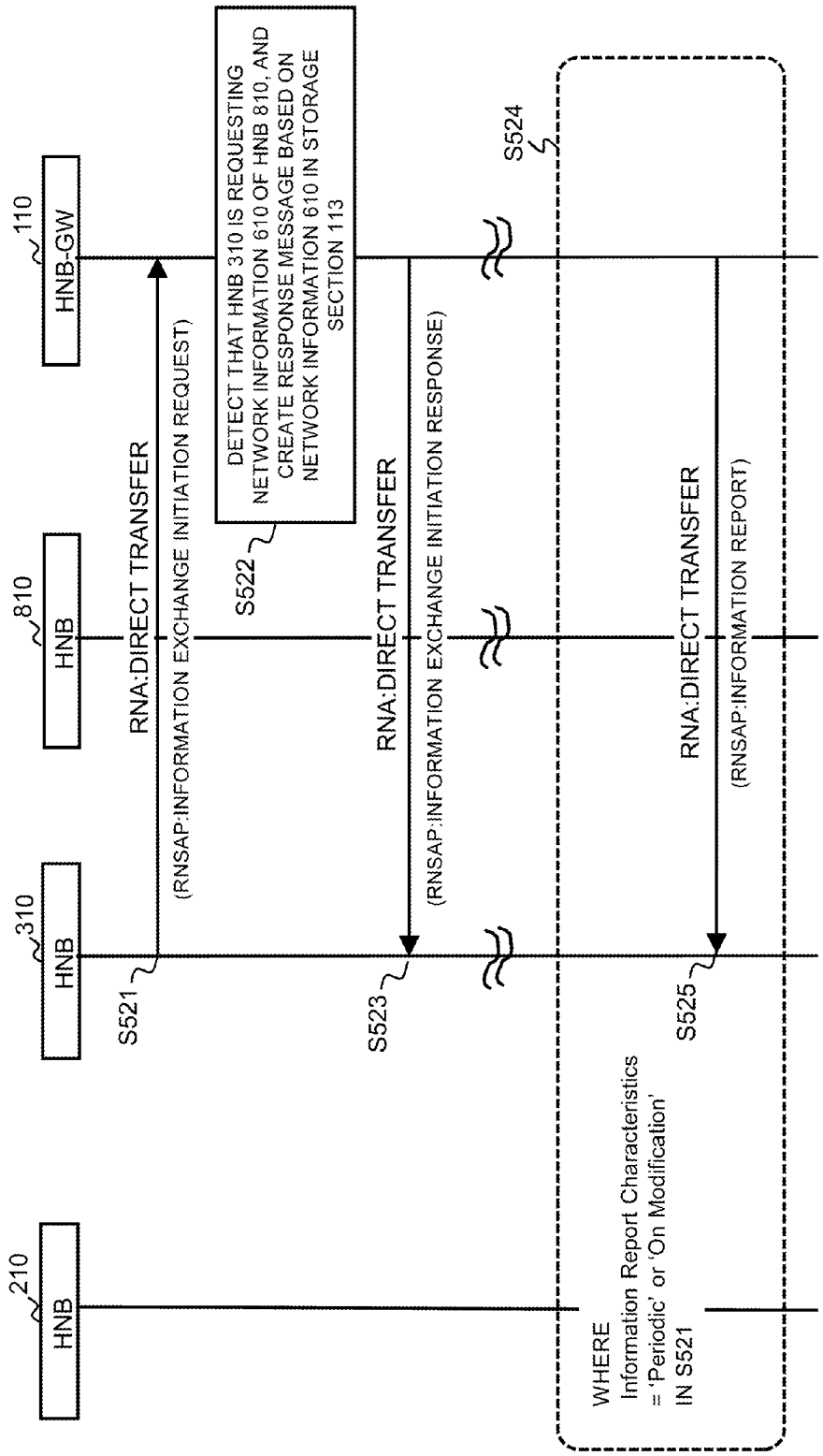
FIG. 25 is a sequence diagram showing operations at the time of returning registered information, in the communication system according to the ninth example.

Referring to FIG. 25, it is assumed that the HNB 310 requests the network information 610 of the HNB 810 in a state where the HNB-GW 110 retains the network information 610 of the HNB 810. In this case, the HNB 310 sends RNA:DIRECT TRANSFER to the HNB-GW 110. It is assumed that the information requested by the HNB 310 with this message is part or all of the network information 610 that was requested by the HNB 210 at Operation S511 in FIG. 24.

The HNB-GW 110, when detecting that the HNB 310 is requesting part or all of the network information 610 of the HNB 810, creates a response message based on the network information 610 in the storage section 113 (Operation S522) and sends RNA:DIRECT TRANSFER to the HNB 310 (Operation S523).

In a case where Information Report Characteristics='Periodic' or 'On Modification' in Operation S521 (S524), the HNB-GW 110 sends RNA:DIRECT TRANSFER to the HNB 310 at a predetermined timing (Operation S525). This message includes part or all of the network information 610 updated. Note that the HNB-GW 110 may be configured to store a HNB that requested the network information 610 of the HNB 810 in the past (in the present embodiment, the HNB 210 in FIG. 24). Then, the HNB-GW 110 may also send the RNA:DIRECT TRANSFER message in Operation S525 to the HNB that requested the network information 610 of the HNB 810 in the past.

9.3) Effects

According to the ninth example of the present invention, the number of RNA:DIRECT TRANSFERs sent and received between a HNB and a HNB-GW is reduced, whereby it is possible to reduce signaling within a telecommunication operator's network. Moreover, a HNB-GW more promptly responds to a HNB, whereby processing running at the HNB can more quickly be completed.

10. 10th Example

The above-described ninth example is to reduce RNA:DIRECT TRANSFERs (RNASAP:INFORMATION EXCHANGE INITIATION REQUESTs) transmitted from HNBs and RNA:DIRECT TRANSFERs (RNSAP:INFORMATION EXCHANGE INITIATION RESPONSEs) transmitted as responses from HNB-GWs. By contrast, in a 10th example of the present invention, RNA:DIRECT TRANSFERs (RNSAP:INFORMATION EXCHANGE INITIATION REQUESTs) transmitted from HNBs and corresponding RNA:DIRECT TRANSFERs (RNSAP:INFORMATION EXCHANGE INITIATION FAILUREs) are reduced.

10.1) Structure

A network structure to which the 10th example is applied is as shown in FIG. 23, which has been described already, and therefore a description will be omitted.

10.2) Operations

Figure 26:
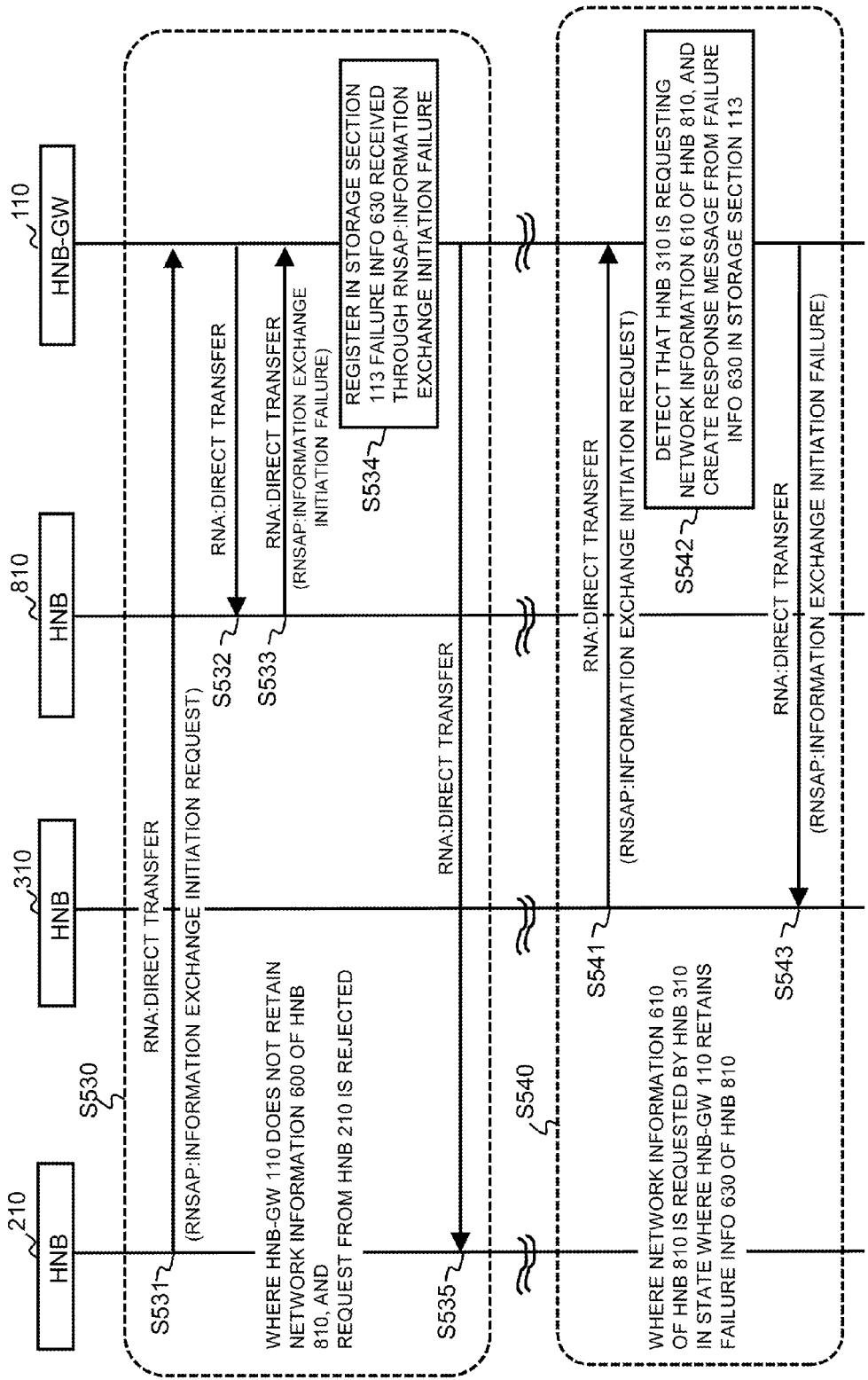
FIG. 26 is a sequence diagram showing operations in a communication system according to a 10th example.

FIG. 26 shows a case where the HNB-GW does not retain network information 610 of the HNB 810 and a request from the HNB 210 is rejected (Operation S530). The HNB 210 sends RNA:DIRECT TRANSFER to the HNB-GW 110 (Operation S531). This message includes RNSAP:INFORMATION EXCHANGE INITIATION REQUEST, and the network information 610 of the HNB 810 is requested with this message. The HNB-GW 110 relays RNA:DIRECT TRANSFER to the HNB 810 (Operation S532), and the HNB 810 sends RNA:DIRECT TRANSFER to the HNB-GW 110 (Operation S533). This message includes RNSAP:INFORMATION EXCHANGE INITIATION FAILURE. Subsequently, the HNB-GW 110 registers failure information 630 of the HNB 810 included in RNSAP:INFORMATION EXCHANGE INITIATION FAILURE in the storage section 113 (Operation S534) and then sends RNA:DIRECT TRANSFER to the HNB 210 (Operation S535). This message includes RNSAP:INFORMATION EXCHANGE INITIATION FAILURE.

Moreover, FIG. 26 shows a case where the network information 610 of the HNB 810 is requested by the HNB 310 in a state where the HNB-GW 110 retains the failure information 630 of the HNB 810 (Operation S540). In this case, the HNB 310 sends RNA:DIRECT TRANSFER to the HNB-GW 110 (Operation S541). The information requested by the HNB 310 with this message is part or all of the network information 610 that was requested by the HNB 210 in S531.

The HNB-GW 110, when detecting that the HNB 310 is requesting the network information 610 of the HNB 810, creates a response message based on the failure information 630 in the storage section 113 (Operation S542) and sends RNA:DIRECT TRANSFER to the HNB 310 (Operation S543).

10.3) Effects

According to the 10th example of the present invention, RNA:DIRECT TRANSFERs (RNSAP:INFORMATION EXCHANGE INITIATION REQUESTs) transmitted from HNBs and corresponding RNA:DIRECT TRANSFERs (RNSAP:INFORMATION EXCHANGE INITIATION FAILUREs) are reduced, whereby communication load within a telecommunication operator's network is reduced.

11. 11th Example

According to an 11th example of the present invention, in a case where all HNBs having requested network information of some HNB have terminated their requests for the network information, the network information is retained until its term of validity expires if such a term of validity is set on the network information, but the network information is immediately discarded if such a term of validity is not set. Messages between a HNB and a HNB-GW are omitted when a term of validity is set, whereby load within a telecommunication operator's network is reduced.

11.1) Structure

A network structure to which the 11th example is applied is as shown in FIG. 23, which has been described above, and therefore a description will be omitted.

11.2) Operations

Figure 27:
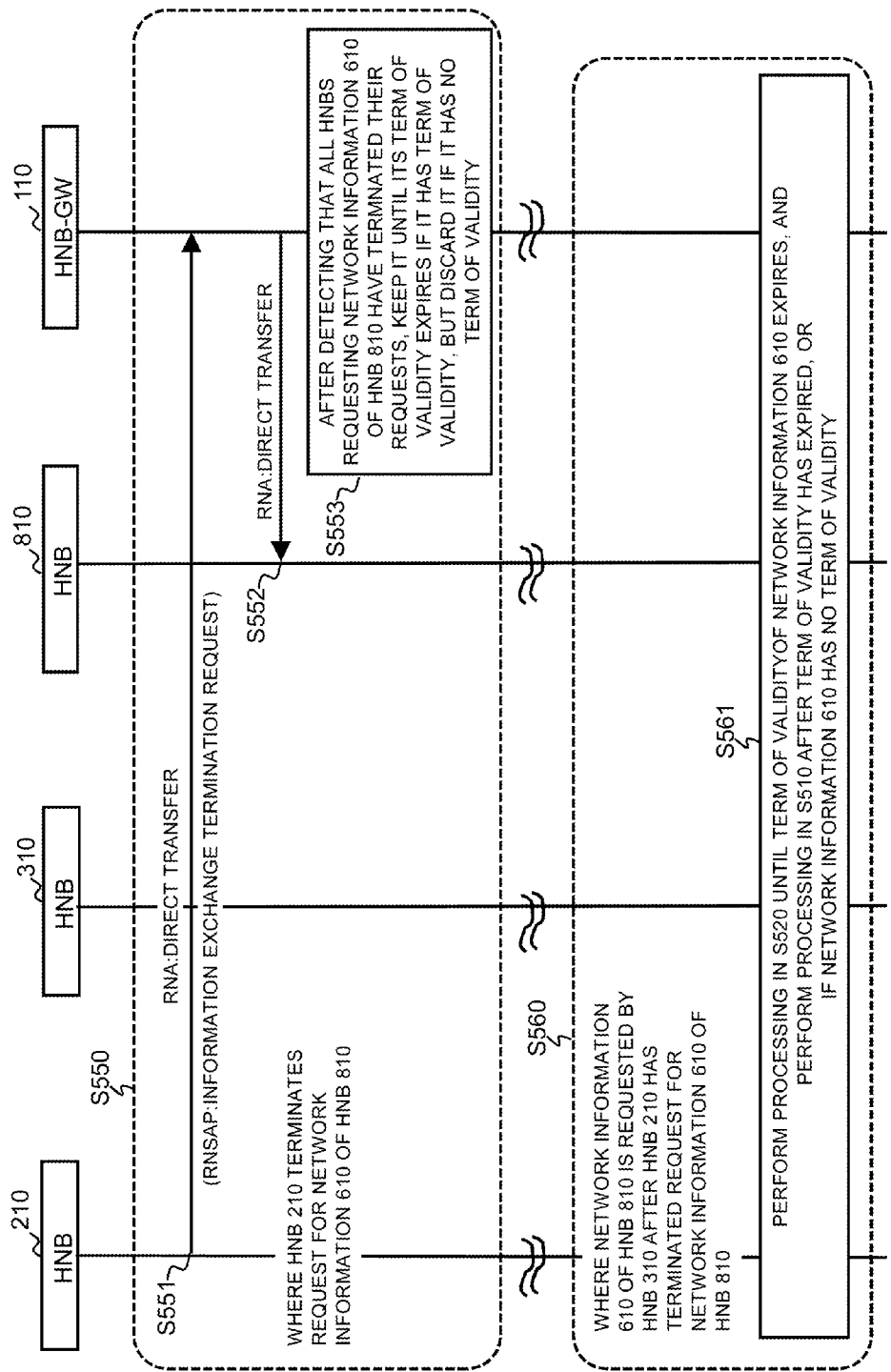
FIG. 27 is a sequence diagram showing operations in a communication system according to an 11th example.

FIG. 27 shows a case where the HNB 210 terminates its request for the network information 610 of the HNB 810 (Operation S550). In this case, the HNB 210 sends RNA:DIRECT TRANSFER to the HNB-GW 110 (Operation S551). This message includes RNSAP:INFORMATION EXCHANGE TERMINATION REQUEST, and the HNB 210 intends to terminate its request for the network information 610 of the HNB 810 with this message. Here, it is assumed that only the HNB 210 is requesting the network information of the HNB 810.

The HNB-GW 110 relays RNA:DIRECT TRANSFER to the HNB 810 (Operation S552). Moreover, when detecting that all HNBs requesting the network information 610 of the HNB 810 have terminated their requests for the network information 610, the HNB-GW 110, if it retains the network information 610 of the HNB 810 in the storage section 113, keeps it until its term of validity expires, but discards it immediately if it has no term of validity (Operation S553).

In a case where the network information 610 of the HNB 810 is requested by the HNB 310 after the HNB 210 terminated its request for the network information of the HNB 810 (S560), if the network information 610 has a term of validity, the processing in Operation S520 is performed until the term of validity expires, and the processing in Operation S510 is performed after the term of validity expires. If no term of validity is set, the processing in Operation S510 is performed (Operation S561).

11.3) Effects

According to the 11th example of the present invention, even after the HNB 210 terminates its request for the network information 610, messages between the HNB 310 and HNB-GW 110 can be omitted until the term of validity of the network information 610 expires, and consequently communication load within a network can be reduced.

12. 12th Example

According to a 12th example of the present invention, in a case where HNBs are connected to each other via a HNB-GW through Iurh interfaces, network information in RNA:DIRECT TRANSFER sent and received between a HNB and the HNB-GW is stored in a storage section of the HNB-GW, and when the same network information is requested by another HNB, the stored information is reused to create and send a response message, whereby network load is reduced. Network information here is any information element that can be set in RNSAP:COMMON MEASUREMENT INITIATION RESPONSE messages in 3GPP TS25.423.

12.1) Structure

A network structure to which the 12th example is applied is as shown in FIG. 23, which has been described above, and therefore a description will be omitted.

12.2) Operations

Figure 28:
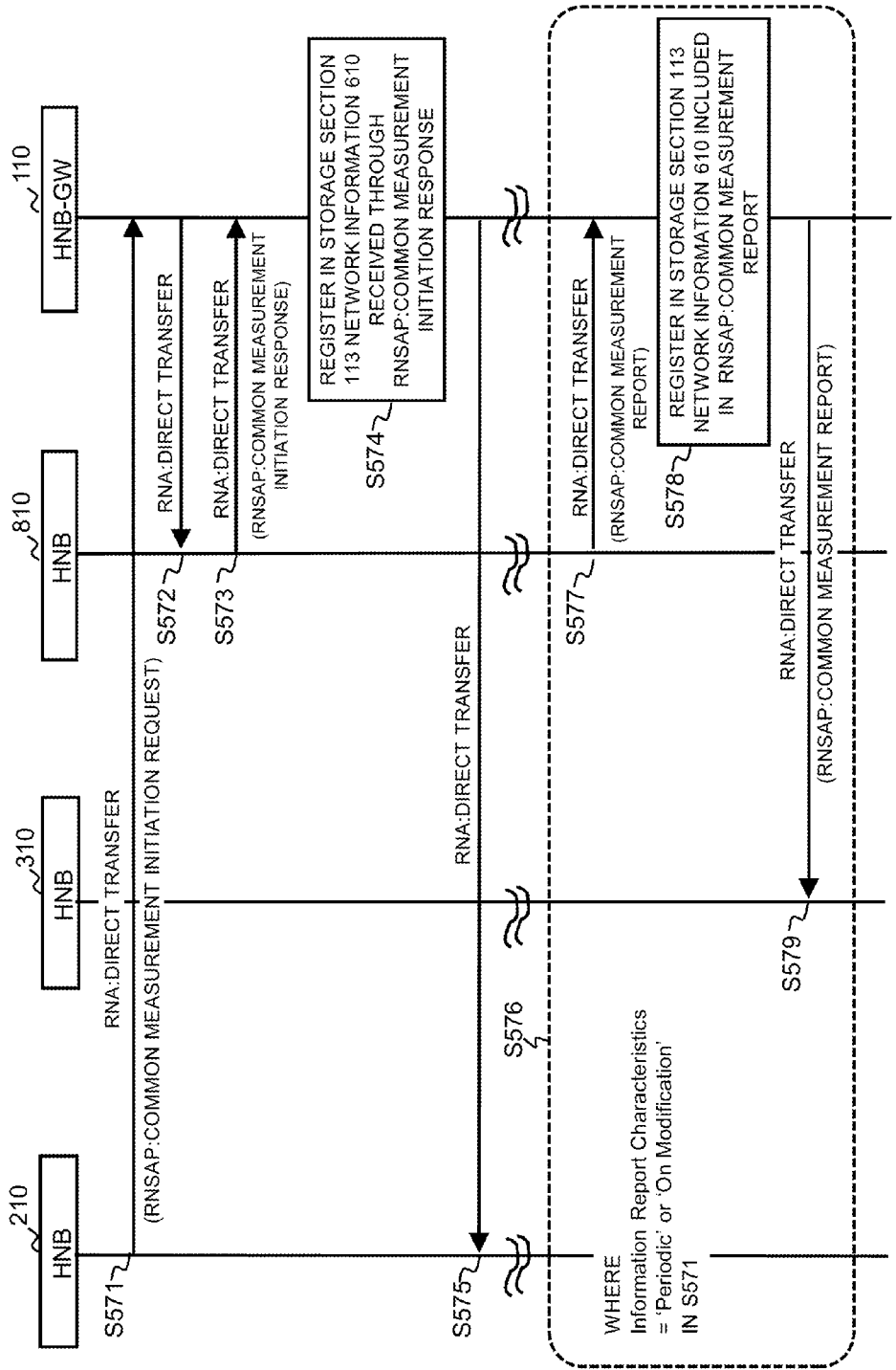
FIG. 28 is a sequence diagram showing operations at the time of acquiring unregistered information, in a communication system according to a 12th example.

Referring to FIG. 28, in a case where the HNB-GW 110 does not retain network information 610 of the HNB 810 and network information is requested of the HNB 810, the HNB 210 sends RNA:DIRECT TRANSFER to the HNB-GW 110 (Operation S571). This message includes RNSAP:COMMON MEASUREMENT INITIATION REQUEST, and the network information 610 of the HNB 810 is requested with this message.

The HNB-GW 110 relays RNA:DIRECT TRANSFER to the HNB 810 (Operation S572), and the HNB 810 sends RNA:DIRECT TRANSFER to the HNB-GW 110 (Operation S573). This message includes RNSAP:COMMON MEASUREMENT INITIATION RESPONSE.

The HNB-GW 110 registers the network information 610 of the HNB 810 included in RNSAP:COMMON MEASUREMENT INITIATION RESPONSE in the storage section 113 (Operation S574) and then sends RNA:DIRECT TRANSFER to the HNB 210 (Operation S575). This message includes RNSAP:COMMON MEASUREMENT INITIATION RESPONSE.

In a case where Information Report Characteristics='Periodic' or 'On Modification' in Operation S571 (S576), it is assumed that the HNB 810 sends RNA:DIRECT TRANSFER to the HNB-GW 110 (Operation S577). This message includes RNSAP:COMMON MEASUREMENT REPORT, in which part or all of the network information 610 included in RNSAP:INFORMATION EXCHANGE INITIATION RESPONSE in Operation S573 is assumed to be included.

The HNB-GW 110 registers part or all of the network information 610 included in RNSAP:COMMON MEASUREMENT REPORT in the storage section 113 (Operation S578) and relays RNA:DIRECT TRANSFER to the HNB 310 (Operation S579).

Figure 29:
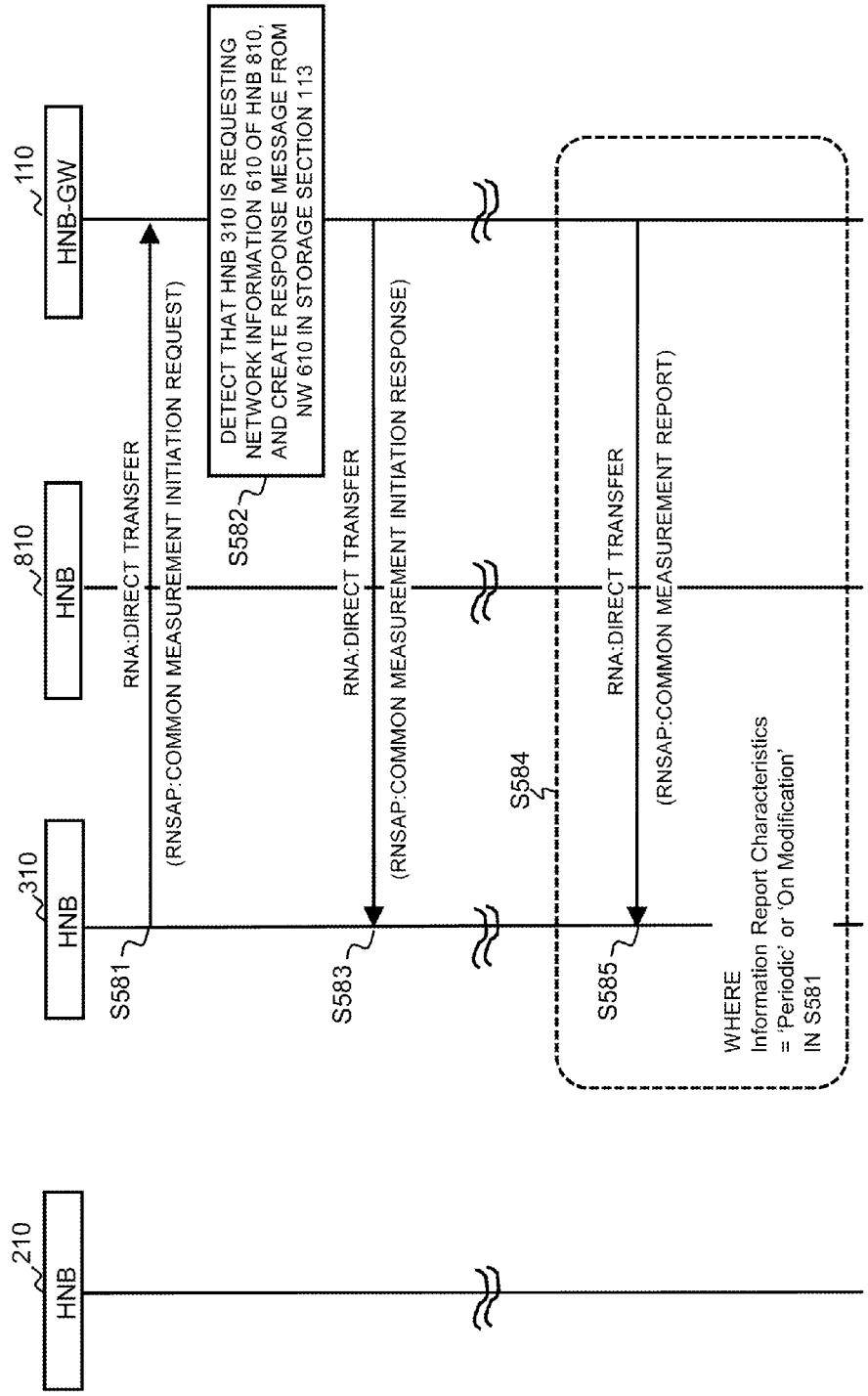
FIG. 29 is a sequence diagram showing operations at the time of returning registered information, in the communication system according to the 12th example.

FIG. 29 shows a case where the network information 610 of the HNB 810 is requested by the HNB 310 in a state where the HNB-GW 110 retains the network information 610 of the HNB 810. In this case, the HNB 310 sends RNA:DIRECT TRANSFER to the HNB-GW 110 (Operation S581). It is assumed that the information requested by the HNB 310 with this message is part or all of the network information 610 that was requested by the HNB 210 at Operation S571 in FIG. 29.

The HNB-GW 110, when detecting that the HNB 310 is requesting the network information 610 of the HNB 810, creates a response message based on the network information 610 in the storage section 113 (Operation S582) and sends RNA:DIRECT TRANSFER to the HNB 310 (Operation S583).

In a case where Information Report Characteristics='Periodic' or 'On Modification' in Operation S581 (S584), the HNB-GW 110 sends RNA:DIRECT TRANSFER to the HNB 310 at a predetermined timing (Operation S585). This message includes part or all of the network information 610 updated. Note that the HNB-GW 110 may be configured to store a HNB that requested the network information 610 of the HNB 810 in the past (in the present embodiment, the HNB 210 in FIG. 28). Then, the HNB-GW 110 may also send the RNA:DIRECT TRANSFER message in Operation S585 to the HNB that requested the network information 610 of the HNB 810 in the past.

12.3) Effects

According to the 12th example of the present invention, the number of RNA:DIRECT TRANSFERs sent and received between a HNB and a HNB-GW is reduced, whereby signaling within a telecommunication operator's network can be reduced. The HNB-GW 110 more promptly responds to the HNB 310, whereby processing running at the HNB 310 can more quickly be completed.

13. 13th Example

The above-described 12th example is to reduce RNA: DIRECT TRANSFERs (RNASAP:COMMON MEASUREMENT INITIATION REQUESTs) transmitted from HNBs and RNA:DIRECT TRANSFERs (RNSAP:COMMON MEASUREMENT INITIATION RESPONSEs) transmitted as responses from HNB-GWs. By contrast, in a 13th example of the present invention, RNA:DIRECT TRANSFERs (RNSAP:COMMON MEASUREMENT INITIATION REQUESTs) transmitted from HNBs and corresponding RNA:DIRECT TRANSFERs (RNSAP:COMMON MEASUREMENT INITIATION FAILUREs) are reduced.

13.1) Structure

A network structure to which the 13th example is applied is as shown in FIG. 23, which has been described above, and therefore a description will be omitted.

13.2) Operations

Figure 30:
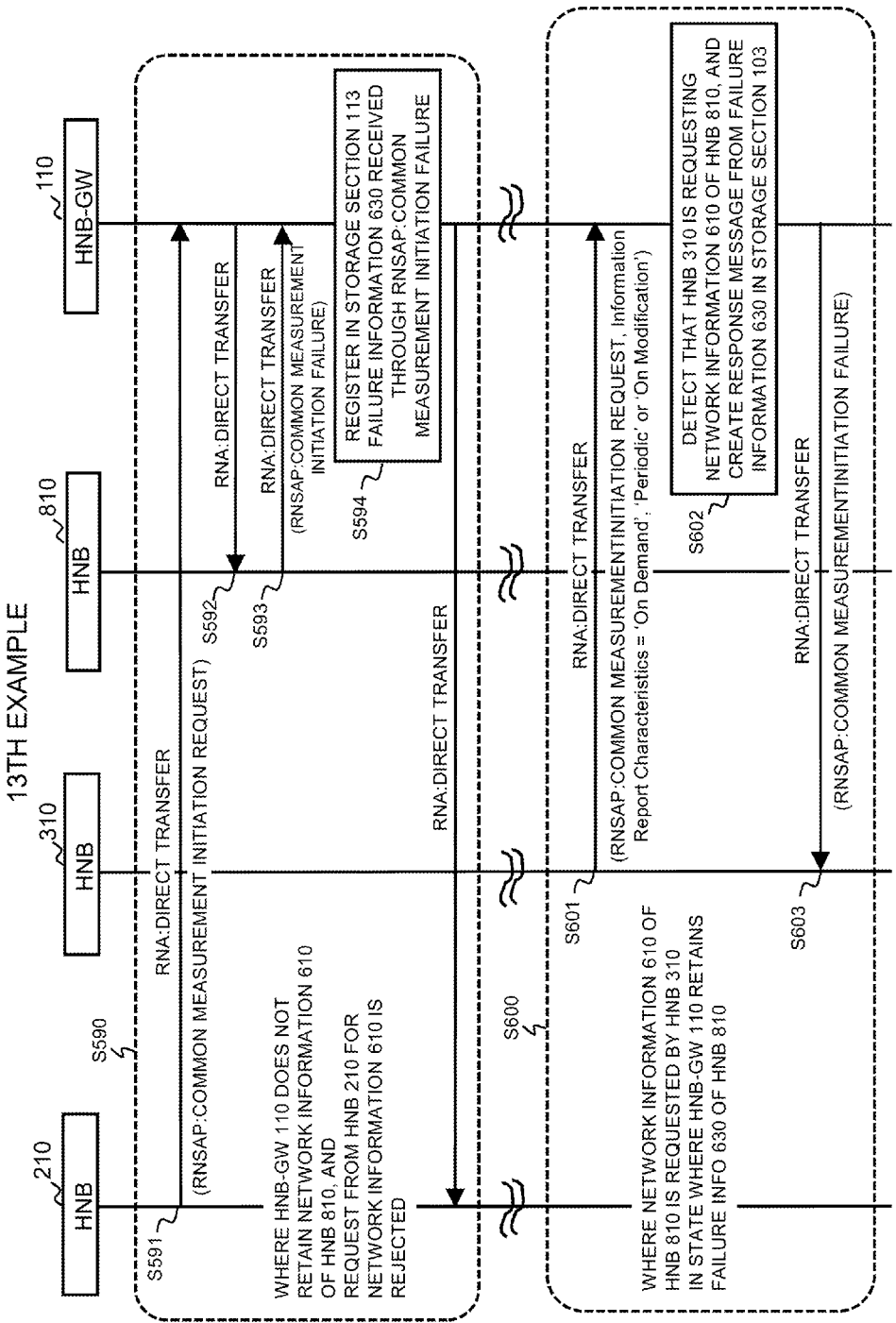
FIG. 30 is a sequence diagram showing operations in a communication system according to a 13th example.

FIG. 30 shows a case where the HNB-GW does not retain network information 610 of the HNB 810 and a request from the NNB 210 is rejected (Operation S590). In this case, the HNB 210 sends RNA:DIRECT TRANSFER to the HNB-GW 110 (Operation S591). This message includes RNSAP: COMMON MEASUREMENT INITIATION REQUEST, and the network information 610 of the HNB 810 is requested with this message. The HNB-GW 110 relays RNA:DIRECT TRANSFER to the HNB 810 (Operation S592), and the HNB 810 sends RNA:DIRECT TRANSFER to the HNB-GW 110 (Operation S593). This message includes RNSAP:COMMON MEASUREMENT INITIATION FAILURE.

The HNB-GW 110 registers failure information 630 of the HNB 810 included in RNSAP:COMMON MEASUREMENT INITIATION FAILURE in the storage section 113 (Operation S594) and sends RNA:DIRECT TRANSFER to the HNB 210 (Operation S595). This message includes RNSAP:COMMON MEASUREMENT INITIATION FAILURE.

In a case where the network information 610 of the HNB 810 is requested by the HNB 310 in a state where the HNB-GW 110 retains the failure information 630 of the HNB 810 (Operation S600), the HNB 310 sends RNA: DIRECT TRANSFER to the HNB-GW 110 (Operation S601). The information requested by the HNB 310 with this message is part or all of the network information 610 that was requested by the HNB 210 in S591.

The HNB-GW 110, when detecting that the HNB 310 is requesting the network information 610 of the HNB 810, creates a response message based on the failure information 630 in the storage section 113 (S602) and sends RNA: DIRECT TRANSFER to the HNB 310 (Operation S603).

13.3) Effects

According to the 13th example of the present invention, RNA:DIRECT TRANSFERs (RNSAP:COMMON MEASUREMENT INITIATION REQUESTs) transmitted from HNBs and corresponding RNA:DIRECT TRANSFERs (RNSAP:COMMON MEASUREMENT INITIATION FAILUREs) are reduced, whereby communication load within a telecommunication operator's network can be reduced.

14. 14th Example

In a 14th example of the present invention, messages between a HNB and a HNB-GW are omitted even after some HNB terminates its request for network information of another HNB, whereby load within a telecommunication operator's network is reduced.

14.1) Structure

A network structure to which the 14th example is applied is as shown in FIG. 23, which has been described above, and therefore a description will be omitted.

14.2) Operations

Figure 31:
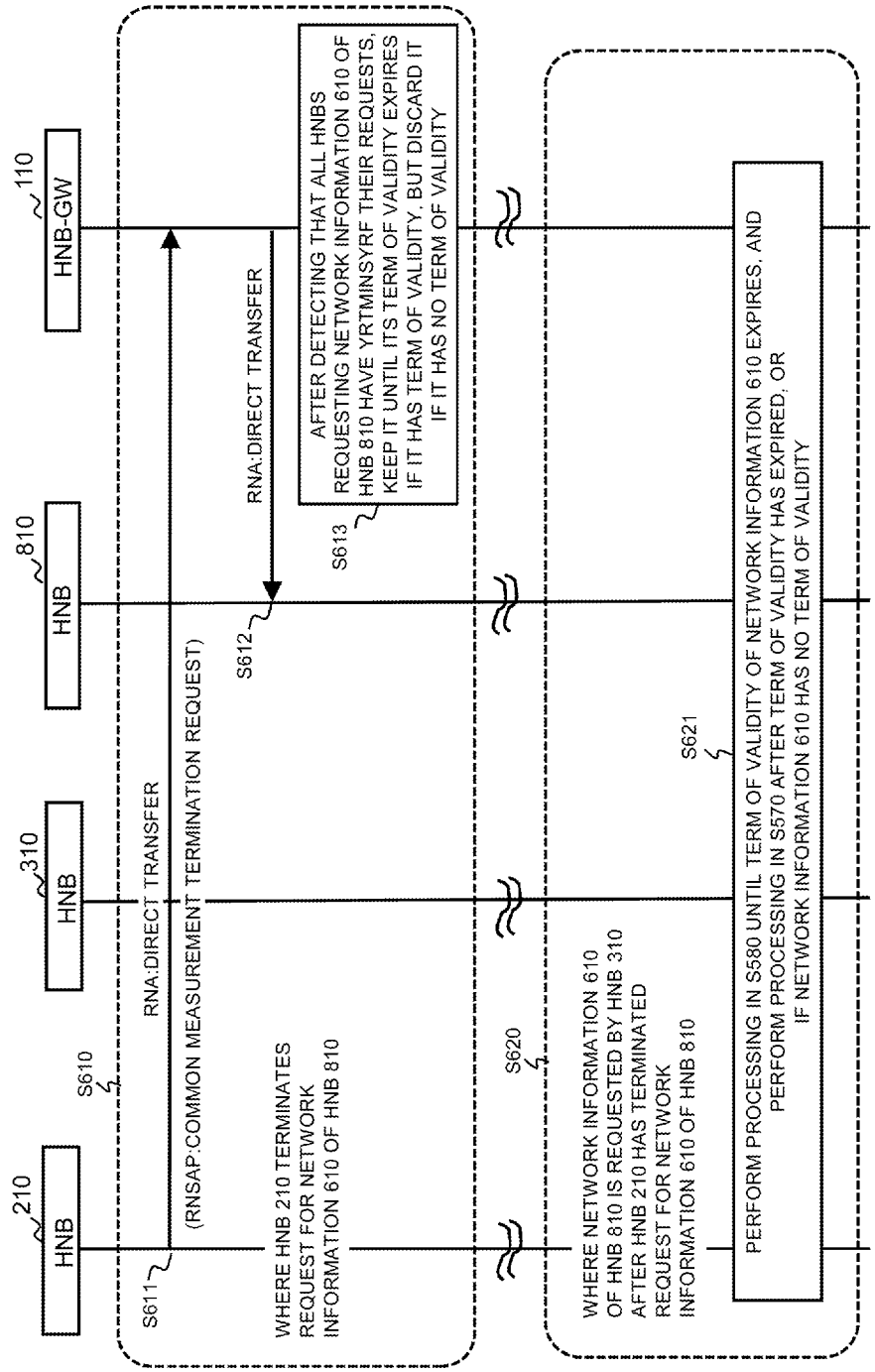
FIG. 31 is a sequence diagram showing operations in a communication system according to a 14th example.

Referring to FIG. 31, in a case where the HNB 210 terminates its request for network information 610 of the HNB 810 (S610), the HNB 210 sends RNA:DIRECT TRANSFER to the HNB-GW 110 (Operation S611). This message includes RNSAP:COMMON MEASUREMENT TERMINATION REQUEST, and the HNB 210 intends to terminate its request for the network information 610 of the HNB 810 with this message.

The HNB-GW 110 relays RNA:DIRECT TRANSFER to the HNB 810 (Operation S612). When detecting that all HNBs requesting the network information 610 of the HNB 810 have terminated their requests for the network information 610, the HNB-GW 110, if the network information 610 of the HNB 810 is stored in the storage section 113, keeps it until its term of validity expires, but discards it immediately if it has no term of validity (Operation S613).

In a case where the network information 610 of the HNB 810 is requested by the HNB 310 after the HNB 210 terminated its request for the network information of the HNB 810 (Operation S620), the processing in Operation S580 is performed, if the network information 610 has a term of validity, until the term of validity expires, and the processing in Operation S570 is performed after the term of validity has expired, or if no term of validity is set (Operation S621).

14.3) Effects

According to the 14th example of the present invention, even after the HNB 210 terminates its request for the network information 610, messages between the HNB 310 and the HNB-GW 110 can be omitted, and consequently communication load within a network can be reduced.

15. 15th Example

According to a 15th example of the present invention, in a network in which a radio base station, as a relaying node, transfers information between one or more radio base stations and a core network device, the radio base station serving as a relaying node stores and reuses part or all of the information it transfers, whereby communication load within the network can be reduced.

In 3GPP TS36.300, a base station serving as a relaying node is referred to as Donor eNB (hereinafter, DeNB). Apart from it, the present example can also be applied in a network structure in which base stations that transmit C-plane (control signals) and base stations that transmit U-plane (data signals) are separated, which is proposed as RWS-120010 in the 3GPP Workshop held in June 2012. In this network structure, a control signal is directly sent and received between UE (User Equipment) and a macro cell. However, when UE can communicate with a phantom cell but cannot communicate with a macro cell, a situation can arise in which the phantom cell sends a control signal to the UE. In such a case, the present example can be applied because it can be said that the phantom cell functions as a relaying node.

15.1) Structure

Figure 32:
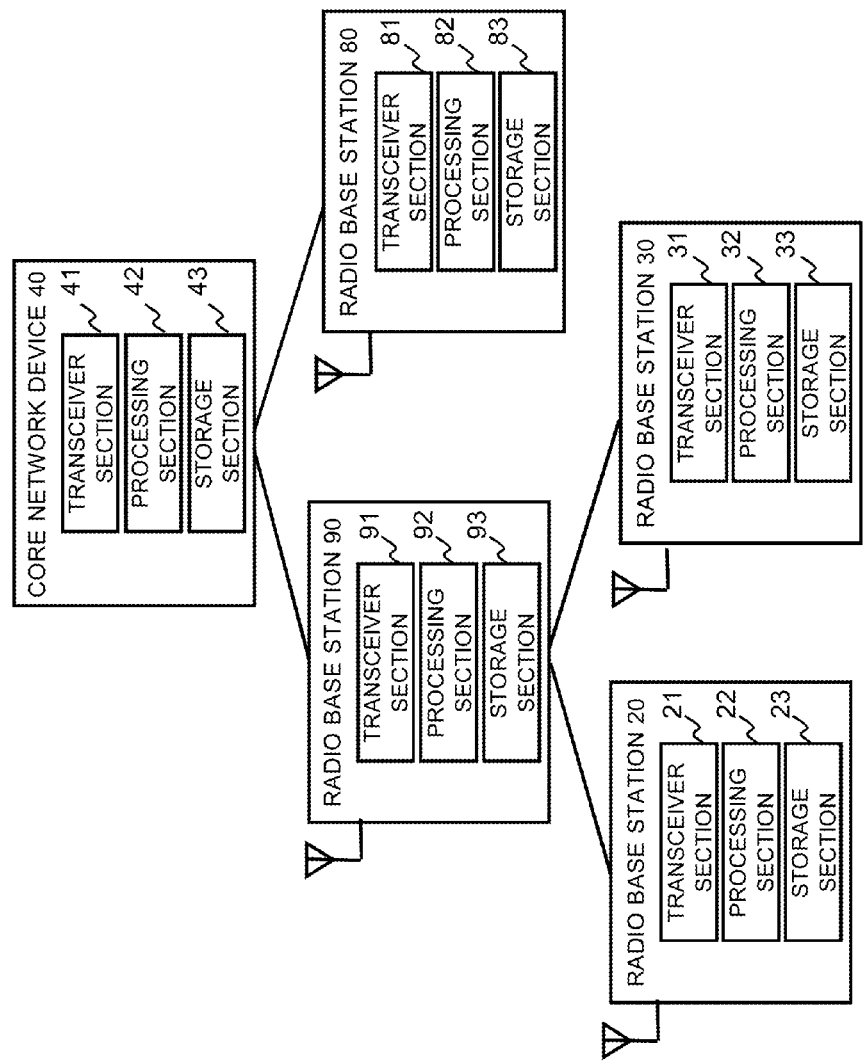
FIG. 32 is a system structure diagram showing a communication system according to a 15th example of the present invention.

Referring to FIG. 32, in a network structure to which the 15th example is applied, it is assumed that radio base stations 20 and 30 are connected to a core network device 40 via a radio base station 90, and that a radio base station 80 is directly connected to the core network device 40.

15.2) Operations

Figure 33:
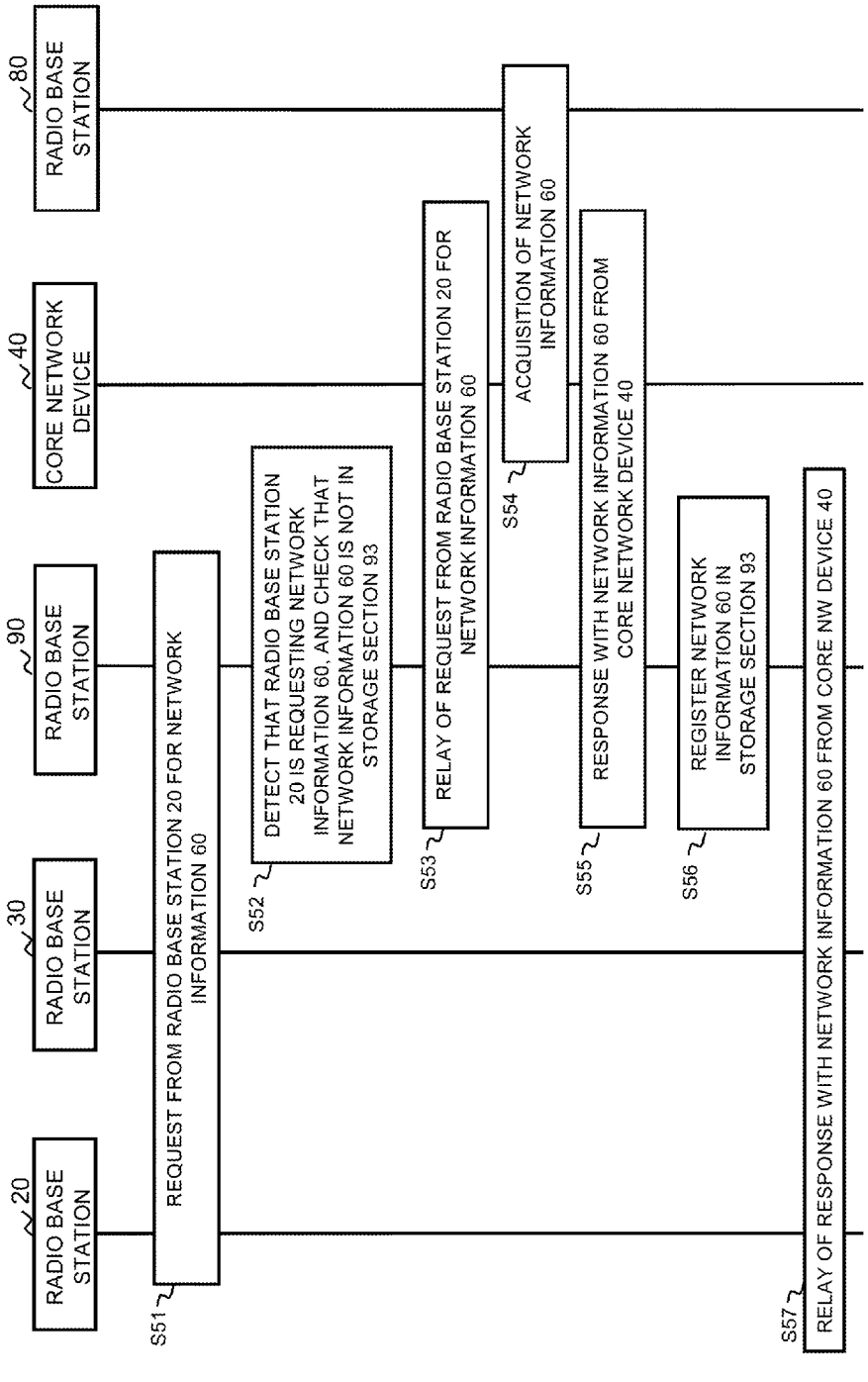
FIG. 33 is a sequence diagram showing operations at the time of acquiring unregistered information, in the communication system according to the 15th example.

Referring to FIG. 33, in a case where the gateway device 10 does not retain network information 60 of the radio base station 80, it is assumed that the radio base station 20 sends a request message for inquiring the network information 60 of the radio base station 80, and that the radio base station 90 receives it (Operation S51).

The radio base station 90, when detecting that the radio base station 20 is requesting the network information 60, checks that the network information 60 is not in a storage section 93 (Operation S52) and relays the request from the radio base station 20 for the network information 60 to the core network device 40 (Operation S53). The core network device 40 having received this request acquires the network information 60 from the radio base station 80 (Operation S54) and sends it to the radio base station 20 as a response, but the radio base station 90 receives this response (Operation S55). The radio base station 90 registers the network information 60 received as a response in the storage section 93 (Operation S56) and relays this response to the radio base station 20 (Operation S57).

Figure 34:
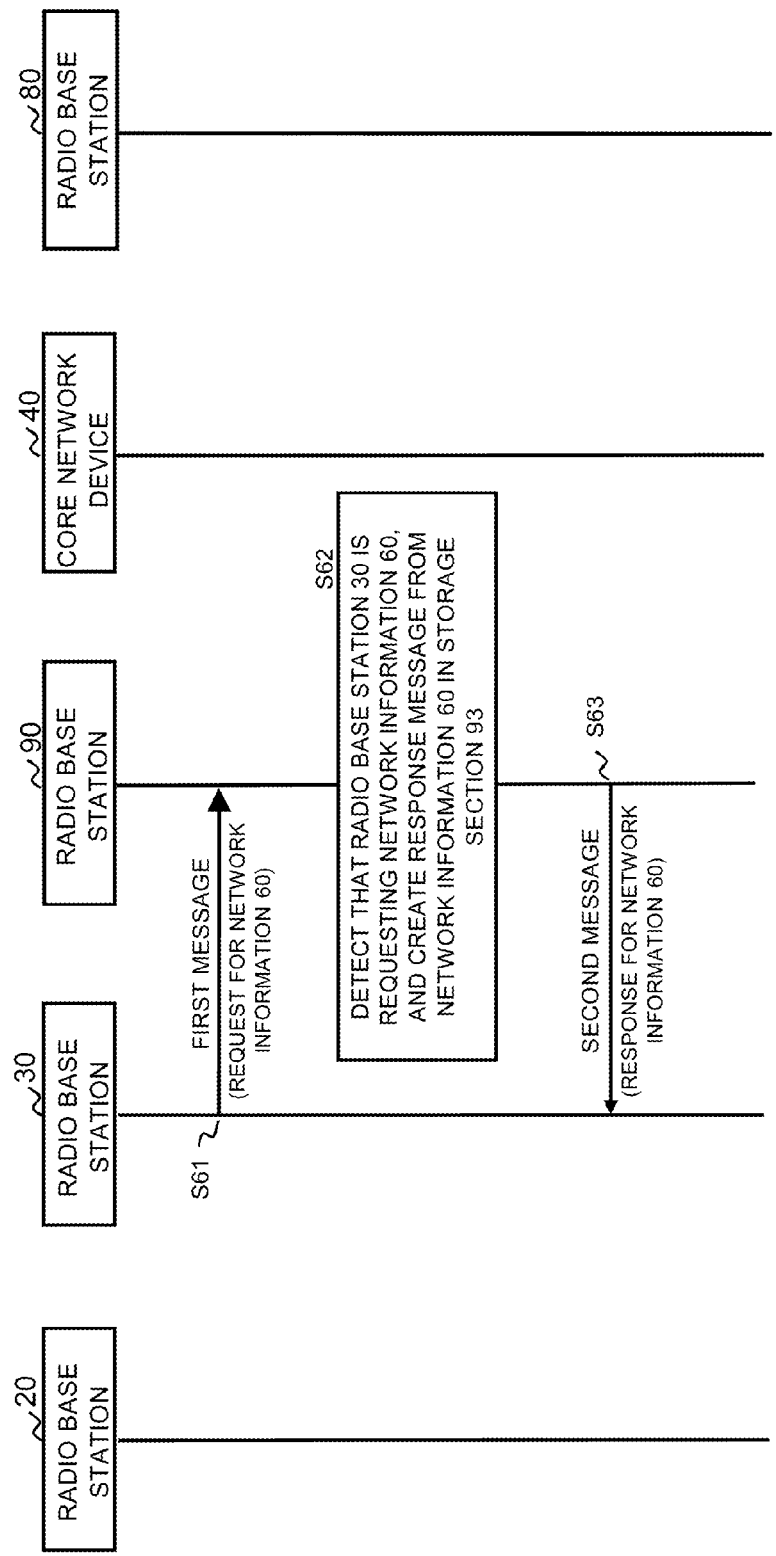
FIG. 34 is a sequence diagram showing operations at the time of returning registered information, in the communication system according to the 15th example.

Referring to FIG. 34, in a case where the radio base station 90 retains the network information 60 of the radio base station 80, it is assumed that the radio base station 30 sends a first message to the radio base station device 90 (Operation S61). What is requested with this message is part or all of the network information 60 that was requested by the radio base station 20 at Operation S51 in FIG. 33. The radio base station 90, when detecting that the radio base station 30 is requesting part or all of the network information 60, creates a response message based on the network information 60 in the storage section 93 (Operation S62) and sends a second message including part or all of the network information 60 to the radio base station 30 (Operation S63).

15.3) Effects

According to the 15th example of the present invention, messages between the radio base station 90 and core network device 40 and between the core network device 40 and radio base station 80 can be omitted, whereby communication load within a telecommunication operator's network can be reduced.

16. 16th Example

According to a 16th example of the present invention, a core network device serves as a node relaying communication between radio base stations, stores part or all of network information requested by a radio base station, and reuses the stored information when another radio base station requests the same information, whereby transmitted messages are reduced, and communication load within a network is reduced. In the present example, information of another wireless communication system is assumed as network information.

16.1) Structure

Figure 35:
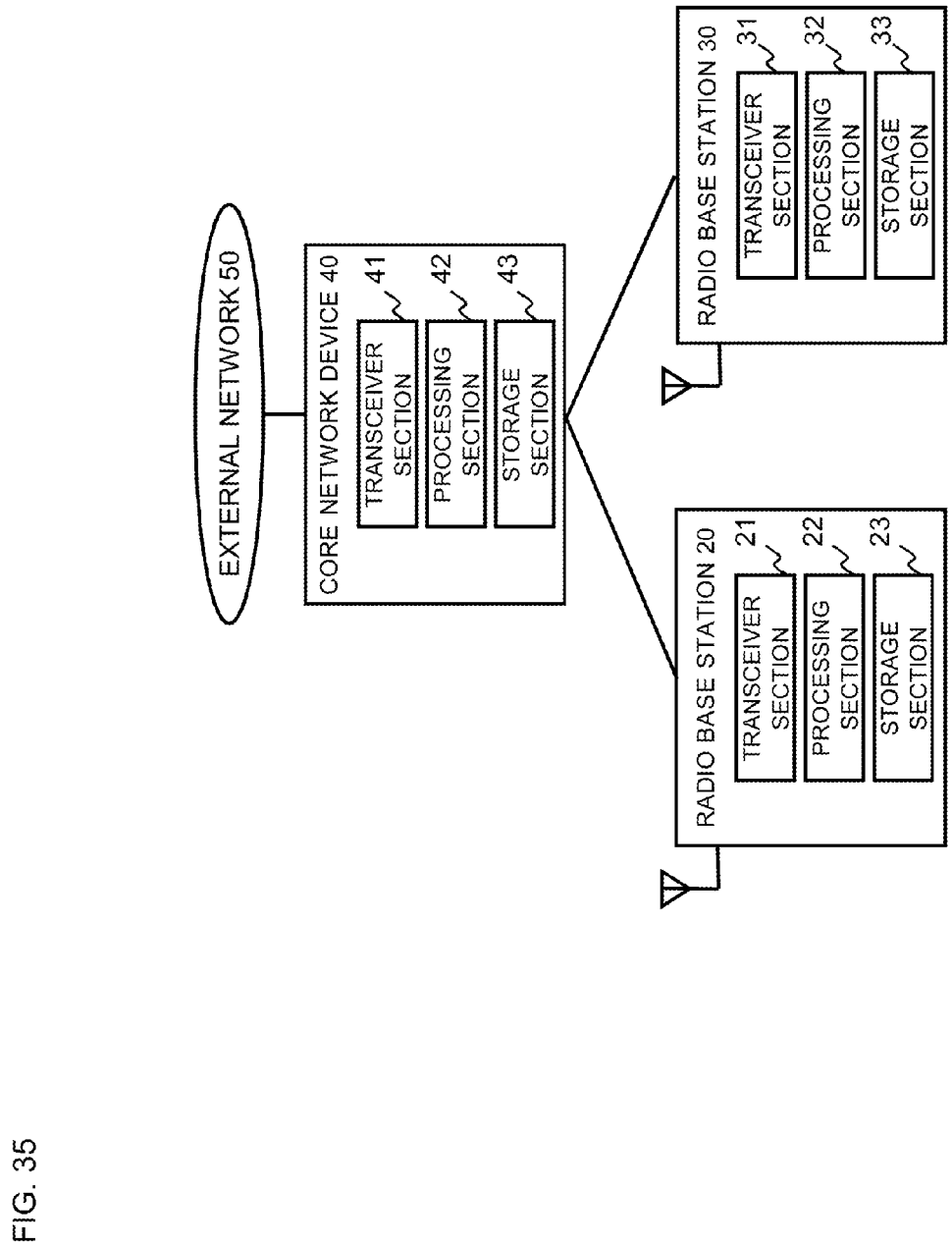
FIG. 35 is a system structure diagram showing a communication system according to a 16th example of the present invention.

Referring to FIG. 35, in a network structure to which the 16th example is applied, it is assumed that radio base stations 20 and 30 are connected to a core network device 40.

16.2) Operations

Figure 36:
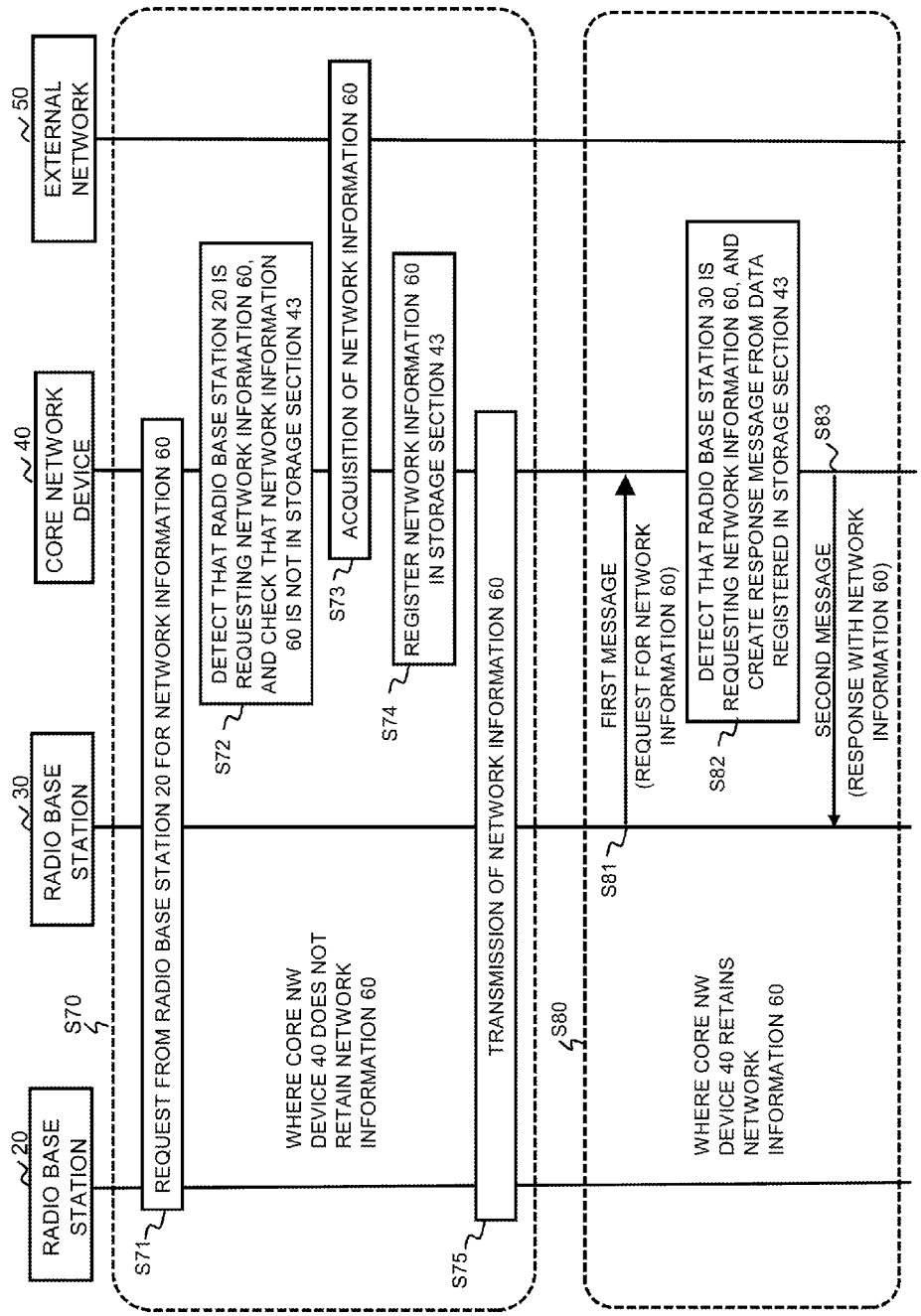
FIG. 36 is a sequence diagram showing operations in the communication system according to the 16th example.

Referring to FIG. 36, in a case where the core network device 40 does not retain network information 60 (S70), it is assumed that the radio base station 20 sends a request message for inquiring the network information 60, and that the core network device 40 receives it (Operation S71). The core network device 40, when detecting that the radio base station 20 is requesting the network information 60, checks that the network information 60 is not in a storage section 43 (Operation S72) and acquires the network information 60 from an external network 50 (Operation S73). Subsequently, the core network device 40 registers the acquired network information 60 in the storage section 43 (Operation S74) and sends the network information 60 to the radio base station 20 (Operation S75).

In a case where the core network device 40 retains the network information 60 (S80), it is assumed that the radio base station 30 sends a first message to the core network device 40 (Operation S81). It is assumed that what is requested with this message is part or all of the network information 60 that was requested by the radio base station 20 in Operation S71.

The core network device 40, when detecting that the radio base station 30 is requesting part or all of the network information 60, creates a response message based on the network information 60 in the storage section 43 (Operation S82) and sends a second message including part or all of the network information 60 to the radio base station 30 (Operation S83).

16.3) Effects

According to the 16th example of the present invention, messages between the core network device 40 and external network 50 can be omitted, and communication load within a telecommunication operator's network can be reduced.

17. 17th Example

Load within a telecommunication operator's network can also be reduced by combining part or all of the above-described first and third to 16th examples. In such combinations, a term of validity is not set on the network information 60, network information 610, TNL address 700, Resource Status 620, or failure information 630. Here, it is assumed that an interface enabling communication exists between devices that operate on different wireless communication systems, such as, for example, the HeNB-GW 100 and HNB 110.

The operations according to the third to 16th examples are performed in parallel. In this case, the gateway device 10, HeNB-GW 100, HNB-GW 110, X2-GW 120, radio base station 90, or core network device 40 may use information acquired by applying any one of the third to 16th examples to create a response message when another example is applied. Specifically, before any occasion to reuse information acquired according to any example occurs, the information is replaced with new information acquired according to another example if part of such new information is the same as the information, whereby a response message can be created by using the latest information on an occasion to reuse it.

As described above, the first and third to 16th examples are combined, whereby it is possible to obtain the effects at once that can be achieved when each one is performed independently.

18. 18th Example

Load within a telecommunication operator's network can also be reduced by combining part or all of the above-described second and third to 16th examples. In such combinations, a term of validity is set on the network information 60, network information 610, TNL address 700, Resource Status 620, or failure information 630. Here, it is assumed that an interface enabling communication exists between devices that operate on different wireless communication systems, such as, for example, the HeNB-GW 100 and HNB 110.

The operations according to the third to 16th examples are performed in parallel. In this case, the gateway device 10, HeNB-GW 100, HNB-GW 110, X2-GW 120, radio base station 90, or core network device 40 may use information acquired by applying any one of the examples to create a response message when another example is applied. Specifically, before any occasion to reuse information acquired according to any example occurs, the information is replaced with new information acquired according to another example if part of such new information is the same as the information, whereby a response message can be created by using the latest information on an occasion to reuse it.

As described above, the second and third to 16th examples are combined, whereby it is possible to obtain the effects at once that can be achieved when each one is performed independently.

19. 19th Example

In a 19th example of the present invention, if the network information 60 retained by the gateway device 10 in the storage section 12 in the first example is one acquired within a time limit designated by a radio base station, the gateway device 10 can reuse the acquired information to create a response message.

19.1) Structure

A network structure to which the 19th example is applied is the same as that in FIG. 5, and therefore a description will be omitted.

19.2) Operations

Figure 37:
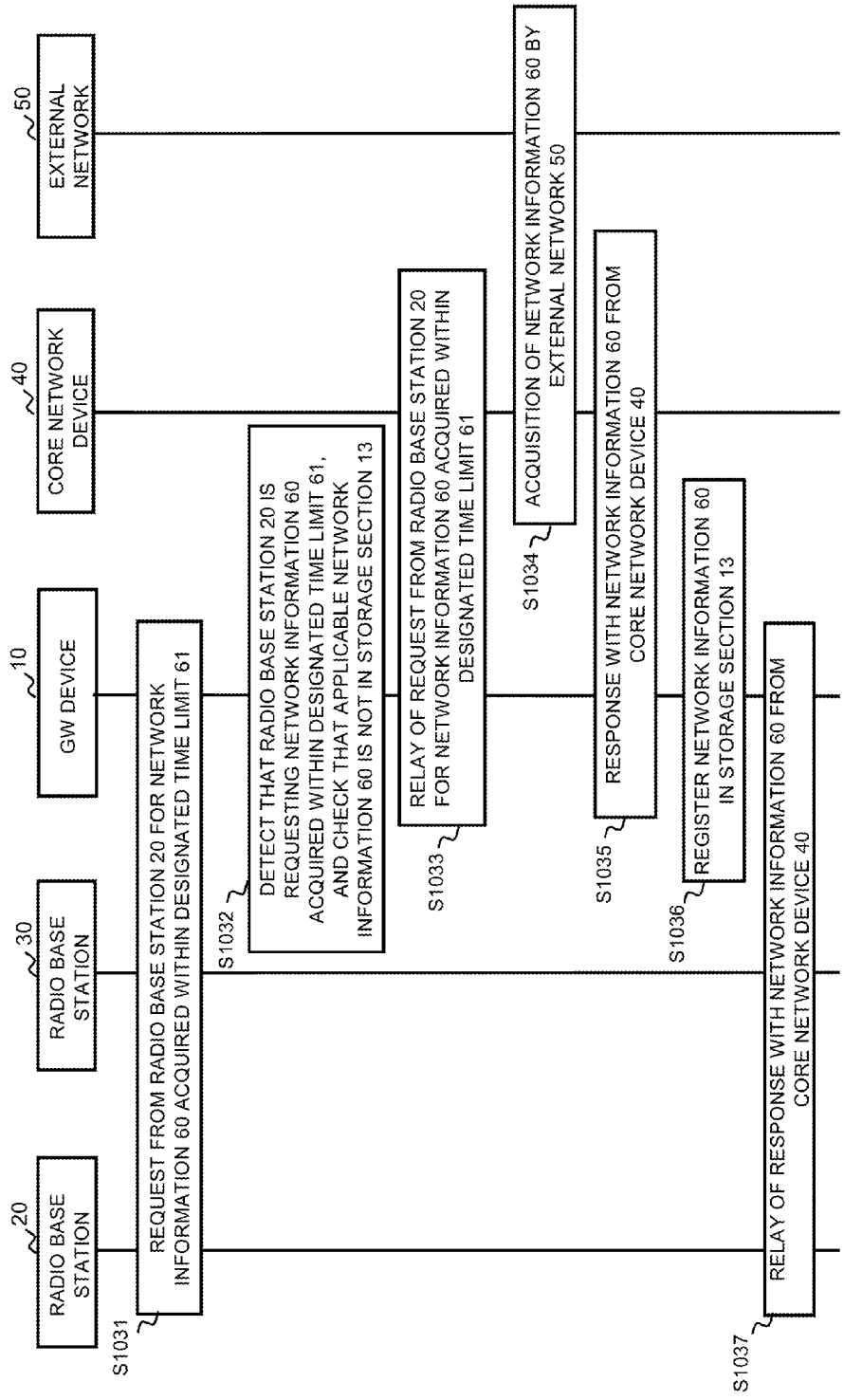
FIG. 37 is a sequence diagram showing operations at the time of acquiring unregistered information, in a communication system according to a 19th example.

Referring to FIG. 37, in a case where the gateway device 10 does not retain network information 60 acquired after a time limit 61 designated by the radio base station 20, it is assumed that the radio base station 20 sends a message for requesting the network information 60 to the core network device 40 (Operation S1031). In this message, the designated time limit 61 is set, and the radio base station 20 is requesting information acquired after this designated time limit 61.

The gateway device 10, when detecting that the radio base station 20 is requesting the network information 60 acquired after the designated time limit 61, checks that the applicable network information 60 is not in the storage section 13 (Operation S1032) and relays the request from the radio base station 20 for the network information 60 acquired after the designated time limit 61 to the core network device 40 (Operation S1033). Here, it is assumed that the core network device 40 does not have a function of checking the designated time limit 61.

The core network device 40, when receiving the request for the network information 60, acquires the network information 60 by inquiring of the external network 50 (Operation S1034) and returns a response including the network information 60 to the gateway device 10 (Operation S1035).

The gateway device 10 registers the network information 60 included in the response from the core network device 40 in the storage section 13 (Operation S1036) and relays the response from the core network device 40 to the radio base station 20 (Operation S1037).

Referring to FIG. 38, in a case where the network information 60 retained by the gateway device 10 is one acquired after a designated time limit 62 (S1040), it is assumed that the radio base station 30 sends a first message for requesting part or all of the network information 60 acquired after the designated time limit 62 to the gateway device 10 (Operation S1041).

The gateway device 10, when receiving the first message, finds the applicable network information 60 from the registered data in the storage section 13 and creates a response message by using it (Operation S1042). Then, the gateway device 10, without sending the first message to the core network device 40, sends a second message including part or all of the network information 60 acquired after the designated time limit 62 to the radio base station 30 as a response message (Operation S1043).

In a case where the network information 60 retained by the gateway device 10 is not one acquired within the designated time limit 62 (S1050), it is assumed that the radio base station 30 sends a first message for requesting part or all of the network information 60 acquired within the designated time limit 62 to the gateway device 10 (Operation S1051). The gateway device 10, when receiving the first message, checks that the applicable information is not in the storage section 12 (Operation S1052) and performs the processing at Operations S1033 to S1037 in FIG. 37 (Operation S1053).

It is also possible that the designated time limit 62 is set on all or part of the information elements included in the network information 60 the radio base station 30 requests. For example, when the network information 60 the radio base station 30 requests includes an information element varying from hour to hour, such as received interference power or the number of connected users in an external network, a time designated by the designated time limit 62 for the applicable information element is a value close to the time of transmission of a message. On the other hand, when an information element of the network information 60 the radio base station 30 requests is static or quasi static information such as destination address information or cell-specific information in an external network, a time designated by the designated time limit 61 can be a value that is not close to the time of transmission of a message. If the designated time limit 62 is set on each information element of the network information 60, the procedure of Operation S1040 or S1050 may be performed as in any one of the following procedures.

The processing in Operation S1040 is performed when, of part or all of the information elements of the network information 60 requested by the radio base station 30, all of those on which designated time limits 62 are set were acquired within the designated time limits 62.

When, of part or all of the information elements of the network information 60 requested by the radio base station 30, part of those on which designated time limits 62 are set were not acquired within the designate time limits 62, but the information elements that were not acquired within the designated time limits 62 are not essential parameters for a response message, then the processing in Operation S1040 is performed, without setting the information elements that were acquired within the designated time limits 62 in the response message.

The processing in Operation S1050 is performed when, of part or all of the information elements of the network information 60 requested by the radio base station 30, part of those on which designated time limits 62 are set were not acquired within the designate time limits 62, and the information elements that were not acquired within the designated time limits 62 are essential parameters for a response message.

19.3) Effects

According to the 19th example of the present invention, network information acquired within a time limit designated by a radio base station can be acquired in shorter time and used for processing, and consequently the real-time property of processing can be enhanced. Moreover, since a designated time limit is set on each piece of information, it is possible to determine whether or not to perform the first example, depending on the purpose of use of required information.

20. 20th Example

A 20th example of the present invention is the third example to which the above-described 19th example is applied, and new information elements are introduced into the containers used in the RIM procedure.

20.1) Structure

A network structure to which the 20th example of the present invention is applied is as shown in FIG. 10, and therefore a description will be omitted.

20.2) Operations

In to FIG. 39, "network information 600" refers to network information of GERAN/UTRAN prescribed in 3GPP TS48.018, arbitrary information related to a RAN such as a self-organizing network (hereinafter, SON), or information related to CDMA2000 (1×RTT or HRPD), Wireless LAN or the like that is not specified by the current 3GPP. In the present example, information elements, namely SpecifiedTime (specified time) and Timestamp (time stamp), are defined in containers (see FIGS. 41 and 42), and it is assumed that these information elements are used to represent a designated time limit set by a radio base station and a time at which a HeNB-GW acquired network information. Note that "Timestamp", which is time information about a point in time at which information was acquired, may be included in information on the sending side, or may be given when the receiving side registers the information.

Referring to FIG. 39, in a case where the HeNB-GW 100 does not retain the network information 600 acquired after a designated time limit 601, it is assumed that the HeNB 200 sends S1AP:ENB DIRECT INFORMATION TRANSFER to the HeNB-GW 100 (Operation S2011). This message includes RAN-INFORMATION-REQUEST Application Container, in which any one or some of the following four elements prescribed in 3GPP TS48.018 and other information of CDMA2000 (1×RTT and HRPD) and Wireless LAN that are not prescribed by the current 3GPP can be contained:

RAN-INFORMATION-REQUEST Application Container for the NACC Application;
RAN-INFORMATION-REQUEST Application Container for the SI3 Application;
RAN-INFORMATION-REQUEST Application Container for the UTRA SI Application; and
RAN-INFORMATION-REQUEST Application Container for the SON Transfer Application.

The SpecifiedTime information element is added to the container as shown in FIG. 41, and the HeNB 200 sets the designated time limit 601 therein.

The HeNB-GW 100, when detecting from the received S1AP:ENB DIRECT INFORMATION TRANSFER that the HeNB 200 is requesting the network information 600 acquired after the designated time limit 601, checks that the network information 600 is not in the storage section 103 (Operation S2012) and relays S1AP:ENB DIRECT INFORMATION TRANSFER to the MME 400 (Operation S2013).

The MME 400, when receiving it, makes a request to the external network 500 for the network information 600 of UTRAN/GERAN (Operation S2014) and, when receiving a response with the network information 600 of UTRAN/GERAN from the external network 500 (Operation S2015), sends S1AP:MME DIRECT INFORMATION TRANSFER including the network information 600 to the HeNB-GW 100 (Operation S2016).

The HeNB-GW 100, when receiving S1AP:MME DIRECT INFORMATION TRANSFER from the MME 400, registers the network information 600 in the storage section 103 (Operation S2017) and relays S1AP:MME DIRECT INFORMATION TRANSFER to the HeNB 200 (Operation S2018).

This network information 600 includes any one or ones corresponding to the element(s) sent by the radio base station 200 in Operation S2011, of the following four elements prescribed in 3GPP TS48.018 and CDMA2000 (1×RTT and HRPD) and Wireless LAN elements that are not prescribed by the current 3GPP:

RAN-INFORMATION Application Container for the NACC Application;
RAN-INFORMATION Application Container for the SI3 Application;
RAN-INFORMATION Application Container for the UTRA SI Application; and
RAN-INFORMATION Application Container for the SON Transfer Application.

Moreover, the HeNB-GW 100 stores time information in Timestamp shown underlined in FIG. 42 and refers to it later when a designated time limit 602 of the network information 600 is inquired about.

Referring to FIG. 40, in a case where the HeNB-GW 100 retains the network information 600 acquired after the designated time limit 602 (S2020), it is assumed that the HeNB 300 sends S1AP:ENB DIRECT INFORMATION TRANSFER to the HeNB-GW 100 (Operation S2021). What is requested by the HeNB 300 with this message is part or all of the network information 600 that was requested by the HeNB 200 at Operation S2011 in FIG. 39, and it is further requested that such information be acquired after the designated time limit 602.

The HeNB-GW 100 having received S1AP:ENB DIRECT INFORMATION TRANSFER, when detecting that the HeNB 300 is requesting the network information 600 acquired after the designated time limit 602, creates a response message based on the registered data in the storage section 103 (Operation S2022) and sends S1AP:MME DIRECT INFORMATION TRANSFER to the HeNB 300 (Operation S2023). This message includes part or all of the network information 600 requested by the HeNB 300 in Operation S2021.

In a case where the HeNB-GW 100 does not retain the network information 600 acquired after the designated time limit 602 (S2030), it is assumed that the HeNB 300 sends S1AP:ENB DIRECT INFORMATION TRANSFER to the HeNB-GW 100 (Operation S2031). What is requested by the HeNB 300 with this message is part or all of the network information 600 that was requested by the HeNB 200 at Operation S2011 in FIG. 39, and it is further requested that such information be acquired after the designated time limit 602.

The HeNB-GW 100 having received S1AP:ENB DIRECT INFORMATION TRANSFER, when detecting that the HeNB 300 is requesting the network information 600 acquired after the designated time limit 602, checks that the applicable one is not in the registered data in the storage section 103 (Operation S2032) and performs the processing at Operations S2013 to S2018 in FIG. 39 (Operation S2033).

20.3) Effects

According to the 20th example of the present invention, the combined effects of the above-described third and 19th examples are obtained.

21. 21st Example

According to a 21st example of the present invention, part or all of the third to 16th and 20th examples are further combined with the above-described combination of the first or second example and 19th example, whereby load within a telecommunication operator's network is reduced.

21.1) Structure

A network structure to which the 21st example of the present invention is applied is a combination of the third to 16th examples. Here, it is assumed that an interface enabling communication exists between devices that operate on different wireless communication systems, such as, for example, the HeNB-GW 100 and HNB 110.

21.2) Operations

The operations according to the third to 16th and 20th examples are performed in parallel. In this case, the gateway device 10, HeNB-GW 100, HNB-GW 110, X2-GW 120, radio base station 90, or core network device 40 may use information acquired by applying any one of the examples to create a response message when another example is applied. Specifically, before any occasion to reuse information acquired according to any example occurs, the information is replaced with new information acquired according to another example if part of such new information is the same as the example, whereby a response message can be created by using the latest information at an occasion to reuse it.

When the third and 20th examples are performed in combination, SpecifiedTime is set in TRANSFER, while both Timestamp and ExpirationTime are set in S1AP:MME DIRECT INFORMATION TRANSFER that the HeNB-GW 100 receives from the MME 400. Hereinafter, examples of use of these information elements will be shown. However, they are only some of the examples of use, and there can be other examples of use.

(1) It is assumed that Timestamp of the network information 60 registered with the HeNB-GW 100 is "Oct. 15, 2012, 15:00" and ExpirationTime (expiration time) thereof is "Oct. 15, 2012, 17:00". In this case, when the HeNB 200 sets "Oct. 15, 2012, 16:00" in SpecifiedTime and makes a request to "receive all or part of the network information 60 acquired before Oct. 15, 2012, 16:00" on Oct. 15, 2012, 15:30, then the HeNB-GW 100 uses all or part of the registered network information 60 to create a response message to the HeNB 200 because the network information 60 was acquired by the HeNB-GW 100 before "Oct. 15, 2012, 15:30" and the time when the request was made is not past ExpirationTime.

(2) It is assumed that Timestamp of the network information 60 registered with the HeNB-GW 100 is "Oct. 15, 2012, 15:00" and ExpirationTime thereof is "Oct. 15, 2012, 17:00". In this case, when the HeNB 200 sets "Oct. 15, 2012, 16:00" in SpecifiedTime and makes a request to "receive all or part of the network information 60 acquired before Oct. 15, 2012, 16:00" on Oct. 15, 2012, 16:30, then the HeNB-GW 100 uses all or part of the registered network information 60 to create a response message to the HeNB 200 because the network information 60 was acquired by the HeNB-GW 100 before "Oct. 15, 2012, 16:00" and the time when the request was made is not past ExpirationTime.

(3) It is assumed that Timestamp of the network information 60 registered with the HeNB-GW 100 is "Oct. 15, 2012, 15:00" and ExpirationTime thereof is "Oct. 15, 2012, 17:00". In this case, when the HeNB 200 sets "Oct. 15, 2012, 16:00" in SpecifiedTime and makes a request to "receive all or part of the network information 60 acquired before Oct. 15, 2012, 16:00" on Oct. 15, 2012, 17:30, then the HeNB-GW 100 transfers the request message to an upper-level device because although the network information 60 was acquired by the HeNB-GW 100 before "Oct. 15, 2012, 16:00", the time when the request was made is past ExpirationTime.

(4) It is assumed that Timestamp of the network information 60 registered with the HeNB-GW 100 is "Oct. 15, 2012, 15:00" and ExpirationTime thereof is "Oct. 15, 2012, 17:00". In this case, when the HeNB 200 sets "Oct. 15, 2012, 18:00" in SpecifiedTime and makes a request to "receive all or part of the network information 60 acquired before Oct. 15, 2012, 18:00" on Oct. 15, 2012, 16:30, then the HeNB-GW 100 uses all or part of the registered network information 60 to create a response message to the HeNB 200 because the network information 60 was acquired by the HeNB-GW 100 before "Oct. 15, 2012, 18:00" and the time when the request was made is not past ExpirationTime.

(5) It is assumed that Timestamp of the network information 60 registered with the HeNB-GW 100 is "Oct. 15, 2012, 15:00" and ExpirationTime thereof is "Oct. 15, 2012, 17:00". In this case, when the HeNB 200 sets "Oct. 15, 2012, 18:00" in SpecifiedTime and makes a request to "receive all or part of the network information 60 acquired before Oct. 15, 2012, 18:00" on Oct. 15, 2012, 17:30, then the HeNB-GW 100 transfers the request message to an upper-level device because although the network information 60 was acquired by the HeNB-GW 100 before "Oct. 15, 2012, 18:00", the time when the request was made is past ExpirationTime.

(6) It is assumed that Timestamp of the network information 60 registered with the HeNB-GW 100 is "Oct. 15, 2012, 15:00" and ExpirationTime thereof is "Oct. 15, 2012, 17:00". In this case, when the HeNB 200 sets "Oct. 15, 2012, 18:00" in SpecifiedTime and makes a request to "receive all or part of the network information 60 acquired before Oct. 15, 2012, 18:00" on Oct. 15, 2012, 18:30, then the HeNB-GW 100 transfers the request message to an upper-level device because although the network information 60 was acquired by the HeNB-GW 100 before "Oct. 15, 2012, 18:00", the time when the request was made is past ExpirationTime.

21.3) Effects

According to the 21st example of the present invention, it is possible to obtain the effects at once that can be achieved when each of the first or second example, the 19th example, and further the third to 16th and 20th examples is performed independently.

22. 22nd Example

In the above-described third example, it is assumed that 001 (RAN-INFORMATION-REQUEST/Single Report PDU) is set in the PDU Type Extension field of RAN-INFORMATION-REQUEST RIM PDU Indications. A 22nd example of the present invention addresses a case where 010 (RAN-INFORMATION-REQUEST/Multiple Report PDU) is set.

22.1) Structure

A network structure to which the 22nd example of the present invention is applied is as shown in FIG. 10, and therefore a description will be omitted.

22.2) Operations

Referring to FIG. 43, in a case where the HeNB-GW 100 does not retain network information 600, Operations S3111, S3112, S3114 to S3118, and S3120 are the same as Operations S111 to S1118 in the third example shown in FIG. 11, respectively, but the following three points are different.

43-1) In Operation S3111, 010 (RAN-INFORMATION-REQUEST/Multiple Report PDU) is set in the PDU Type Extension field of RAN-INFORMATION-REQUEST RIM PDU Indications of a message sent by the HeNB 200.

43-2) In Operation S3116, 101 (RAN-INFORMATION/Initial Multiple Report PDU) is set in the PDU Type Extension field of RAN-INFORMATION RIM PDU Indications of a message returned by the external network 500.

43-3) In Operation S3112, HeNB-GW 100 registers in the storage section 103 the fact that an inquiry of the external network 500 is received from the HeNB 200.

Referring to FIG. 44, in a case where the HeNB-GW 100 retains the network information 600 (S3130), Operations S3131, S3132, and S134 are the same as Operations S121 to S123 in the third example shown in FIG. 12, but the following point is different.

44-1) In Operation S3132, HeNB-GW 100 registers in the storage section 103 the fact that an inquiry of the external network 500 is received from the HeNB 200.

In a case where the network information 600 is updated in the external network 500 (S3140), when an update of the network information 600 is notified from the external network 500 to the MME 400 (Operation S3141), the MME 400 sends S1AP:MME DIRECT INFORMATION TRANSFER to the HeNB-GW 100 (Operation S3142). In this message, 011 (RAN-INFORMATION/Multiple Report PDU) is set in the PDU Type Extension field of RAN-INFORMATION RIM PDU Indications. The HeNB-GW 100 having received S1AP:MME DIRECT INFORMATION TRANSFER registers the updated network information 600 in the storage section 103 (Operation S3143) and sends S1AP:MME DIRECT INFORMATION TRANSFER to each of the HeNBs 200 and 300 (Operations S3144 and S3145).

22.3) Effects

According to the 22nd example of the present invention, effects similar to those of the third example can be obtained even in a case where 010 (RAN-INFORMATION-REQUEST/Multiple Report PDU) is set in the PDU Type Extension field of RAN-INFORMATION-REQUEST RIM PDU Indications of a message in Operation S3111.

23. Other Examples (1) Information acquired as in each of the above-described examples by the gateway device, HeNB-GW, HNB-GW, radio base station, or core network device may be used to create a response message in another example.

(2) The HeNB-GW 100 stores in the storage section 103 in the third example, or the HNB-GW 110 stores in the storage section 113 in the eighth example, network information in the following SON-related container:

RAN-INFORMATION Application Container for the SON Transfer Application.

In accordance with the description in Annex B of 3GPP TS36.413, the HeNB-GW 100 and the HNB-GW 110, for Inter-RAT load balancing and Inter-RAT Mobility Robustness Optimization (hereinafter, MRO), may use relevant information. Specifically, the HeNB-GW 100 and the HNB-GW 110 may be equipped with SON function and use information to autonomously operate and maintain a network or to perform load balancing among radio base stations.

(3) In the 15th example, the radio base stations 20 and 30 acquire the network information 60 of the radio base station 80 to which they are connected via the core network device 40. However, processing as in the fifth and sixth examples may also be applied in a case where the radio base station 80 is connected to the radio base station 90. Specifically, the radio base station 90 may perform the same processing that is performed by the X2-GW 120 in the fifth and sixth examples.

(4) When the second and third examples are combined, the MME 400 receives, as a response, the network information 600 on which the external network 500 has set a term of validity, at Operation S115 in FIG. 11. In accordance with 3GPP TS48.018, Chapter 8c.5, when a cell designated by Reporting Cell Identifier in RAN-INFORMATION-REQUEST Application Container for the NACC Application or RAN-INFORMATION-REQUEST Application Container for the SI3 Application is restarted by a telecommunication operator, the HeNB-GW 100 receives S1AP:MME DIRECT INFORMATION TRANSFER in the RIM procedure. When the HeNB-GW 100 receives this message before the term of validity of the network information 600 expires, the HeNB-GW 100 may delete this information from the storage section 103. The same also applies to the eighth example.

(5) In the 20th example, it is shown in FIGS. 43 and 44 that SpecifiedTime and Timestamp are introduced into the containers defined in 3GPP TS48.018. However, SpecifiedTime and Timestamp may be added as new information elements to the messages used in the other examples.

(6) It is also possible to apply the second example to the structure according to the third example shown in FIG. 10. In this case, an information element indicating a term of validity is added as ExpirationTime to RAN-INFORMATION as shown in FIG. 45, whereby it is possible to notify the term of validity to the HeNB-GW 100 from the external network. This information element corresponding to ExpirationTime may also be added as a new information element to the messages used in the other examples.

24. Additional Statements

Part or all of the above-described exemplary embodiments also can be stated as in, but is not limited to, the following additional statements.

(Additional Statement 1)

A communication system in which a plurality of second communication devices are connected to a first communication device that is attached to a network, characterized in that when a message for requesting information and a response message thereto are sent and received between a second communication device that is an information requester and an information provider on the network via the first communication device, the first communication device stores the information acquired from the response message, and when any second communication device makes a request to the information provider for the same information, the first communication device creates a response message including this information and responds.

(Additional Statement 2)

The communication system according to additional statement 1, characterized in that the information provider sets a term of validity on the information, and the first communication device creates the response message and responds if the stored information is within the term of validity.

(Additional Statement 3)

The communication system according to additional statement 1 or 2, characterized in that the information requester sets a designated period of acquisition of the requested information, and the first communication device creates the response message and responds if the stored information is one within the designated period of acquisition.

(Additional Statement 4)

The communication system according to any one of additional statements 1 to 3, characterized in that the network is a core network of a mobile telecommunication system.

(Additional Statement 5)

The communication system according to any one of additional statements 1 to 3, characterized in that the network is an external network of a mobile telecommunication system.

(Additional Statement 6)

The communication system according to any one of additional statements 1 to 5, characterized in that the first communication device is a gateway device and the second communication devices are radio base stations.

(Additional Statement 7)

The communication system according to any one of additional statements 1 to 5, characterized in that both the first communication device and the second communication devices are radio base stations.

(Additional Statement 8)

A gateway device disposed between a network and a plurality of communication devices, characterized by comprising:

means for detecting a message for requesting information and a response message thereto sent and received between a communication device that is an information requester and an information provider on the network;

storage means for storing the information acquired from the response message; and control means that, when any second communication device makes a request to the information provider for the same information, creates a response message including the information that is stored in the storage means, and responds.

(Additional Statement 9)

The gateway device according to additional statement 8, characterized in that in a case where a term of validity is set on the information, the control means creates the response message and responds if the information stored in the storage means is within the term of validity.

(Additional Statement 10)

The gateway device according to additional statement 8 or 9, characterized in that in a case where a designated period of acquisition is set on information requested by the requester, the control means creates the response message and responds if the information stored in the storage means is one within the designated period of acquisition.

(Additional Statement 11)

The gateway device according to any one of additional statements 8 to 10, characterized in that the network is a core network of a mobile telecommunication system.

(Additional Statement 12)

The gateway device according to any one of additional statements 8 to 10, characterized in that the network is an external network of a mobile telecommunication system.

(Additional Statement 13)

The gateway device according to any one of additional statements 8 to 12, characterized in that the communication devices are radio base stations.

(Additional Statement 14)

A communication control method in a communication device disposed between a network and a plurality of base stations, characterized by comprising:

detecting a message for requesting information and a response message thereto sent and received between a base station that is an information requester and an information provider on the network;

storing the information acquired from the response message in storage means; and when any base station makes a request to the information provider for the same information, creating a response message including the information that is stored in the storage means, and responding.

(Additional Statement 15)

The communication control method according to additional statement 14, characterized in that in a case where a term of validity is set on the information, the response message is created and returned if the information stored in the storage means is within the term of validity.

(Additional Statement 16)

The communication control method according to additional statement 14 or 15, characterized in that in a case where a designated period of acquisition is set on information requested by the requester, the response message is created and returned if the information stored in the storage means is one within the designated period of acquisition.

INDUSTRIAL APPLICABILITY

The present invention is applicable to a gateway device interposed between an external network and a mobile communication network.

REFERENCE SIGNS LIST

1, N1-Nn Communication device
Nx Information provider device
2, 3 Communication section
4 Response information storage section
5 Control section
10 Gateway device
20, 30, 80, 90 Radio base station
40 Core network device
50 External network

The invention claimed is:

1. A communication system comprising:
an information provider on a network;
a first communication device connected to the network; and
a plurality of second communication devices connected to the first communication device, wherein each of the second communication devices is allowed to communicate with the information provider through the first communication device,
wherein when a first of the second communication devices, as an information requester, sends a request message for requesting information to the information provider and receives a first response message including the information from the information provider through the first communication device, the first communication device acquires the information from the first response message and stores the information, and
when one of the second communication devices makes a request to the information provider for at least part of the stored information, the first communication device creates a second response message including the at least part of the stored information and sends the second response message to the one of the second communication devices, and
wherein the first of the second communication devices, as the information requester, sets a designated period of acquisition of the information, and the first communication device creates the second response message and sends the second response message to the one of the second communication devices if the at least part of the information stored is requested during the designated period of acquisition.

2. The communication system according to claim 1, wherein the information provider sets a term of validity on the information, and the first communication device creates the second response message and sends the second response message to the one of the second communication devices if the at least part of the stored information is requested during the term of validity.

3. The communication system according to claim 1, wherein the network is a core network of a mobile telecommunication system.

4. The communication system according to claim 1, wherein the network is an external network of a mobile telecommunication system.

5. The communication system according to claim 1, wherein the first communication device is a gateway device and the second communication devices are radio base stations.

6. A gateway device disposed between a network and a plurality of communication devices, comprising:
a detector that detects a request message received from a communication device as an information requester and a first response message received from an information provider on the network, wherein the request message is sent to the information provider to request the information and the first response message includes the information;
a storage section that stores the information acquired from the first response message; and
a controller that, when one of the communication devices makes a request to the information provider for at least part of the stored information, creates a second response message including the at least part of the stored information, and sends the second response message to the one of the communication devices, and
wherein a first of the communication devices, as the information requester, sets a designated period of acquisition of the information, and the first communication device creates the second response message and sends the second response message to the one of the communication devices if the at least part of the information stored is requested during the designated period of acquisition.

7. The gateway device according to claim 6, wherein in a case where a term of validity is set on the information, the controller creates the second response message and sends the second response message to the one of the communication devices if the at least part of the stored information is requested during the term of validity.

8. The gateway device according to claim 6, wherein the network is a core network of a mobile telecommunication system.

9. The gateway device according to claim 6, wherein the network is an external network of a mobile telecommunication system.

10. The gateway device according to claim 6, wherein the communication devices are radio base stations.

11. A communication control method in a communication device disposed between a network and a plurality of base stations, comprising:
detecting a request message received from a base station as an information requester and a first response message received from an information provider on the network, wherein the request message is sent to the information provider to request the information and the first response message includes the information;
storing the information acquired from the first response message in a storage section; and
when one of the base stations makes a request to the information provider for at least part of the stored information, creating a second response message including the at least part of the stored information, and sending the second response message to the one of the base stations, and
wherein a first of the base stations, as the information requester, sets a designated period of acquisition of the information, and the first base station creates the second response message and sends the second response message to the one of the base stations if the at least part of the information stored is requested during the designated period of acquisition.

12. The communication control method according to claim 11, wherein when a term of validity is set on the information, the second response message is created and sent to the one of the base stations if the at least part of the stored information is requested during the term of validity.

13. The communication control method according to claim 11, wherein the network is a core network of a mobile telecommunication system.

14. The communication control method according to claim 11, wherein the network is an external network of a mobile telecommunication system.

15. The communication control method according to claim 11, wherein the communication device is a gateway device.

* * * * *